United States Patent [19]
Takamine et al.

[11] Patent Number: 5,805,543
[45] Date of Patent: Sep. 8, 1998

[54] TILT CONTROL APPARATUS BASED ON PULSED WIDTH DETECTION OF AN INFORMATION REPRODUCED SIGNAL

[75] Inventors: Kouichi Takamine, Hirakata; Yasuaki Edahiro, Habikino; Hiromichi Ishibashi, Ibaraki; Mitsurou Moriya, Ikoma, all of Japan

[73] Assignee: Matsushita Electric Industrial Co., Ltd., Kadoma, Japan

[21] Appl. No.: 604,098

[22] Filed: Feb. 20, 1996

[30] Foreign Application Priority Data

Feb. 22, 1995 [JP] Japan ................................. 7-033772

[51] Int. Cl.⁶ .................................................. G11B 7/095
[52] U.S. Cl. .......................................... 369/44.32; 369/54
[58] Field of Search .............................. 369/44.25, 44.27, 369/44.29, 44.32, 54, 58

[56] References Cited

U.S. PATENT DOCUMENTS 4,674,078  6/1987  Otsukka et al. .
5,502,698  3/1996  Mochizuki .

FOREIGN PATENT DOCUMENTS 61-51630  3/1986  Japan .
3-242832  10/1991  Japan .

*Primary Examiner*—W. R. Young
*Attorney, Agent, or Firm*—Renner, Otto, Boisselle & Sklar, P.L.L.

[57] ABSTRACT

The tilt control apparatus of the invention controls to minimize an error in an orthogonal relationship between an optical disk and an optical axis of a light beam irradiated onto the optical dick. The tilt control apparatus includes: an optical pickup for irradiating the light beam onto the optical disk, thereby reproducing information recorded on the optical disk; an orthogonality error detector for outputting an orthogonality error signal corresponding to the error in the orthogonal relationship between the optical disk and the optical axis; a tilting mechanism for tilting the optical axis; a tilt controller for controlling such that the optical disk falls at right angles with the optical axis by driving the tilting mechanism in response to the orthogonality error signal; a pulse width variation detector for outputting a pulse width variation signal corresponding to a variation in a pulse width of an information reproduced signal obtained from the optical pickup; and a target value variable circuit for varying a control target value of the tilt controller based on the pulse width variation signal.

22 Claims, 39 Drawing Sheets

FIG.12

| State \ Bit | S 1 | S 2 | S 3 |
|---|---|---|---|
| State a | 0 | 0 | 0 |
| State b | 0 | 1 | 0 |
| State c | 0 | 0 | 1 |
| State d | 1 | 0 | 0 |
| State e | 1 | 0 | 1 |
| State f | 1 | 1 | 0 |

FIG.20
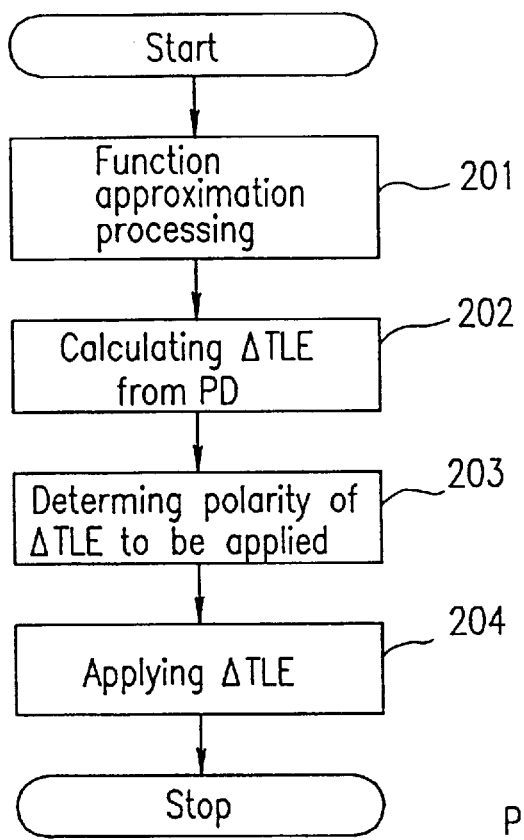
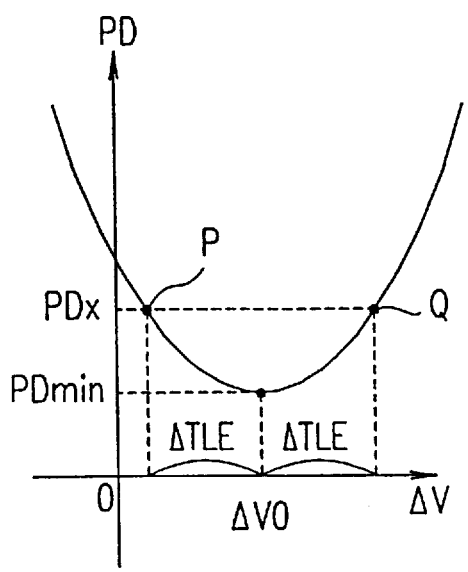

TILT CONTROL APPARATUS BASED ON PULSED WIDTH DETECTION OF AN INFORMATION REPRODUCED SIGNAL

BACKGROUND OF THE INVENTION

1. Field of the Invention

The present invention relates to an optical recording and reproducing apparatus for optically recording a signal on a recording medium and/or reproducing the signal which has been recorded on the recording medium by using a light source such as a laser. More specifically, the present invention relates to a tilt control apparatus having a tilt servo system for maintaining an orthogonal relationship between the optical axis of a light beam used for recording and reproducing information and the information recording surface of a recording medium (or disk).

2. Description of the Related Art

A conventional tilt control apparatus is known from Japanese Laid-Open Patent Publication No. 61-51630 (optical head apparatus), for example. As disclosed in this patent publication, a conventional tilt control apparatus detects an error in the orthogonal relationship between a disk and the optical axis of a light beam irradiated onto the disk (the "orthogonal relationship" herein refers to the state where the disk falls at right angles with the optical axis of the light beam irradiated on the disk) by using a sensor exclusively used for detecting the error, i.e., a tilt sensor, thereby maintaining the orthogonal relationship based on an orthogonality error signal detected by the sensor.

Hereinafter, a conventional tilt control apparatus will be described.

FIG. 41 is a block diagram showing a schematic configuration for a conventional tilt control apparatus. In FIG. 41, an optical disk 101 is placed on a rotation axis of a spindle motor 111. An optical pickup 102 includes: a light-emitting element such an a laser; an objective lens; and an objective lens actuator and irradiates a condensed light beam onto the optical disk 101. A light-receiving element is further provided for the optical pickup 102, thereby detecting an information reproduced signal RF and a servo signal including a focusing error signal FE and a tracking error signal. A signal corresponding to the recorded information, i.e., an information reproduced signal RF is obtained by converting the light reflected by the optical disk 101 into an electric signal. A focusing error signal FE is an electric signal corresponding to the distance between the focal point of the condensed light beam and the information recording surface of the optical disk 101. This focusing error signal FE is fed back to the objective lens actuator of the optical pickup 102 via a focusing controller (not shown), so that the focusing error signal FE is controlled to be approximately zero.

In the state where the above-described focusing control has been performed, a tracking control (not shown) is performed so that the optical pickup 102 traces the tracks on the optical disk 101. Then, the information recorded on the optical disk 101 can be read out based on the reproduced signal RF.

However, if an error is caused in the orthogonal relationship between the optical disk 101 and the optical axis of the light beam 103 irradiated onto the optical disk 101, then the reproduced signal RF is erroneously identified more frequently. Therefore, a tilt servo operation is required to be performed for controlling so that the orthogonal relationship between the optical disk 101 and the optical axis of the light beam 103 irradiated onto the optical disk 101 is maintained.

Next, the tilt servo operation will be described. A tilt sensor 107 for detecting the orthogonal relationship between the optical disk 101 and the optical axis of the light beam 103 irradiated onto the optical disk 101 is mounted on the optical pickup 102. The tilt sensor 107 includes a light source such as a light-emitting diode for emitting light toward the optical disk 101 and a light-receiving element for receiving the light reflected by the optical disk 101. A signal output from the tilt sensor 107 is input to an orthogonality error detector 108, so that an orthogonality error signal is generated therefrom. The optical pickup 102 is mounted on a tilting mechanism 110. A tilt controller 109 makes the tilting mechanism 110 vary the tilt angle of the light beam to be irradiated onto the optical disk 101 with respect to the optical disk 101 based on the orthogonality error signal, thereby controlling so that the error in the orthogonal relationship becomes zero.

However, the conventional tilt control apparatus described above has the following problems. Specifically, in the case of performing a tilt servo operation using the tilt sensor 107, an error is adversely caused in the orthogonal relationship between the optical disk 101 and the optical axis of the light beam 103 irradiated onto the optical disk 101 in spite of the tilt servo operation if the characteristics of the tilt sensor 107 are varied because of the variation in the solid state properties thereof or if an error has been caused in assembling the devices.

That is to say, since an offset has been generated, a normal orthogonal relationship cannot he maintained even if the orthogonality error signal is zero. The offset of the orthogonality error signal must be adjusted to be a predetermined value or less for the respective devices during the assembly process, so that the production cost is disadvantageously increased.

In addition, if an output from the tilt sensor 107 is varied because of the degradation in the characteristics of the tilt censor 107 with the passage of time or the variation in the temperature, an offset is caused in the orthogonality error signal. As a result, an error is adversely caused in the orthogonal relationship between the optical disk 101 and the optical axis of the light beam 103 irradiated onto the optical disk 101 even if the tilt servo operation has been performed. As described above, if an error is caused in the orthogonal relationship, then the reproduced signal RF is erroneously identified more frequently, so that the recording and reproduction operations cannot be performed under optimal conditions any longer.

SUMMARY OF THE INVENTION

According to the present invention, a tilt control apparatus for controlling to minimize an error in an orthogonal relationship between an optical disk and an optical axis of a light beam irradiated onto the optical disk is provided. The tilt control apparatus includes: an optical pickup for irradiating the light beam onto the optical disk, thereby reproducing information recorded on the optical disk; orthogonality error detection means for outputting an orthogonality error signal corresponding to the error in the orthogonal relationship between the optical disk and the optical axis; tilting means for tilting the optical axis; tilt control means for controlling such that the optical disk falls at right angles with the optical axis by driving the tilting means in response to the orthogonality error signal; pulse width variation detection means for outputting a pulse width variation signal corresponding to a variation in a pulse width of an information reproduced signal obtained from the optical pickup; and target value variable means for varying a control target value of the tilt control means based on the pulse width variation signal.

In one embodiment, the target value variable means outputs a value of the orthogonality error signal when a value of the pulse width variation signal becomes minimum as the control target value to the tilt control means.

In another embodiment, the tilt control apparatus further includes timing generation means for generating a timing signal at a center level of an alternating current component of the orthogonality error signal and sampling means for sampling the pulse width variation signal based on the timing signal. In this apparatus, the target value variable means controls the control target value of the tilt control means so that a value of the sampled pulse width variation signal become minimum.

In still another embodiment, the timing generation means includes a high-pass filter for passing a high-frequency component of the orthogonality error signal and a digitizer for digitizing an output signal of the high-pass filter.

In still another embodiment, the target value variable means includes function approximation means for approximating a relationship between the orthogonality error signal and the pulse width variation signal with a function by making the tilting means tilt the optical axis with to respect to the optical disk, and wherein the target value variable means varies the control target value corresponding to the pulse width variation signal by using the function obtained by the function approximation means.

In still another embodiment, the target value variable means includes correction signal detection means for outputting a correction signal corresponding to a direction and an amount of the orthogonality error based on the orthogonality error signal and the pulse width variation signal.

In still another embodiment, the tilt control apparatus further includes disturbance signal generation means for generating a disturbance signal for driving the tilting means in a predetermined period. In this apparatus, the target value variable means includes correction signal detection means for outputting a correction signal corresponding to a direction and an amount of the orthogonality error based on the disturbance signal and the pulse width variation signal.

According to another aspect of the present invention, a tilt control apparatus for controlling to minimize an error in an orthogonal relationship between an optical disk and an optical axis of a light beam irradiated onto the optical disk is provided. The tilt control apparatus includes: an optical pickup for irradiating the light beam onto the optical disk, thereby reproducing information recorded on the optical disk; tilting means for tilting the optical axis; reproduction error detection means for outputting a bit error rate signal corresponding to a bit error rate of an information reproduced signal obtained from the optical pickup; disturbance signal generation means for generating a disturbance signal for driving the tilting means in a predetermined period; and target value variable means for varying a control target value of the tilting means in accordance with the bit error rate signal and the disturbance signal.

According to still another aspect of the present invention, a tilt control apparatus for controlling to minimize an error in an orthogonal relationship between an optical disk and an optical axis of a light beam irradiated onto the optical disk is provided. The tilt control apparatus includes: an optical pickup for irradiating the light beam onto the optical disk, thereby reproducing information recorded on the optical disk; orthogonality error detection means for outputting an orthogonality error signal corresponding to the error in the orthogonal relationship between the optical disk and the optical axis; tilting means for tilting the optical axis; tilt control means for controlling such that the optical disk falls at right angles with the optical axis by driving the tilting means in response to the orthogonality error signal; reproduction error detection means for outputting a bit error rate signal corresponding to a bit error rate of an information reproduced signal obtained from the optical pickup; and target value variable means for varying a control target value of the tilt control means based on the bit error rate signal.

In one embodiment, the target value variable means outputs a value of the orthogonality error signal when the bit error rate becomes minimum as the control target value to the tilt control means.

In another embodiment, the target value variable means sets the control target value at least once after the apparatus is turned on.

In still another embodiment, the target value variable means sets the control target value during recording or reproducing a signal.

In still another embodiment, the target value variable means sets the control target value in a case where the value of the pulse width variation signal exceeds a predetermined value during recording or reproducing a signal.

According to still another aspect of the present invention, a tilt control apparatus for controlling to minimize an error in an orthogonal relationship between an optical disk and an optical axis of a light beam irradiated onto the optical disk is provided. The tilt control apparatus includes: an optical pickup for irradiating the light beam onto the optical disk, thereby reproducing information recorded on the optical disk; tilting means for tilting the optical axis; pulse width variation detection means for outputting a pulse width variation signal corresponding to a variation in a pulse width of an information reproduced signal obtained from the optical pickup; disturbance signal generation means for generating a disturbance signal for driving the tilting means in a predetermined period; tilt control means for controlling such that the optical disk falls at right angles with the optical axis by driving the tilting means in response to the pulse width variation signal and the disturbance signal; and target value variation means for varying a control target value of the tilt control means based on the pulse width variation signal and the disturbance signal.

Thus, the invention described herein makes possible the advantage of providing a tilt control apparatus for always maintaining an orthogonal relationship between the information recording surface of an optical disk and the optical axis of a light beam, used for recording and reproducing information, which has been condensed and irradiated onto the optical disk by correcting an orthogonality error detected by a tilt sensor.

This and other advantages of the present invention will become apparent to those skilled in the art upon reading and understanding the following detailed description with reference to the accompanying figures.

BRIEF DESCRIPTION OF THE DRAWINGS

FIG. 12 is a table showing the states a to f shown in FIG. 11 by three bits (S1:S2:S3) in the first example of the present invention.

FIG. 20 is a flow chart showing the respective steps of the offset search processing in the third example of the present invention.

DESCRIPTION OF THE PREFERRED EMBODIMENTS

Figure 1:
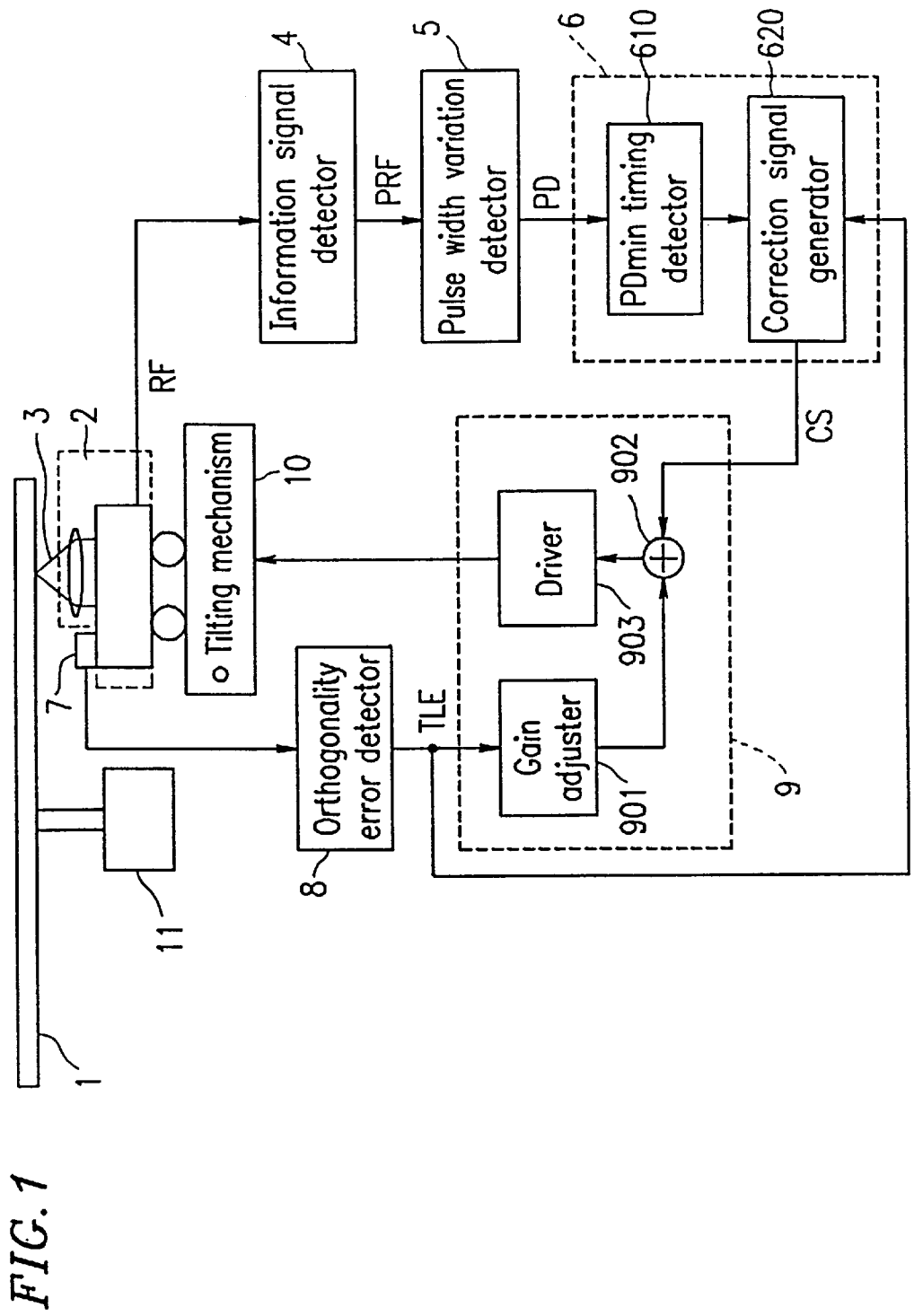
FIG. 1 is a block diagram showing a configuration for a tilt control apparatus in a first example of the present invention.

Hereinafter, a tilt control apparatus of the invention will be described by way of illustrative example with reference to the accompanying drawings. In the following description, the same components will be identified by the same reference numerals throughout the examples.

EXAMPLE 1

FIG. 1 is a block diagram showing a configuration for a tilt control apparatus in a first example of the present invention. An optical disk 1 is placed on a rotation axis of a spindle motor 11. An optical pickup 2 includes: a light-emitting element such as a laser; an objective lens; and an actuator and irradiates a condensed light beam 3 onto the optical disk 1. The actuator drives the objective lens in the direction of the optical axis of the light beam 3. The optical pickup 2 further includes a light-receiving element for outputting an information reproduced signal RF and servo signals including a focusing error signal and a tracking error signal. The light-receiving element of the optical pickup 2 receives the light beam 3 which is reflected by the information recording surface of the optical disk 1 and then incident thereon, thereby outputting the information reproduced signal RF corresponding to the information recorded on the optical disk 1.

An information signal detector 4 receives the information reproduced signal RF output from the optical pickup 2 and digitizes the input information reproduced signal RF with an appropriate threshold value. Then, the information signal detector 4 outputs the digitized information reproduced signal RF as an RF pulse signal PRF to a pulse width variation detector 5.

The pulse width variation detector 5 compares the phase of the RF pulse signal PRF with the phase of a clock used as a reference for reproduction (hereinafter, such a clock will be referred to as a "reproduction reference clock"), thereby phase-lock controlling so that the phases of these signals have a predetermined relationship (or the phases of these signals are in a synchronized state). As a result, the pulse width variation detector 5 detects a difference between an edge of the RF pulse signal PRF and an edge of the reproduction reference clock. In other words, the pulse width variation detector 5 detects by what amount the pulse width of the input RF pulse signal PRF is larger or smaller than the pulse width of an RF pulse signal having an ideal pulse width, thereby outputting an electric signal corresponding to the amount of the difference between the two edges, i.e., a pulse width variation signal PD.

In accordance with the values of the pulse width variation signal PD and an orthogonality error signal TLE to be described later, a target value variable circuit 6 outputs a correction signal ΔTLE for varying the target value of the tilt servo operation to a tilt controller 9 to be described later. A tilt sensor 7 outputs a signal corresponding to the error amount from the state where the optical disk 1 falls at right angles with the optical axis of the light beam 3 irradiated onto the optical disk 1 (hereinafter, the error will be simply referred to as an "orthogonality error"). An orthogonality error detector 8 receives a signal output from the tilt sensor 7 so as to output the orthogonality error signal TLE to the tilt controller 9. The "orthogonality error" herein refers to an error from the state where the surface of the optical disk 1 falls at right angles with the light beam 3.

Figure 2:
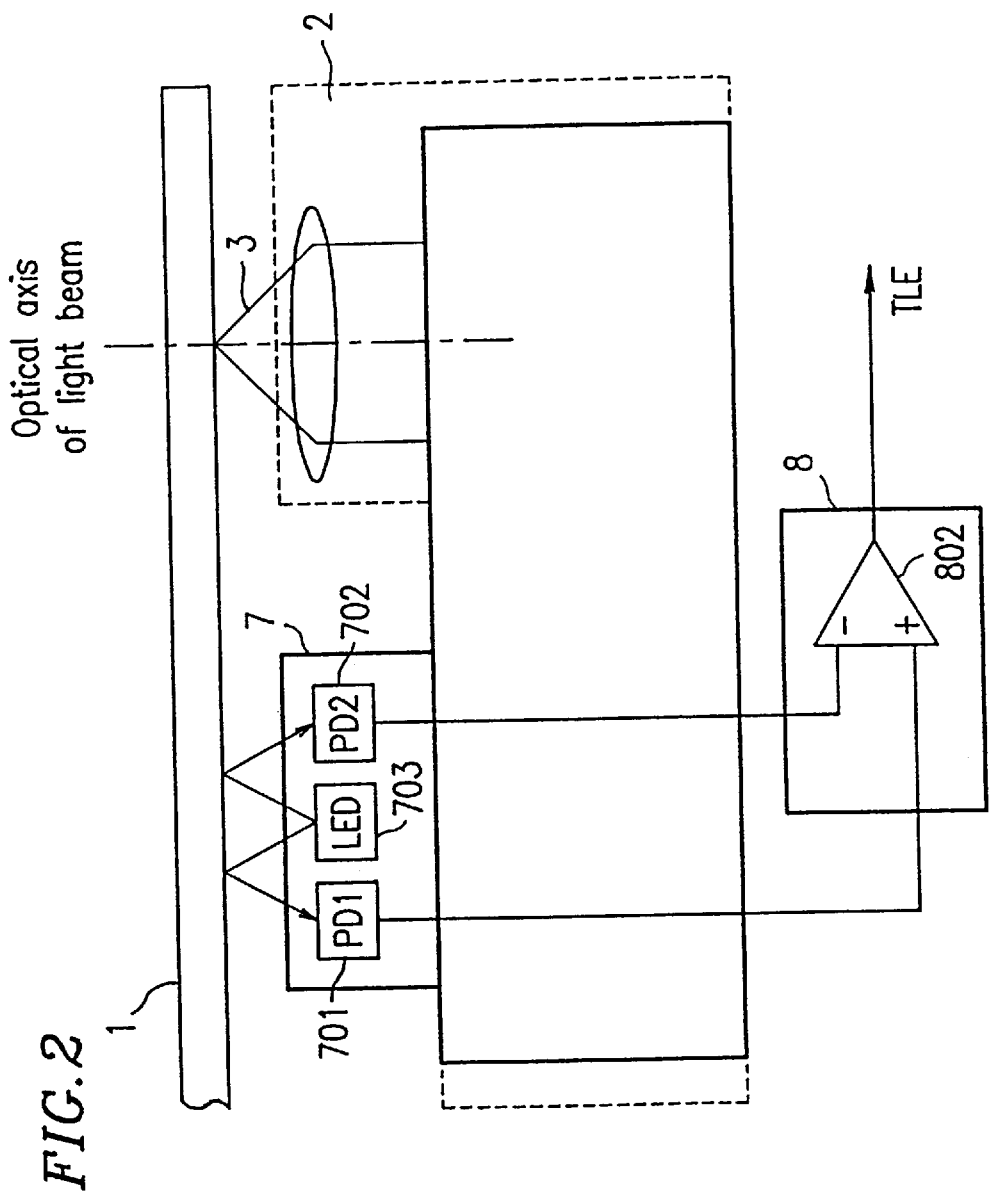
FIG. 2 shows internal configurations for a tilt sensor 7 and an orthogonality error detector 8 in the first example of the present invention.

FIG. 2 shows internal configurations for the tilt sensor 7 and the orthogonality error detector 8. The tilt sensor 7 includes two photodetectors (PD1 and PD2) 701 and 702 and a light-emitting diode (LED) 703. The light emitted from the LED 703 is reflected by the surface of the optical disk 1 so as to be incident onto the photodetectors 701 and 702. Each of the photodetectors 701 and 702 outputs a signal having a voltage corresponding to the intensity of the incident light. The orthogonality error detector 8 has a differential amplifier 802. The differential amplifier 802 receives the signals output from the photodetectors 701 and 702 via a non-inverted input terminal and an inverted input terminal thereof, respectively, and then outputs a signal having a voltage difference between these two signals from the output terminal thereof as an orthogonality error signal TLE. In the case where the optical axis of the light beam 3 falls at right angles with the information recording surface of the optical disk 1, the voltages of the signals output from the photodetectors 701 and 702 are ideally equal to each other, so that the level of the orthogonality error signal TLE becomes zero. On the other hand, in the case where the axis does not fall at right angles with the surface, e.g., in the case where the optical pickup 2 is tilted with respect to the optical disk 1 so that the intensity of the light incident onto the photodetectors 701 is higher than that of the light incident onto the photodetector 702, the orthogonality error signal TLE has a positive voltage. In the case where the optical pickup 2 is tilted to the opposite direction, the orthogonality error signal TLE has a negative voltage.

A tilting mechanism 10 varies the tilt angle formed between the optical disk 1 and the optical axis of the light beam 3 irradiated onto the optical disk 1. In the following examples, it is assumed that the tilt of the optical disk 1 in the radial direction (i.e., a so-called "radial tilt") thereof is varied by driving the tilting mechanism 10. In response to the orthogonality error signal TLE and a correction signal ΔTLE, the tilt controller 9 controls the tilting mechanism 10 thereby maintaining the orthogonal relationship between the optical disk 1 and the optical axis of the light beam 3 irradiated onto the optical disk 1.

Figure 3:
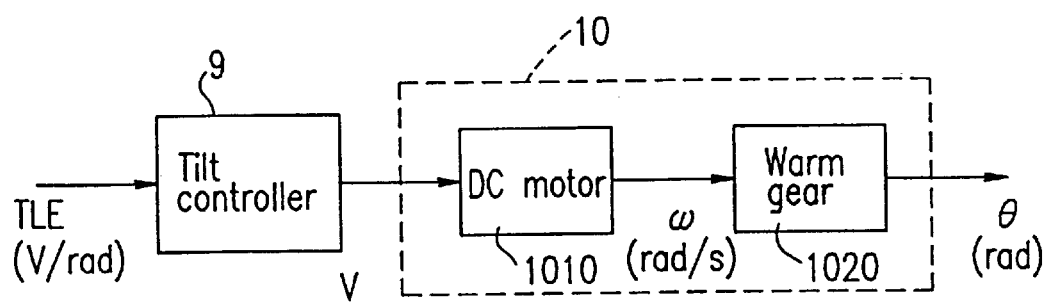
FIG. 3 is a block diagram illustrating the operations of the tilt controller 9 and the tilting mechanism 10 in the first example of the present invention.

FIG. 3 illustrates the operations of the tilt controller 9 and the tilting mechanism 10. The tilt controller 9 receives the orthogonality error signal TLE and then outputs a signal V (=K2 (K1·TLE−CS), where K1 is a gain of a gain adjuster 901 and K2 is a gain of a driver 903). The tilting mechanism 10 includes a DC motor 1010 and a warm gear 1020. The DC motor 1010 drives the warm gear 1020 at an angular velocity ω (ω=K3·V, where K3 is a constant) in response to the signal V. The warm gear 1020 tilts the optical pickup 2 by an angle θ (θ=K4·ω, where K4 is a constant).

Hereinafter, the operation of the tilt control apparatus of the first example of the present invention will be described. First, the focusing error signal FE output from the optical pickup 2 is fed back to the objective lens actuator of the optical pickup 2 via a focusing controller (not shown). As a result, the distance between the focal point of the light beam 3 emitted through the objective lens and the information recording surface of the optical disk 1 can be kept substantially constant.

In the state where the above-described focusing control has been performed, a tracking control (not shown) is performed so that the light beam 3 traces the tracks on the optical disk 1. Then, the information recorded on the optical disk 1 can be reproduced based on the information reproduced signal RF.

If an error is caused in the orthogonal relationship, then the tilting mechanism 10 is driven by the tilt controller 9 by the amount corresponding to that of the orthogonality error signal TLE output from the orthogonality error detector 8. As a result, the tilt formed between the information recording surface of the optical dick 1 and the optical axis of the light beam 3 irradiated onto the optical disk 1 is varied, and a feedback control is performed do that the orthogonality error signal TLE finally becomes zero.

However, if an error is caused during the assembly of the devices, the characteristics of the tilt sensor 7 are degraded with the passage of time or owing to the variation in the temperature as mentioned above, then the optical disk 1 does not fall at right angles with the optical axis of the light beam 3 irradiated onto the optical disk 1 even if the orthogonality error signal TLE has been controlled to be zero.

Therefore, the tilt control apparatus of the invention searches for an optimum point usable as the target value for the tilt servo control when the apparatus is turned on or during the recording and reproducing operations.

Figure 4:
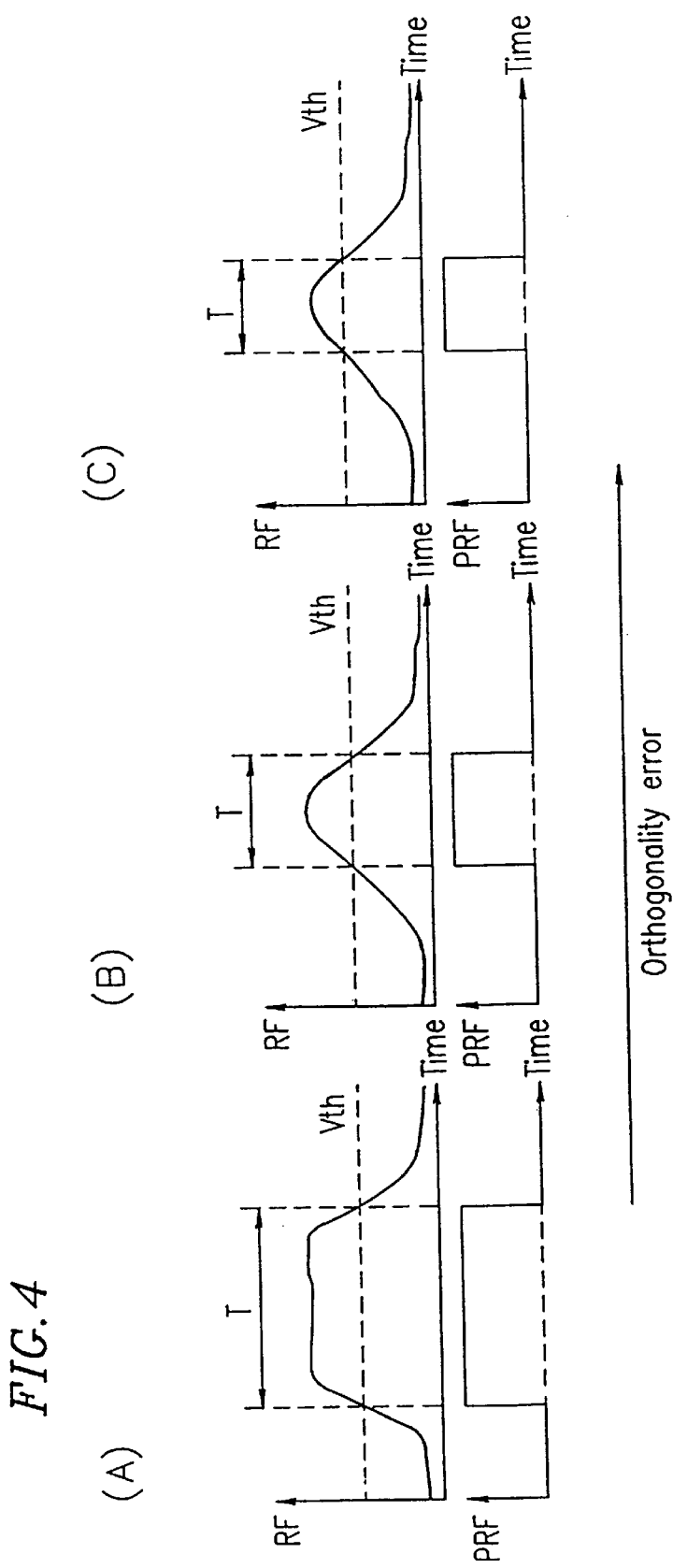
FIG. 4 (including subparts A–C) is a waveform chart showing the waveforms of a reproduced signal RF and an RF pulse signal PRF with respect to the amount of the orthogonality error in the first example of the present invention.

FIG. 4 is a waveform chart showing the waveforms of the reproduced signal RF and the RF pulse signal PRF with respect to the amount of the orthogonality error. When the condensed light beam 3 emitted from the optical pickup 2 scans information pits formed on the information recording surface of the optical disk 1, the reproduced signal RF shown in (A) in FIG. 4 is output from the optical pickup 2 and then digitized by the information signal detector 4 using a potential Vth as a threshold value, so that the RF pulse signal PRF is generated therefrom. In this case, if there is no error in the above-described orthogonal relationship, then the pulse width of the RF pulse signal PRF becomes equal to a predetermined length T. The length X generally corresponds to a length N (an integer) times as long as that of the period of a reference clock signal for the information recorded on an optical disk 1. On the other hand, if some error in caused in the orthogonal relationship, the waveform of the RF pulse signal PRF is varied into the waveform shown in (B) in FIG. 4. The reason is as follows. When the error is caused in the orthogonal relationship, the shape of the light, which is reflected by the optical disk 1 and then incident onto a photodetector (not shown) provided on the optical pickup 2 for detecting a servo signal and a reproduced signal, is varied, so that the quality of the reproduced signal RF is degraded. Furthermore, an offset is caused in the servo signals such as a focusing error signal and a tracking error signal, so that the quality of tile reproduced signal RF is also degraded. The larger the orthogonality error becomes, the worse the quality of the reproduced signal RF becomes. As a result, the pulse width of the RF pulse signal PRF is further varied (in this case, the pulse width of the RF pulse signal PRF is decreased) as shown in (C) in FIG. 4. Therefore, if the variation in the pulse width is measured, then an amount corresponding to the orthogonality error can be detected.

Next, a method for measuring the pulse width of the RF pulse signal PRF in the pulse width variation detector 5 will be described.

Figure 5:
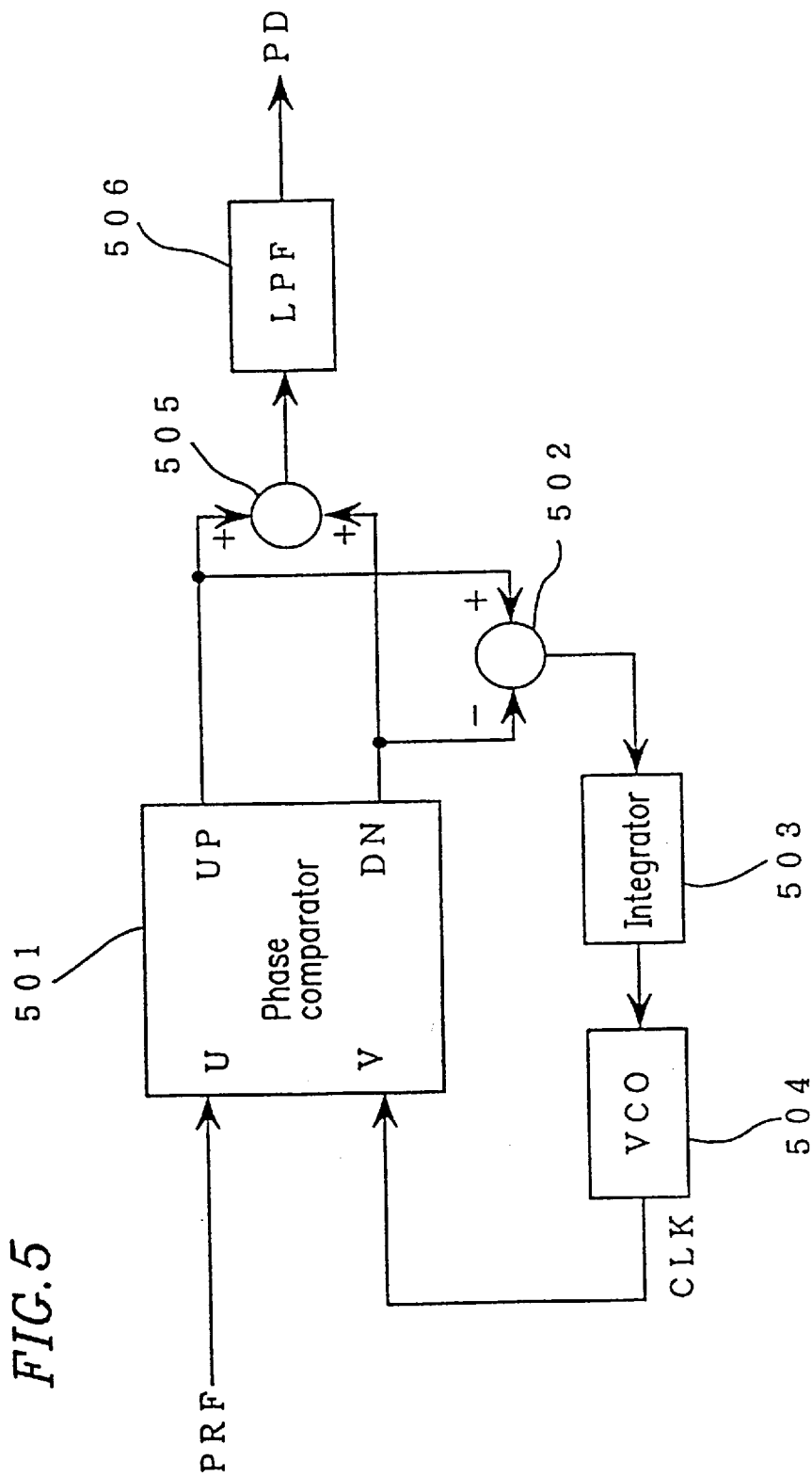
FIG. 5 is a block diagram showing a configuration for a pulse width variation detector 5 in the first example of the present invention.

FIG. 5 is a block diagram showing a configuration for the pulse width variation detector 5 in the first example. A phase comparator 501 detects a phase difference of the RF pulse signal PRF with respect to a clock signal CLK output from a voltage control oscillator (VCO) 504. More specifically, the phase comparator 501 outputs pulses, each having a pulse width corresponding to a phase difference, from output terminals UP and DN, respectively, depending upon whether the phase of the RF pulse signal PRF has a lead or a lag with respect to the phase of the clock signal CLK. A differential circuit 502 calculates the difference between the pulse signals UP and DN output from the phase comparator 501, thereby outputting the difference to an integrator 503. The integrator 503 integrates the difference between these signals so as to output the integrated value to the VCO 504. The VCO 504 outputs a clock signal CLK having a frequency corresponding to the output of the integrator 503 to the phase comparator 501. An adder 505 calculates the sum of the pulse signals UP and DN output from the phase comparator 501 and then outputs the sum to a low-pass filter (LPF) 506. The LPF 506 outputs the lower frequency component of the input signal as a pulse width variation signal PD.

Figure 6:
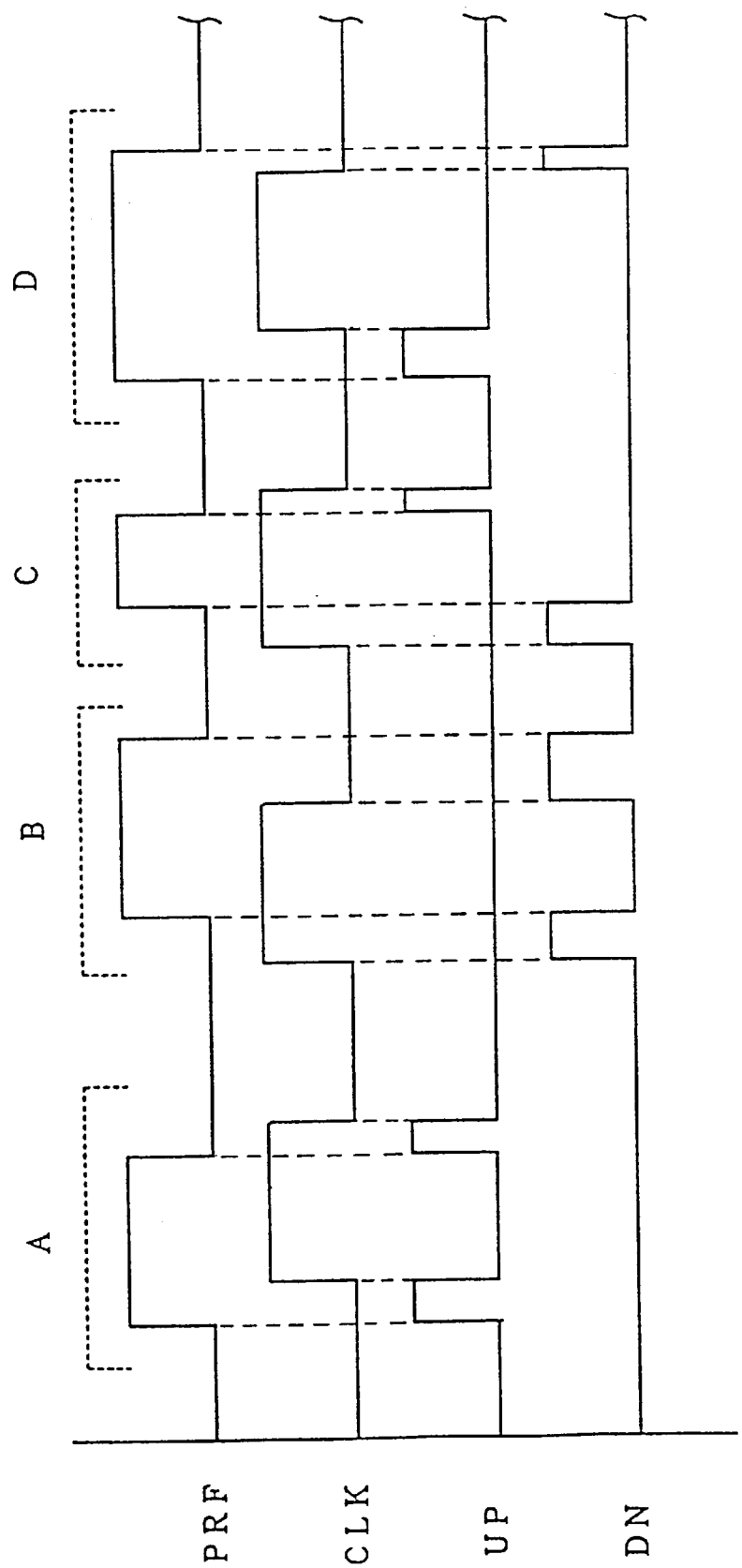
FIG. 6 is a waveform chart showing the timings of the RF pulse signal PRF, the clock signal CLK and the pulse signals UP and DN in the first example of the present invention.

Hereinafter, the operation of the pulse width variation detector 5 will be described with reference to FIG. 6. FIG. 6 is a waveform chart showing the timings of the RF pulse signal PRF, the clock signal CLK and the pulse signals UP and DN. In actuality, in the case of performing an eight to fourteen modulation (EFM) for example, the pulse width of one shortest pulse of the RF pulse signal PRF generally corresponds to that of three pulses of the clock signal CLK output from the VCO 504. However, in the following explanation referring to FIG. 6, the pulse width of the RF pulse signal PRF is assumed to be equal to the pulse width of the clock signal CLK for simplification.

The phase comparator 501, the differential circuit 502, the integrator 503 and the VCO 504 constitute a phase looked loop (PLL). First, the phase comparator 501 outputs the pulse signals UP and DN each corresponding to the phase difference between the RF pulse signal PRF and the clock signal CLK as shown in FIG. 6. That is to say, in the case where the RF pulse signal PRF has a lead to the clock signal CLK at a leading edge (or positive edge) and a trailing edge (or negative edge), a pulse signal UP having a width corresponding to the lead is output as indicated by A in FIG. 6. On the other hand, in the case where the former has a lag to the letter, a pulse signal DN having a width corresponding to the lag is output as indicated by B in FIG. 6. The phase lead and the phase lag are transformed by the differential circuit 502 into a positive pulse signal and a negative pulse signal, respectively. Then, these signals are accumulated and added by the integrator 503. The VCO 504 generates a clock signal CLK having a frequency corresponding to the voltage of the added signal and then feeds back the signal CLK to the phase comparator 501. As a result, the clock signal CLK can be controlled so that an average phase difference between the clock signal CLK and the RF pulse signal PRF becomes zero.

If the pulse width is not varied, the pulse signals UP and DN have no pulse corresponding to the phase difference (or remain at zero level) an the result of the feedback. Herein, the pulse width of the RF pulse signal PRF is assumed to be smaller than that of the clock signal CLK as indicated by C in FIG. 6. In such a case, the pulse signal DN is generated at the leading edge of the clock signal CLK and the pulse signal UP is generated at the trailing edge of the RF pulse signal PRF. To the contrary, the pulse width of the RF pulse signal PRF is assumed to be larger than that of the clock signal CLK as indicated by D in FIG. 6. In such a case, the pulse signal UP in generated at the leading edge of the RF pulse signal PRF and the pulse signal DN is generated at the trailing edge of the clock signal CLK.

As described above, the frequency and the phase of the clock signal CLK are controlled by the PLL so that an average phase difference between the inputs U and V to the phase comparator 501 becomes zero. Therefore, in the case where the pulse width of the RF pulse signal PRF is varied, pulses having the same width are output as the pulse signals UP and DN. As a result, only the variable components of the pulse width are output from the adder 505. The LPF 506 smooths the variable components of the pulse width, thereby outputting a signal converted into a DC voltage as a pulse width variation signal PD.

Figure 7:
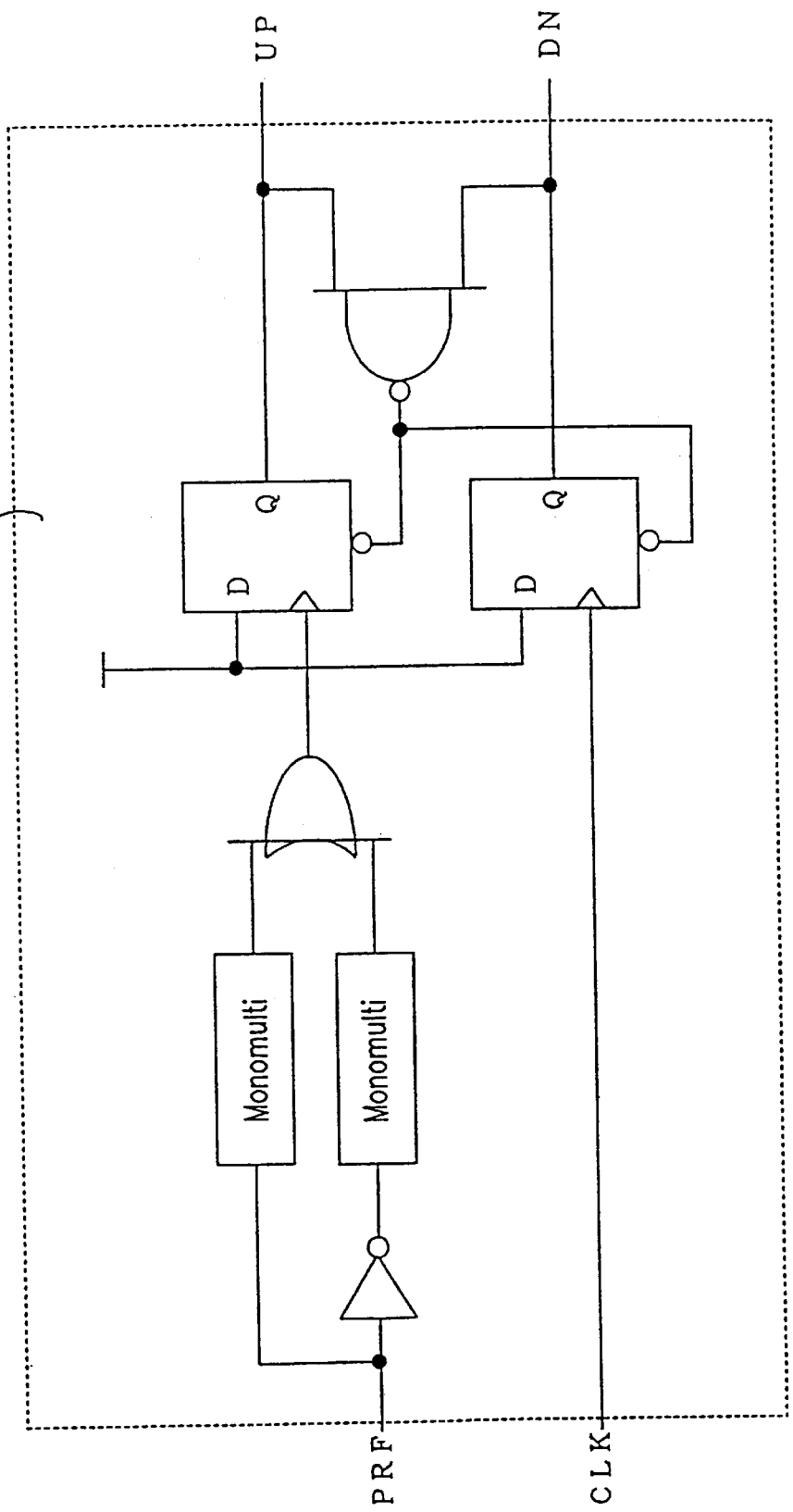
FIG. 7 is a block diagram showing an internal configuration for a phase comparator 501 in the first example of the present invention.

FIG. 7 shows an internal configuration for the phase comparator 501. The leading edge and the trailing edge of the RF pulse signal PRF are detected by mono-multies, respectively. A circuit in which a flip-flop is set by the signal edge of the earlier one of these edge signals and the clock signal CLK and reset by the signal edge of the later one may be used for example. Alternatively, a circuit finally having the differential output and the sum output of the pulse signals UP and DN, or a circuit having (UP−DN) and (UP+DN) as output terminals may also be used. (UP+DN) alone can be directly realized by an exclusive-or, for example. However, in order to obtain both (UP−DN) and (UP+DN) under a relatively simple configuration, it is more preferable to use a circuit which can output the pulse signals UP and DN independently. It is noted that it is sufficient for the phase comparator 501 to include these functions. Therefore, the phase comparator 501 may have a different internal circuit configuration.

Next, a circuit and a method for searching for a tilt servo target value for realizing an orthogonal relationship between the optical disk and the optical axis of the light beam irradiated onto the optical disk will be described.

Figure 8:
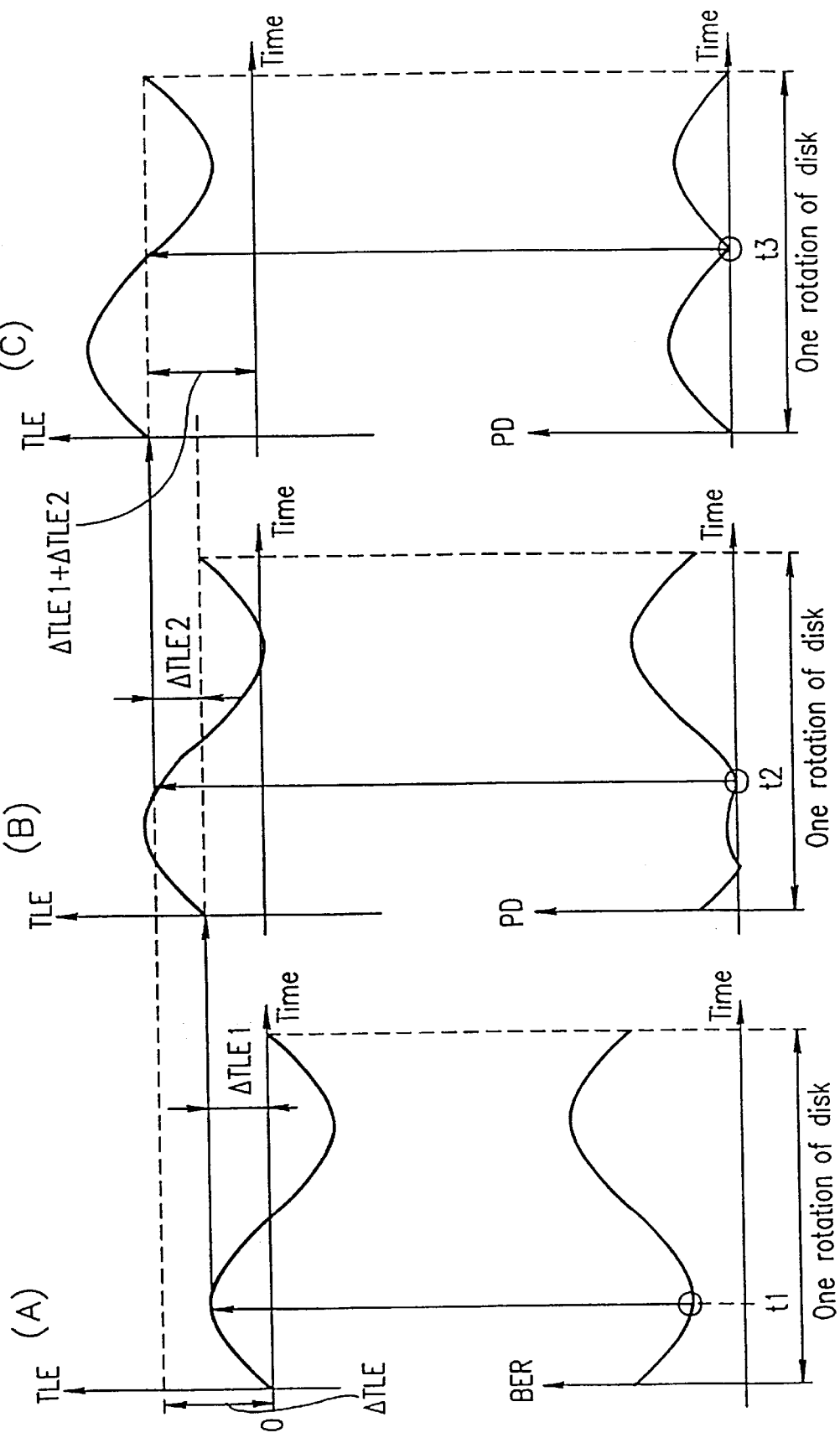
FIG. 8 (including subparts A–C) showing a relationship between an orthogonality error signal TLE and a pulse width variation signal PD during the search for the tilt servo target value in the first example of the present invention.

FIG. 8 shows a relationship between the orthogonality error signal TLE and the pulse width variation signal PD during the search for the tilt servo target value. In FIG. 8, when the orthogonality error signal TLE has an offset value $\Delta$TLE, the optical disk falls at right angles with the optical axis of the light beam irradiated onto the optical disk. In general, the orthogonality error signal TLE is cyclicly varied in accordance with the rotation of an optical disk or the "warp" of the optical disk itself as shown in (A) to (C) in FIG. 8. In actuality, even when the tilt servo operation is performed in the state where the correction signal CS output from the target value variable circuit 6 is zero, AC (alternating current) tilt components having too high frequency components to be traced by the tilt servo still remain in the orthogonality error signal TLE. In this case, the orthogonality error signal TLE is controlled so that the average, value of the cyclic variation becomes zero.

In the case where the offset $\Delta$TLE is larger than the amplitude of the AC tilt component as shown in (A) in FIG. 8, the value of the pulse width variation signal PD becomes minimum at either one of the two peaks of the orthogonality error signal TLE. A $PD_{min}$ timing detector 610 of the target value variable circuit 6 generates a sampling pulse at a timing at which the value of the pulse width variation signal PD becomes minimum. As shown in (A) in FIG. 8, the $PD_{min}$ timing detector 610 generates a sampling pulse at a time t1 and then outputs the sampling pulse to a correction signal generator 620. The correction signal generator 620 samples the orthogonality error signal TLE at the timing of the sampling pulse output from the $PD_{min}$ timing detector 610. In (A) shown in FIG. 8, the orthogonality error signal TLE having a value of $\Delta$TLE1 is sampled at the time t1. The correction signal generator 620 outputs a correction signal CS having a value of $\Delta$TLE1 to the tilt controller 9.

A gain adjuster 901 of the tilt controller 9 receives the orthogonality error signal TLE, amplifies the orthogonality error signal TLE by an amount required for a feedback control, and then outputs the amplified signal to an adder 902. Herein, the gain of the gain adjuster 901 is assumed to be "1" (or the level of an input signal to the gain adjuster 901 is equal to the level of an output signal therefrom) for simplification. The adder 902 adds the correction signal CS and the signal output from the gain adjuster 901 and then outputs the sum to a driver 903. The driver 903 drives the tilting mechanism 10. The correction signal CS having a value of $\Delta$TLE1 is added to the orthogonality error signal TLE. As a result, the feedback loop is controlled so that the average value of the orthogonality error signal TLE becomes $\Delta$TLE1 as shown in (B) in FIG. 8. A difference $\Delta$TLE2 between an expected value of the orthogonality error signal TLE, i.e., an offset value $\Delta$TLE, when the optical disk falls at right angles with the optical axis of the light beam (or when the orthogonality error is zero) and a center value $\Delta$TLE1 of the variation in the orthogonality error signal TLE in (B) in FIG. 8 becomes: $\Delta$TLE2=$\Delta$TLE−$\Delta$TLE1.

If the offset $\Delta$TLE is located within the amplitude of the AC tilt component of the orthogonality error signal TLE (or between the two peak values) as shown in (B) in FIG. 8, the value of the pulse width variation signal PD becomes minimum at a time, e.g., a time t2, when the information recording surface of the optical disk 1 falls at right angles with the optical axis of the light beam 3. In the vicinity of the time t2, the curve of the pulse width variation signal PD is varied in a turnup shape.

The $PD_{min}$ timing detector 610 generates a sampling pulse again at a time at which the value of the pulse width variation signal PD becomes minimum. As shown in (B) in FIG. 8, the $PD_{min}$ timing detector 610 generates a sampling pulse again at a time t2 and then outputs the sampling pulse to the correction signal generator 620. The correction signal generator 620 samples an orthogonality error signal TLE having an offset value $\Delta$TLE (=$\Delta$TLE1+$\Delta$TLE2) at the time t2. The correction signal generator 620 outputs a correction signal CS having an offset value $\Delta$TLE to the tilt controller 9.

The sampled offset value $\Delta$TLE is added to the orthogonality error signal TLE. As a result, as shown in (C) in FIG. 8, the orthogonal relationship between the optical disk 1 and the optical axis of the light beam 3 is satisfied at a center position of the cyclic variation of the orthogonality error signal TLE.

As is obvious from the foregoing description, the offset $\Delta$TLE can be cancelled by sampling the orthogonality error signal TLE twice at the timings at which the value of the pulse width variation signal PD becomes minimum. The larger the difference between the amplitude of the AC tilt component of the orthogonality error signal TLE and the offset $\Delta$TLE is, the more times the sampling is required to be performed.

If the correction represented by the following Equation (1) is steadily performed during the operation of the recording and reproducing apparatus, the orthogonality error can be reduced to zero even if an error is caused in the tilt sensor because of the variation in the temperature of the sensor after the apparatus is turned on or owing to the degradation of the characteristics of the sensor with the passage of time.

$$\Delta TLEi = \Delta TLEi-1 + \Delta TLEx \qquad (1)$$

where $\Delta$TLEi−1 and $\Delta$TLEi denotes the correction offset amount of an (i−1)th (or previous) processing and the correction offset amount of an i-th (or current) processing, respectively, and $\Delta$TLEx denotes the amount of the correction offset newly applied in the current processing. In (B) in FIG. 8, for example, ΔTLEi, ΔTLEi−1 and ΔTLEx correspond to ΔTLE, ΔTLE1 and ΔTLE2, respectively.

In the foregoing description, the target position of the tilt control is set by the application of an offset ΔTLE to the tilt controller 9 in the first example. Hereinafter, it will be described how the tilt control apparatus operates when the offset ΔTLE is applied at respectively different points to the feedback control loop.

Figure 9:
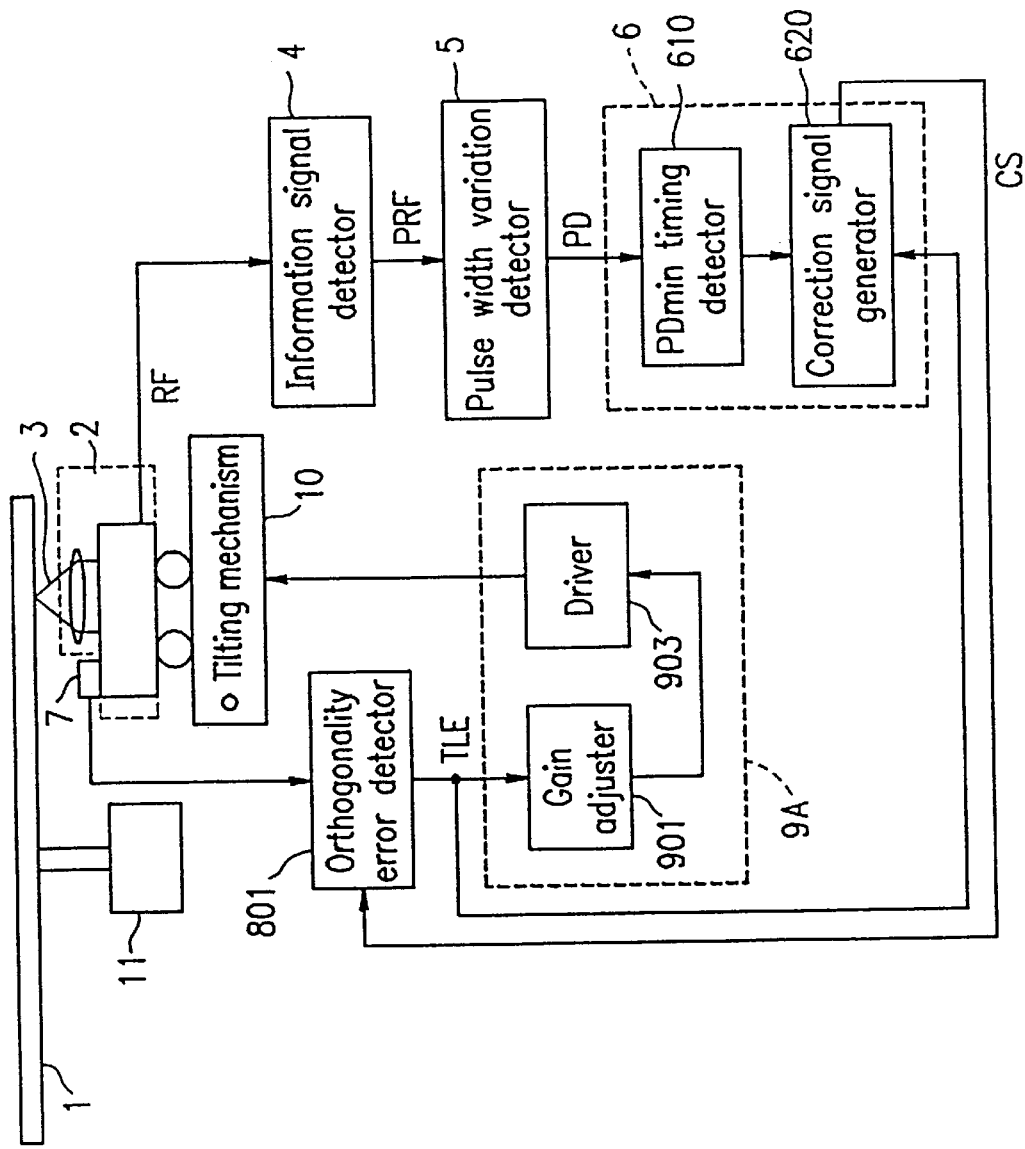
FIG. 9 shows a modified configuration for the tilt control apparatus of the first example in which a target value of the tilt control is varied by adjusting a gain balance in an orthogonality error detector 801 to which a correction signal CS is supplied.

FIG. 9 shows a modified configuration for the tilt control apparatus of the first example in which the target value of the tilt control is varied by adjusting the gain balance in the orthogonality error detector 801 to which a correction signal CS is supplied. This tilt control apparatus is different from the tilt control apparatus shown in FIG. 1 in that the orthogonality error detector 801 receives the correction signal CS output from the target value variable circuit 6.

Figure 10:
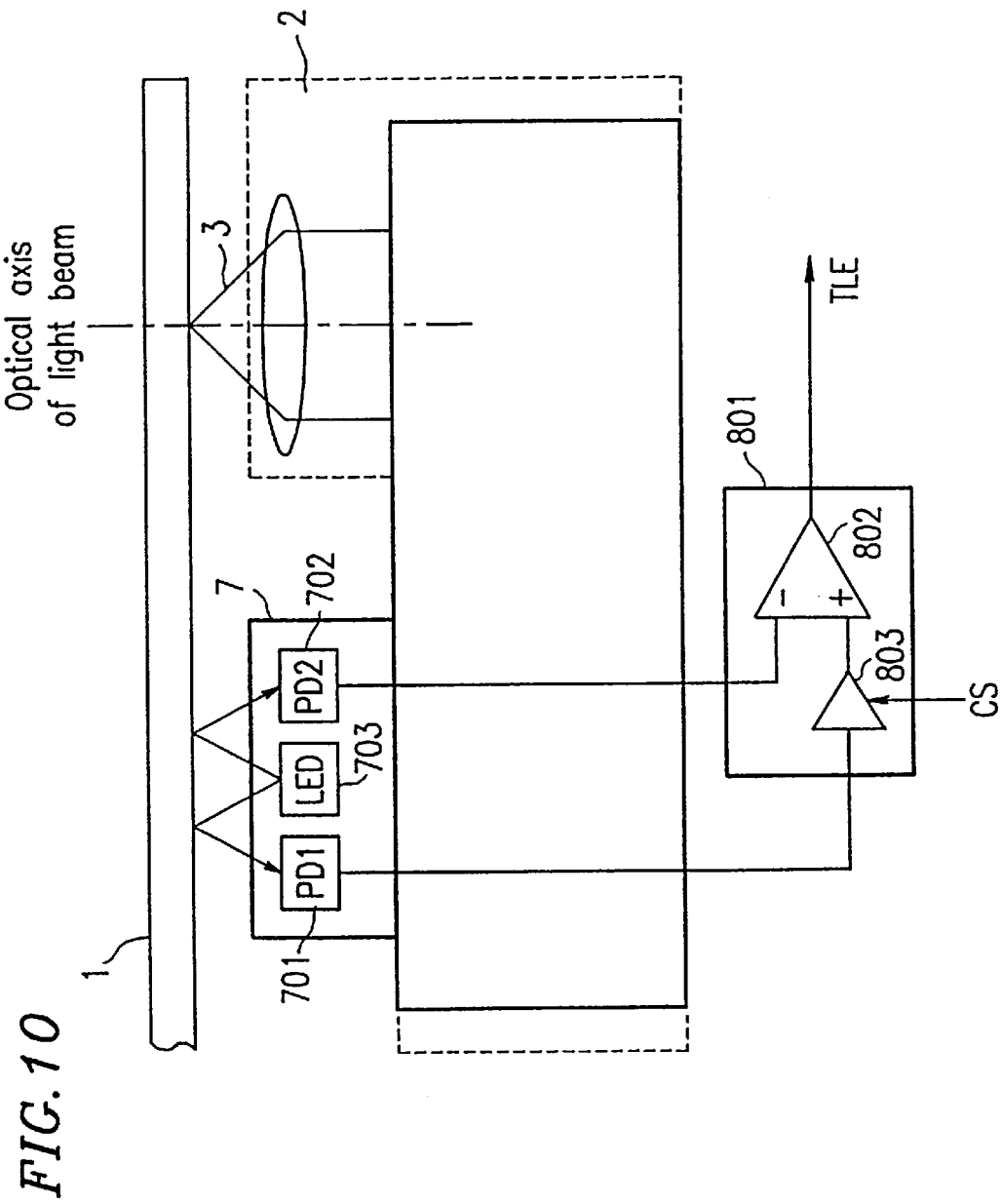
FIG. 10 shows internal configurations for the tilt sensor 7 and the orthogonality error detector 801 in the first example of the present invention.

FIG. 10 shows internal configurations for the tilt sensor 7 and the orthogonality error detector 801. The orthogonality error detector 801 has a differential amplifier 802 and a variable amplifier 803 connected to a non inverted input terminal of the differential amplifier 802. The variable amplifier 803 receives a signal output from the photodetector 701 through the input terminal thereof and receives the correction signal CS output from the target value variable circuit 6 through the gain control terminal thereof. The variable amplifier 803 amplifies the input signal with a gain corresponding to the level of the correction signal CS input through the gain control terminal and then outputs the amplified signal to the non-inverted input terminal of the differential amplifier 802. As a result, the gain balance of the signals output from the photodetectors 701 and 702 of the tilt sensor 7 can be adjusted in accordance with the correction signal CS. In this configuration, the orthogonality error detector 801 varies the target value of the tilt control by adjusting the gain balance in differentially amplifying the output signals from the tilt sensor 7.

Referring to FIG. 9 again, the tilt controller 9A drives the tilting mechanism 10 in response to the orthogonality error signal TLE, the control target value of which has been corrected by the correction signal CS. As a result, in the same way as the case shown in FIG. 1, it is possible to perform a control for reducing the orthogonality error to zero.

A tilt control in which a target value is varied has been described. However, the method for performing a tilt control is not limited to this exemplary method. It is not always necessary to add the correction signal CS to the feedback loop so long as a steadily existing offset value ΔTLE can be applied to the feedback loop.

In the method of the first example, an orthogonality position can be searched for with high precision by detecting an orthogonality error with high sensitivity and then correcting the error.

Figure 11:
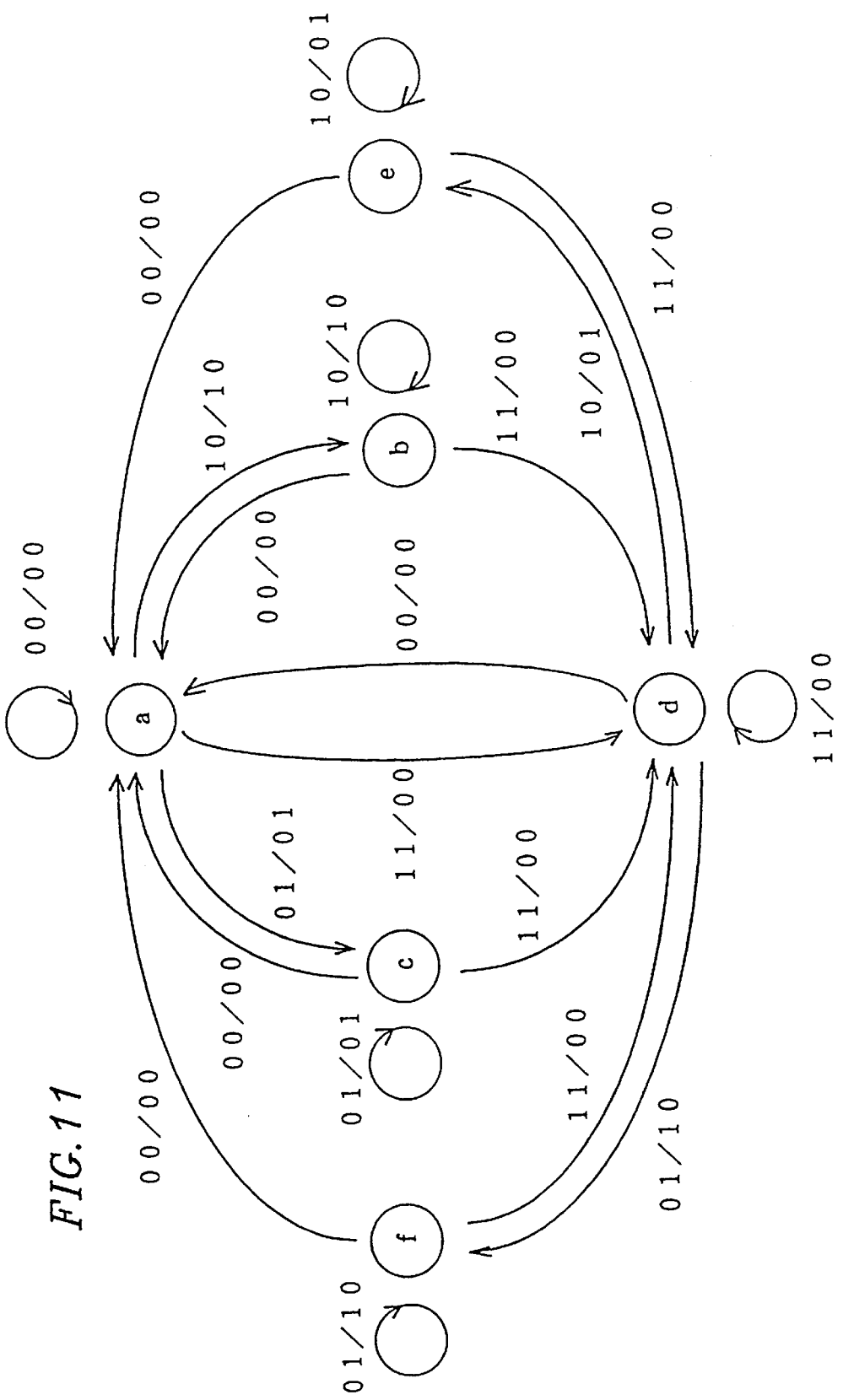
FIG. 11 shows the transitions of the states of the phase comparator of the pulse width variation detector 5 in the first example of the present invention.

Next, another exemplary pulse width variation detector 5 will be described with reference to FIG. 11. FIG. 11 is a diagram showing the state transitions of the phase comparator of the pulse width variation detector 5. The phase comparator exhibiting the state transitions shown in FIG. 11 operates in the same way as the phase comparator 501, a component of the pulse width variation detector 5 shown in FIG. 5. In FIG. 11, a, b, o, d, e and f are nodes indicating the respective states. The numerals shown in FIG. 11 are represented in the order of "U, V/UP, DN". For example, "11/00" means that U=1, V=1, UP=0, and DN=0. Herein, "0" denotes a low level (L) and "1" denotes a high level (H). The flow of this state transition diagram will be illustrated with the period A shown in FIG. 6, for example. The state a is a state where both inputs U and V are (L). In this Case, nothing is output. When the input U(PRF) rises in advance, the output UP becomes (H) (i.e., U:V/UP:DN=10/10), so that the state transits to the state b. Next, when the input V(CLK) rises, the output UP becomes 0 (i.e., U:V/UP:DN= 11/00), so that the state transits to the state d. The rise of the output UP to (H) during the state b means the output of a phase is lead pulse at the leading edge. The state c means the output of a phase lag pulse and the states e and f mean the output of a phase lead pulse and a phase lag pulse at the trailing edge, respectively.

The state transitions shown in FIG. 11 are realized by designing a logic circuit realizing the state transition diagram. FIG. 12 is a table showing the states a to f shown in FIG. 11 by three bits (S1:S2:S3). If two lower bits (S2:S3) can correspond to the outputs UP and DN as follows, the circuit structure can be simplified. The logic operations for realizing the state transitions can be represented by the following Equations (2), (3) and (4) based on FIG. 12.

$$S1 = U \cdot S1 + V \cdot S1 + U \cdot V \cdot !S1 \tag{2}$$

$$S2 = U \cdot !V \cdot !S1 + !U \cdot V \cdot S1 \tag{3}$$

$$S3 = !U \cdot V \cdot !S1 + U \cdot !V \cdot S1 \tag{4}$$

Herein, "!V" denotes "NOT" (negative) of V. In the same way, "!U" denotes "NOT" of U and "!S" denotes "NOT" of S. In such a case, the output UP can be represented by Equation (5) and the output DN can be represented by Equation (6).

$$UP = S2 \tag{5}$$

$$DN = S3 \tag{6}$$

The phase comparator having the above-described logical structure is characterized in that the phase comparator can be embodied in a simplified logical structure consisting of simple logic circuits alone without detecting the leading and trailing edges using mono-multies as in the case shown in FIG. 7.

Figure 13:
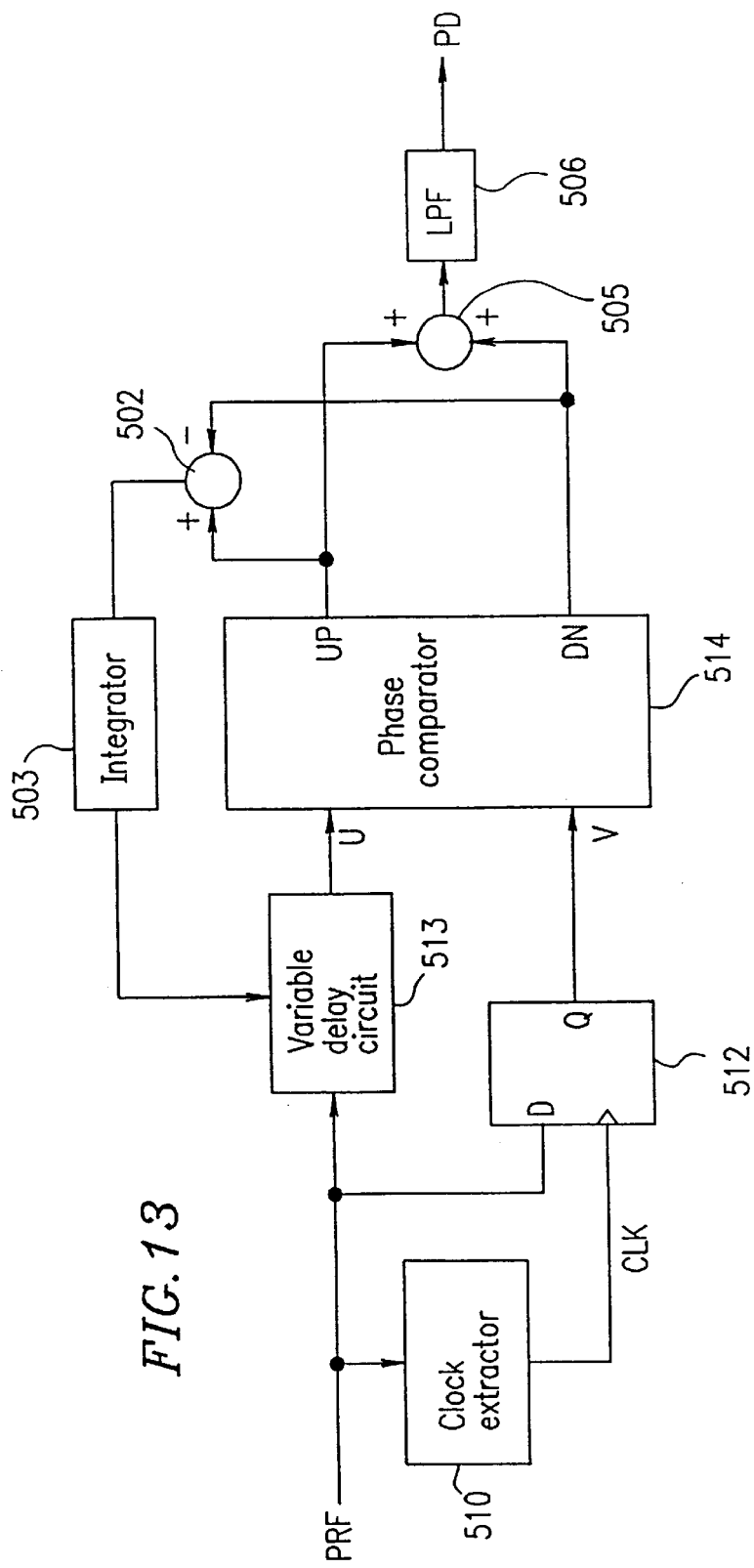
FIG. 13 is a block diagram showing still another configuration for the pulse width variation detector in the first example of the present invention.

A still another exemplary pulse width variation detector will be described with reference to FIG. 13. FIG. 13 is a block diagram showing still another configuration for the pulse width variation detector. The differential circuit 502, the integrator 503, the adder 505 and the low-pass filter (LPF) 506 operate in the same way as those shown in FIG. 5. A clock extractor 510 extracts a clock signal CLK from the RF pulse signal PRF. A D flip-flop (or latch) 512 latches the leading edge and the trailing edge of the RF pulse signal PRF at the timing of the edge of the clock signal CLK. A variable delay circuit 513 delays the RF pulse signal PRF in accordance with the output voltage of the integrator 503. The phase comparator 514 operates in the same way as that shown in FIG. 11.

The operation of the pulse width variation detector having the above-described configuration will be described. First, since the phase comparator realizing the phase transitions shown in FIG. 11 compares the edges of the two input signals with each other, the periods of these two input signals must be totally the same during the operation of the PLL. However, in general, an RF pulse signal PRF is modulated by information (or digital data) and has a period N (an integer) times as long as the period (or referential period) of a clock signal CLX. In such a case, it is ordinarily possible to synchronize the clock signal CLK with the referential period component of the RF pulse signal PRF if a PLL provided with an exclusive-OR type phase comparator is used. However, since a phase comparator of is this type is not essentially used for detecting the leading edge and the trailing edge, the phase comparator cannot separately output the phase lead and the phase lag like the phase comparator shown in FIG. 11. Therefore, the phase comparator of this type cannot detect the pulse width variation. Accordingly, in thin embodiment, the extraction of the clock signal CLK from the RE pulse signal PRF by the PLL and the detection of the pulse width variation by the phase comparator shown in FIG. 11 are separately performed.

Figure 14:
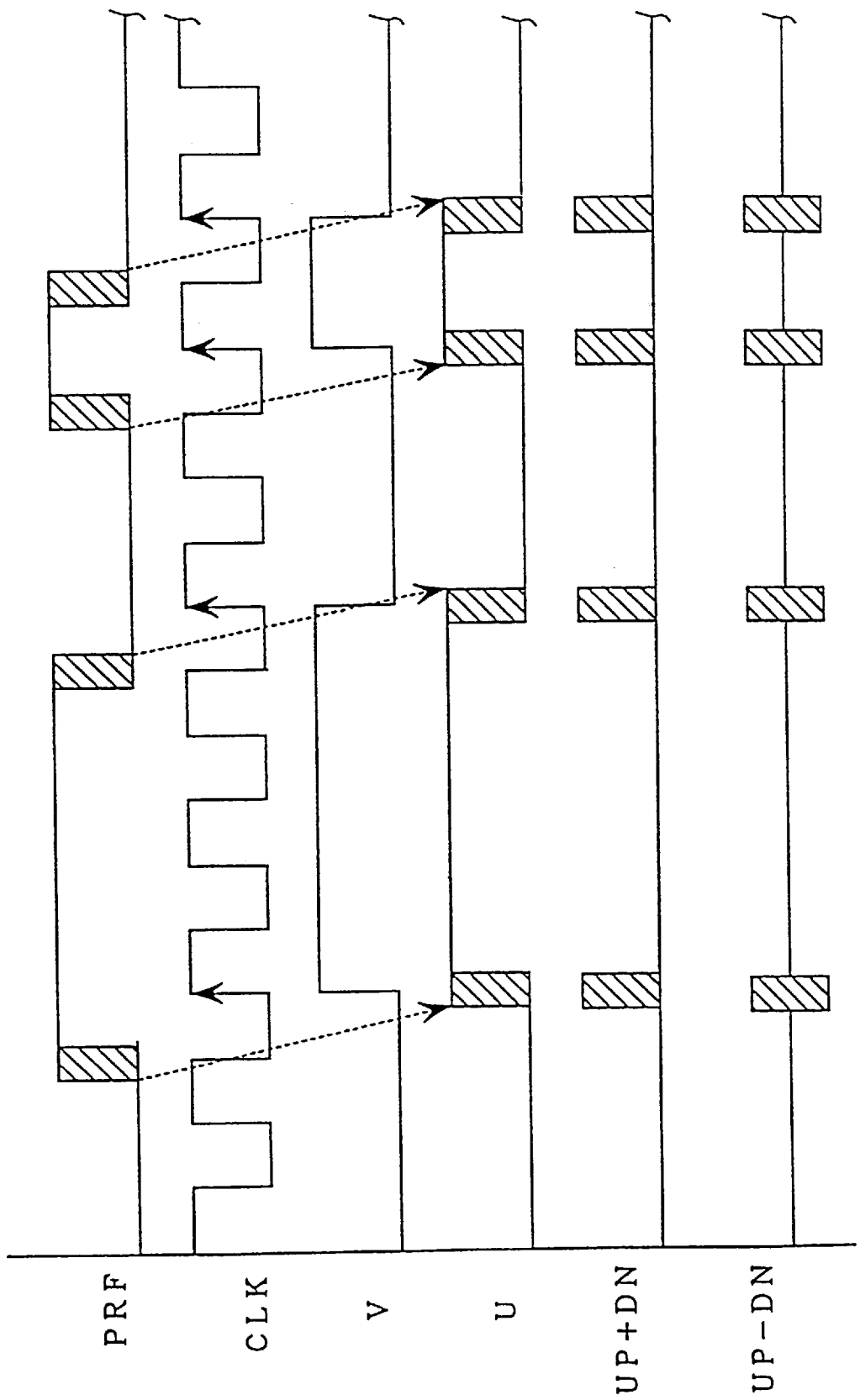
FIG. 14 is a waveform chart showing the waveforms of the respective signals in the pulse width variation detector shown in FIG. 13.

The clock extractor 510 is formed of a PLL including: the exclusive-OR type phase comparator; the integrator; and the VCO, and synchronizes-the output from the VCO with the RF pulse signal PRF, thereby outputting the synchronized signal as a clock signal CLK. Since all the loading edges and trailing edges of the RF pulse signal PRF passed through the D flip-flop 512 are provided by the clock signal CLK, the clock signal can be a reference signal without any variation in the pulse width thereof. However, since the phase of the clock signal CLK is delayed with respect to that of an RF pulse signal PRF yet to be input by about one half clock, it is necessary to match the phases of these two signals by delaying the RF pulse signal PRF. It is not impossible to use a fixed delay line for realizing the delay. However, in the case where the period of the RF pulse signal PRF is subtly varied because of the variation in the rotation of the optical disk or the like, a phase error is caused between the output signal from the D flip-flop 512 and the output signal from the delay line, so that the phase error is possibly detected as the pulse width variation by mistake. Therefore, in this embodiment, this phase error is detected by the phase comparator 514 and then fed back to the variable delay circuit 513 via the integrator 503 so as to be cancelled. FIG. 14 is a waveform chart showing the waveforms of the respective signals in the pulse width variation detector shown in FIG. 13. In FIG. 14, the hatched portions of the waveforms indicate the pulse width variation in the RF pulse signal PRF and the resulting variations in other signals.

The pulse width variation detector shown in FIG. 13 can detect the amount of the pulse width variation from a modulated RF pulse signal PRF using a simple phase comparator. In this embodiment, a case where the phase difference between an RF pulse signal PRF and a latch signal thereof is automatically corrected has been described. However, the phase difference can be corrected by a fixed delay line instead of the variable delay circuit am mentioned above. In such a case, since it is sufficient to use one of the two outputs of the phase comparator 514, i.e., (UP+DN), an exclusive-OR circuit can be substituted for the phase comparator 514 and the adder 505 shown in FIG. 13 and the structure of the circuit can be simplified.

Specific examples of the pulse width variation detector have been described. However, the present invention is not limited to the specific pulse width variation detector described above.

Figure 15:
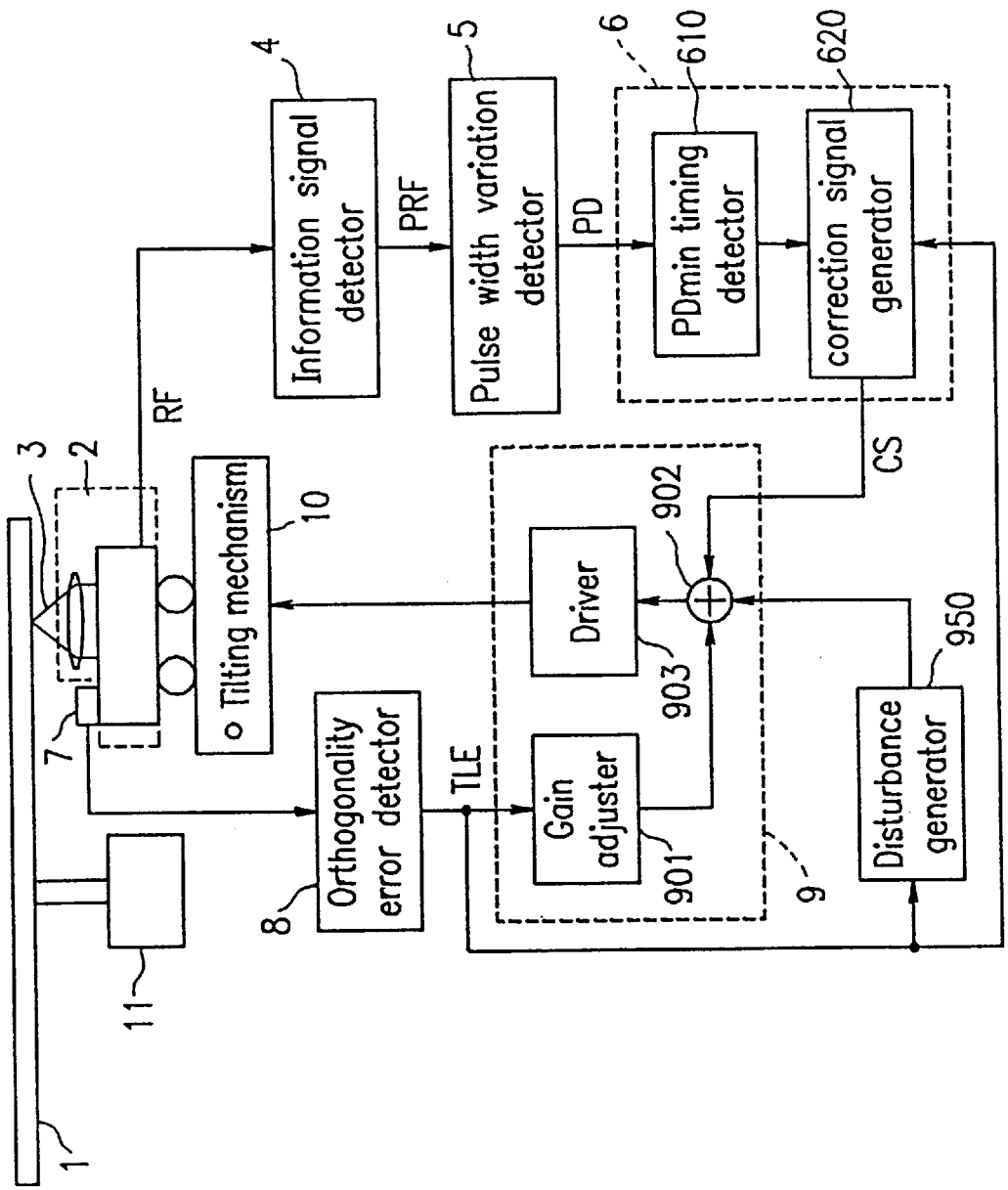
FIG. 15 is a block diagram showing a configuration for a tilt control apparatus including a disturbance generator 950 for applying an AC disturbance signal to the tilt servo loop in the first example of the present invention.

In the first example, the orthogonality error may be searched for by forcibly applying an AC (alternating current) disturbance signal to the tilt servo loop. FIG. 15 shows a configuration for a tilt control apparatus including a disturbance generator 950 for applying an AC disturbance signal to the tilt servo loop. The disturbance generator 950 generates and outputs a disturbance signal having AC components to an adder 902. In the configuration shown in FIG. 15, the orthogonality error can be searched for more precisely. When the AC tilt component generated by the rotation of the disk is too small, the disturbance generator 950 preferably applies the AC disturbance signal to the feedback loop as the AC tilt component. In addition, it is also necessary to limit the sum of the AC tilt component previously generated by the rotation of the disk or the like and the AC disturbance signal applied by the disturbance generator 950 to a level at which no failure is caused in the operation of the recording and reproducing apparatus. In order to effectively search for the offset amount, the AC disturbance signal to be applied to the feedback loop is preferably in synchronization with the AC tilt component generated by the rotation of the disk. In FIG. 15, the disturbance generator 950 receives the orthogonality error signal TLE, detects the period of the AC variable component of the orthogonality error signal TLE and then outputs an AC disturbance signal synchronized with the period and the phase thereof to the tilt con toller 9.

EXAMPLE 2

Hereinafter, a second exemplary method for searching for an orthogonality target value while maintaining the variation amount of the orthogonality target value irrespective of the level of the AC tilt will be described.

Figure 16:
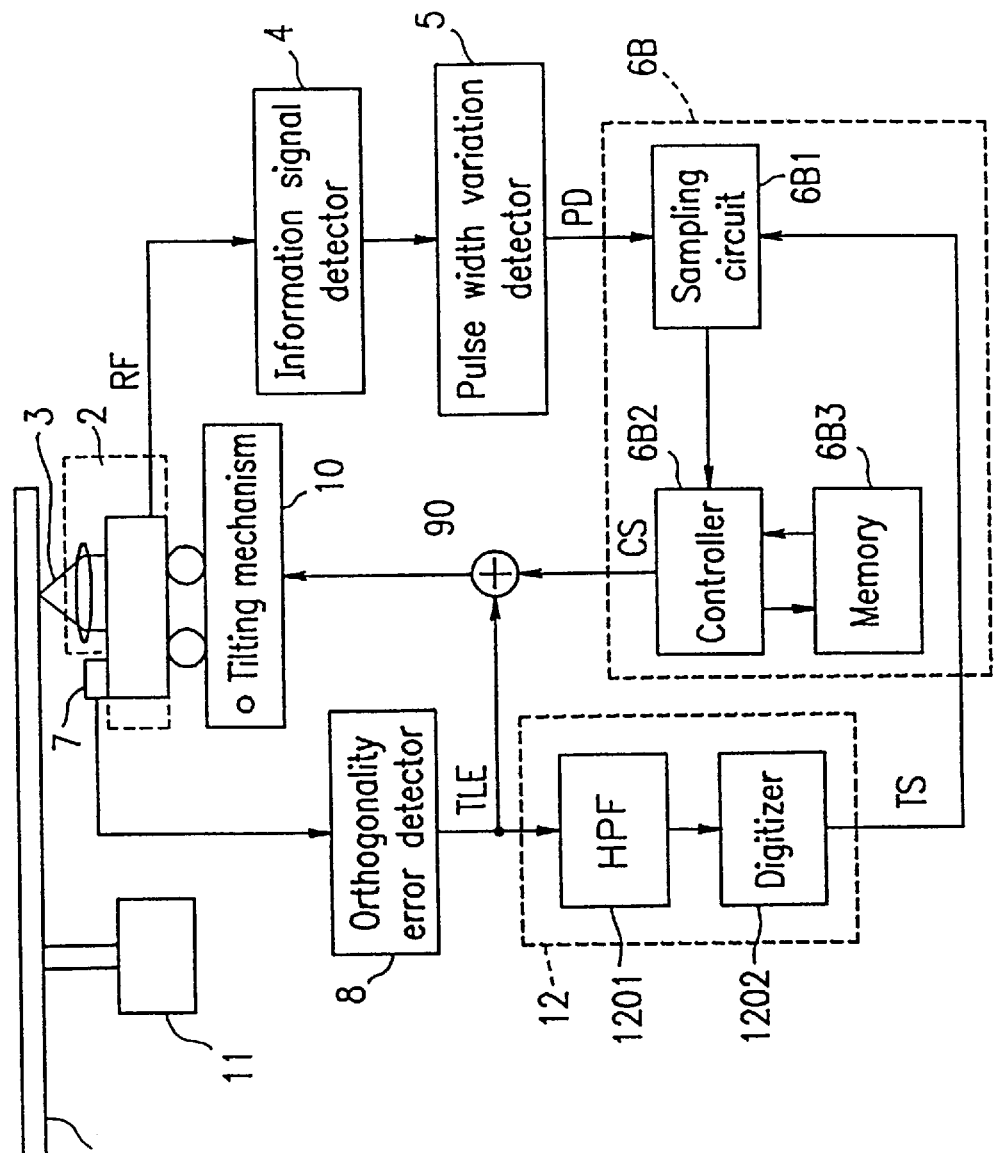
FIG. 16 is a block diagram showing a configuration for a tilt control apparatus in a second example of the present invention.

FIG. 16 is a block diagram showing a configuration for a tilt control apparatus of the second examples A timing circuit 12 includes a high-pass filter (HPF) 1201 and a digitizer 1202. The HPF 1201 receives the orthogonality error signal TLE and cuts off the low band components of the orthogonality error signal TLE, thereby outputting high band components corresponding to the rotation frequency of the disk to the digitizer 1202. The digitizer 1202 digitizes the input signal, thereby outputting a timing signal TS indicating the timing at which a waveform having the AC tilt component (AC tilt component corresponding to the rotation frequency or the disk, in particular) of the orthogonality error signal TLE crosses the center of the cyclic variation.

A target value variable circuit 6B includes: a sampling circuit 6B1; a controller 6B2; and a memory 6B3. The sampling circuit 601 samples the pulse width variation signal PD at the leading edge and the trailing edge of the timing signal TS output from the timing circuit 12. The controller 6B2 stores the data representing the level of the sampled pulse width variation signal PD in the memory 623 or retrieves the data stored in the memory 6B3. The controller 6B2 adds or subtracts a predetermined step amount to/from the correction signal CS in accordance with increase and decrease of the pulse width variation signal PD and then outputs the signal to an adder 90. The adder 90 receives the orthogonality error signal TLE and the correction signal CS and then outputs a signal obtained by adding these two signals to the tilting mechanism 10.

Figure 17:
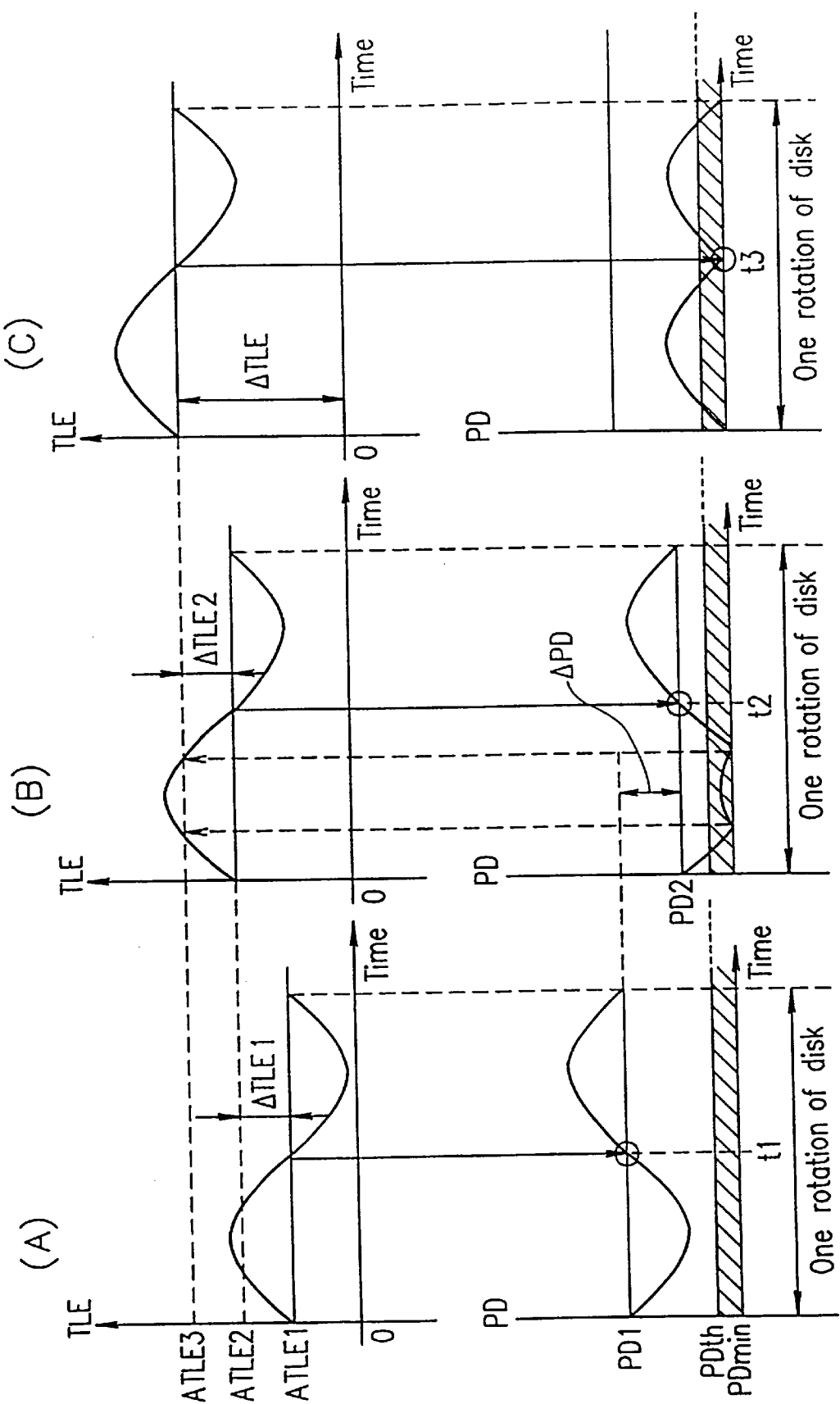
FIG. 17 (including subparts A–C) is a waveform chart showing the is waveforms of the orthogonality error signal TLE and the pulse width variation signal PD in the second example of the present invention.

The operation of the tilt control apparatus having the above-described configuration will be described. FIG. 17 is a waveform chart showing the waveforms of the orthogonality error signal TLE and the pulse width variation signal PD in the second example. Since the offset ΔTLE described in the first example exists during the tilt servo operation, an orthogonality error signal TLE in which an AC tilt component (having a sinusoidal waveform in FIG. 17) is superimposed on a DC (direct current) tilt servo component (ATEL1) is output from the orthogonality error detector a as shown in (A) in FIG. 17. The orthogonality error signal TLE is input to the HPF 1201 of the timing circuit 12. The timing circuit 12 outputs a timing signal TS for sampling the pulse width variation signal PD to a timing input terminal of the sampling circuit 631. The sampling circuit 631 samples the pulse width variation signal PD output from the pulse width variation detector 5 in response to the timing signal TS output from the timing circuit 12. The target value variable circuit 6B outputs a correction signal CS to the adder 90 so that the pulse width variation signal PD becomes a minimum value or a predetermined value or less.

Next, a specific operation will be described with reference to FIG. 17. In (A) in FIG. 17, the center of the variation of the AC tilt component (ATLE1) is different from the offset ΔTLE. In general, a TLE signal has a waveform In which an AC tilt is superimposed on a DC tilt, and therefore is cyclicly varied in accordance with the rotation frequency of the disk. On the other hand, in the case where a PD signal has a relatively large orthogonality error (as shown in (A) in FIG. 17), the PD signal comes to have a waveform corresponding to the AC component (AC tilt) of the TLE signal cyclicly varying in accordance with the rotation frequency of the disk. In the case where the orthogonality error becomes relatively small (as shown in (B) and (C) in FIG. 17), the waveform of the PD signal does not always correspond to the AC tilt. In (B) in FIG. 17, the waveform of the pulse width variation signal PD has a turnup at a first minimum value thereof, so that there are two minimum values in the waveform. Therefore, the AC component of the pulse width variation signal PD does not have a symmetric waveform. On the other hand, in (C) in FIG. 17, the value of the pulse width variation signal PD becomes minimum when the AC component of the orthogonality error signal TLE crosses ATLE3.

It is assumed that the target value variable circuit 6B does not apply a disturbance such as DC to the tilt servo loop in an initial state. In other words, the correction signal CS output from the controller 6B2 has a zero level. Therefore, the same signal as the orthogonality error signal TLE is output from the adder 90. In this case, the center of the AC tilt variation is assumed to ATLE1. The timing signal TS output from the timing circuit 12 has a leading edge and a trailing edge at a timing at which the AC tilt component crosses ATLE1. The sampling circuit 6B1 samples the pulse width variation signal PD at the leading edge and the trailing edge of the timing signal TS. In (A) in FIG. 17, the pulse width variation signal PD sampled at the time t1 has a level PD1. The controller 6B2 stores a data representing the level PD1 into the memory 6B3.

Next, the controller 6B2 adds an offset ΔTLE to a current correction signal CS at the zero level and then outputs a new correction signal CS (having a level ΔTLE1) thus obtained to the adder 90. As a result, the orthogonality error signal TLE is cyclicly varied around ATLE2 (=ATLE1+ΔTLE1). The timing circuit 12 outputs a timing signal TS indicating a timing at which the AC tilt component crosses the center of the variation ATLE2 to the sampling circuit 6B1. The sampling circuit 6B1 samples the pulse width variation signal PD at a time t2. As shown in (B) in FIG. 17, the sampled value has a level PD2.

At this stage, the controller 6B2 compares the level PD1 stored in the memory 6B3 with the level PD2. If PD1>PD2, then the polarity of ΔTLE1 (ΔTLE1=ATLE2−ATLE1>0) is regarded as an appropriate one and a similar processing is repeated by the controller 6B2. While the processing is repeated, the controller 6B2 samples the pulse width variation signal PD at the timing at which the AC tilt component crosses the center of the variation and then decides whether or not the sampled value is predetermined value or less.

In (C) in FIG. 17, by adding the offset ΔTLE1 to the correction signal CS, the level of the pulse width variation signal PD is decreased from PD1 to PD2. Therefore, another offset ΔTLE2 is added to the correction signal CS. As a result, the value of the pulse width variation signal PD becomes minimum $PD_{min}$ (zero level in this case) at the time t3 at which the orthogonality error signal. TLE crosses the center of the variation, as shown in (C) in FIG. 17. In this case, if a signal having the same polarity (positive) as those of the offsets ΔTLE1 and ΔTLE2 is added to the correction signal CS, then the value of the pulse width variation signal PD is increased to the contrary at the timing at which the orthogonality error signal TLE crosses the center of the variation.

To the contrary, it is obvious that an offset ΔTLE1 having an opposite polarity (negative) should be added to the correction signal CS if PD1<PD2. In such a case, the controller 6B2 adds an offset −ΔTLE1 to the correction signal CS, thereby repeating a similar processing again.

In actuality, when the value of the pulse width variation signal PD at the timing at which the orthogonality error signal TLE crosses the center of variation falls within a predetermined range (i.e., $PD_{min}$ to $PD_{th}$ in FIG. 17), it is preferable to finish the repetitive processing. As a result, it is possible to prevent the value of the pulse width variation signal PD to oscillate in the vicinity of $PD_{min}$.

In FIG. 17, the stop widths ΔTLE1 and ΔTLE2 of the signal to be added to the correction signal CS remain the same. However, the widths may be varied. For example, by gradually reducing the step width as the difference between the center of variation of the pulse width variation signal PD and the zero level becomes smaller, the target value can be searched for more precisely.

Hereinafter, a case where the orthogonality error signal TLE is varied as the target value of the tilt servo control is varied by the correction signal CS output from the target value variable circuit 6B will be described. In the second example, the maximum value of the variation amount of the orthogonality error such an DC, or a maximum off met value is ΔTLE. A minimum unit width of the variation amount of the orthogonality error during the search for the orthogonality position is assumed to be ΔTLE1 (=ΔTLE2). After the search for the orthogonality position it started, ΔTLE1 is added to the correction signal CS during the first search operation. When the level of the pulse width variation signal PD is unexpectedly increased by the addition of ΔTLE1, the orthogonality error become largest. In this case, when the level of the pulse width variation signal PD before starting the search for the orthogonality position is PD1, the variation amount of the pulse width variation signal PD when ΔTLE1 is added during the search for the orthogonality position is ΔPD, and the maximum permissive value of the pulse width variation signal PD is $PD_{mp}$, it is preferable that the following relationship represented by Equation (7) is satisfied:

$$PD1 + \Delta PD \leq PD_{mp} \qquad (7)$$

That is to say, even if the pulse width variation is increased by an amount ΔPD with respect to the pulse width variation signal PD immediately before the search for the orthogonality position is started because of the addition of the offset ΔTLE1 to the tilt controller, it is preferable for the amount of the pulse width variation to be equal to or smaller than the maximum permissive value $PD_{mp}$ of the pulse width variation signal PD. Therefore, ΔTLE1 is preferably determined so as to satisfy Equation (7).

It is noted that the maximum permissive value $PD_{mp}$ is determined by a maximum value of the jitter satisfying bit error rate required for a system or the stability of the rotational control in the case where a disk has a constant linear velocity (CLV).

In the second example, if the gain crossover frequency of the tilt servo is set to be lower than the rotation frequency of the disk 1, the tilt servo loop does not follow the AC tilt component caused by the rotation of the disk 1 even during the servo operation. Therefore, the AC tilt component remains in the orthogonality error signal as a servo residual.

As described above, by controlling the value of the pulse width variation signal PD when the orthogonality error signal TLE crosses the center of the variation of the AC tilt component so as to be a minimum value or a predetermined value or less, an optimum pulse width variation signal PD can be obtained, so that the orthogonal relationship between the information recording surface of the disk 1 and the optical axis of the light beam 3 can be maintained.

In the second example, the orthogonality target value can be searched for while varying the target value by a constant step width irrespective of the level of the AC tilt component.

EXAMPLE 3

Figure 18:
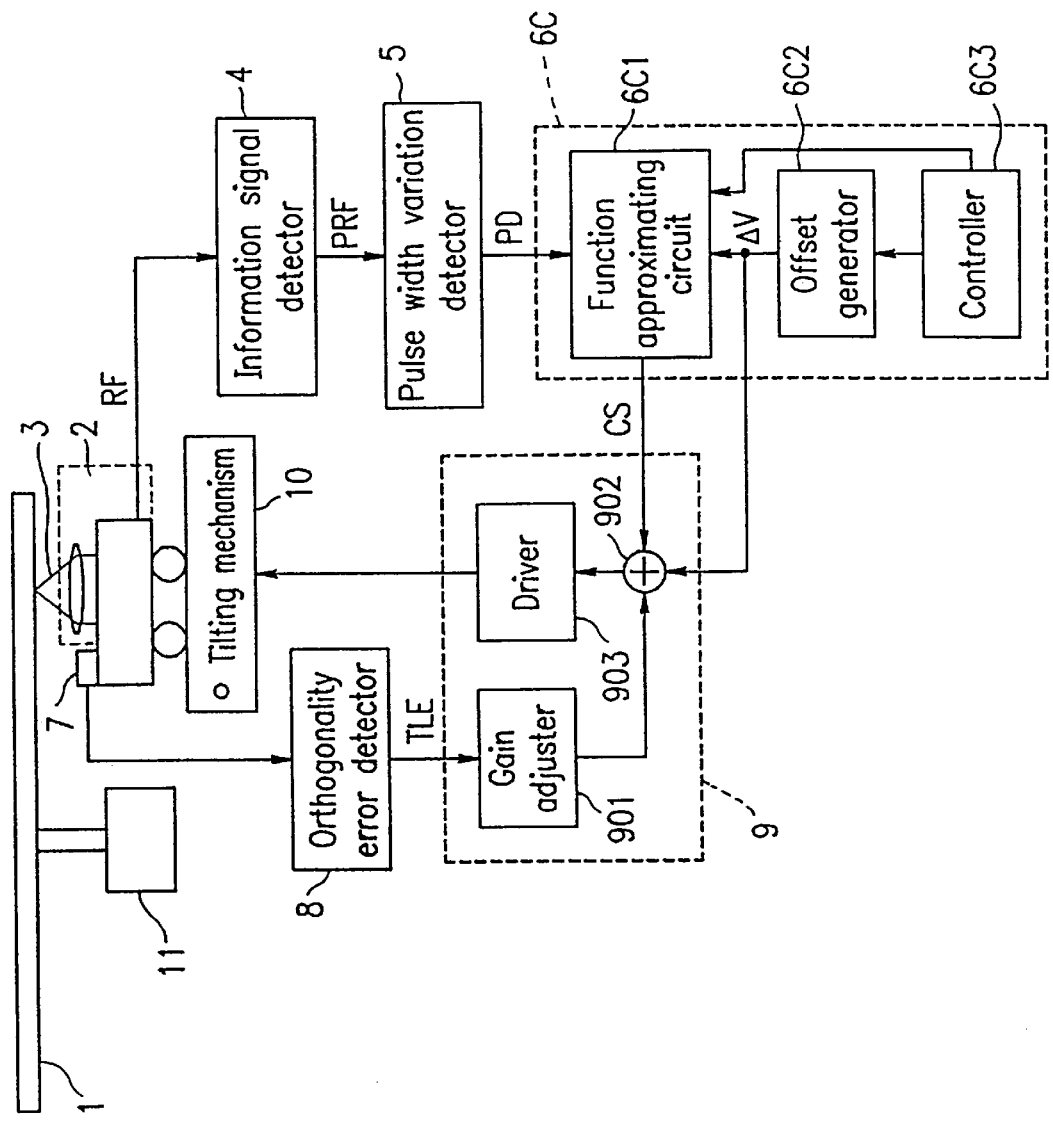
FIG. 18 is a block diagram showing a configuration for a tilt control apparatus in a third example of the present invention.

FIG. 18 is a block diagram showing a configuration for a tilt control apparatus in a third example. The tilt control apparatus of the third example has the same configuration as that of the tilt control apparatus of the first example except for that of a target value variable circuit 6C. The target value, variable circuit 6C includes a function approximating circuit 6C1 and an offset generator 6C2. The offset generator 6C2 generates an offset $\Delta V$ based on a control signal output from a controller 6C3 and then outputs the offset to the function approximating circuit 6C1 and the adder 902 of the tilt controller 9. The function approximating circuit 6C1 receives the offset $\Delta V$ and the pulse width variation signal PD, thereby calculating a function determining the relationship between the orthogonality error signal TLE and the pulse width variation signal PD (or performing a function approximation processing) based on the control signal output from the controller 6C3. After calculating the function by performing the function approximation processing, the function approximating circuit 6C1 outputs an offset $\Delta V$ for minimizing the value of the pulse width variation signal PD as a correction signal CS to the tilt controller 9 based on the control signal output from the controller 6C3.

If a graph showing the relationship the offset $\Delta V$ to be applied to the orthogonality error signal TLE (as an abscissa) and the pulse width variation signal PD (as an ordinate) is plotted, then the resulting curve resembles a curve of a second-order function. The function approximating circuit 6C1 calculates constants a, b and $\Delta V0$ when the second-order function is represented by an equation: $PD = a \cdot (\Delta V - \Delta V0)^2 + b$ (where, a, b and $\Delta V0$ are constants).

Figure 19:
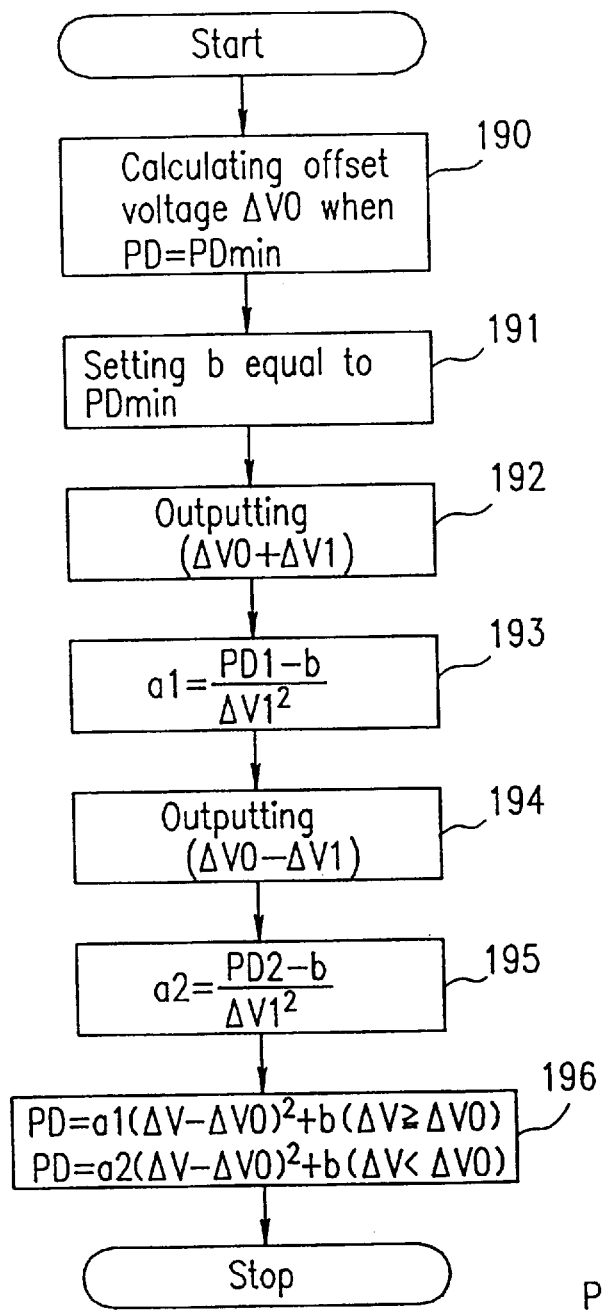
FIG. 19 is a flow chart showing the respective steps of the function approximation processing in the third example of the present invention.

FIG. 19 is a flow chart showing the respective steps of the function approximation processing for calculating these constants. In Step 190, the offset generator 6C2 varies the value of the offset $\Delta V$ by a predetermined unit width, and then sets the offset $\Delta V$ when the pulse width variation signal PD has a minimum value $PD_{min}$ to be $\Delta V0$ in the second-order function. Next, in Step 191, the minimum value $PD_{min}$ is set equal to the constant b in the second-order function.

In Step 192, the offset generator 6C2 outputs $(\Delta V0 + \Delta V1)$ to the function approximating circuit 6C1. In Step 193, the function approximating circuit 6C1 calculates a constant a1 from the value PD1 of the pulse width variation signal PD when $(\Delta V0 + \Delta V1)$ is supplied, $\Delta V1$ and the constant b.

In step 194, the offset generator 6C2 outputs $(\Delta V0 - \Delta V1)$ to the function approximating circuit 6C1. In step 195, the function approximating circuit 6C1 calculates a constant a2 from the value PD2 of the pulse width variation signal PD when $(\Delta V0 - \Delta V1)$ is supplied, $\Delta V1$ and the constant b.

In Step 196, the function approximating circuit 6C1 defines an equation for approximating the value of the pulse width variation signal PD as a second-order function of the offset $\Delta V$. Herein, there are two equations representing the value of the pulse width variation signal PD for approximating different curves in the two regions on the right and the left of the vertex at the center of the curve. In other words, these equations are used for improving the precision in the approximation if the constant a1 in the region where the offset is larger then $\Delta V0$ is different from the constant a2 in the region where the offset is smaller than $\Delta V0$. Therefore, in the case where the values of the constants a1 and a2 in the two regions are sufficiently approximate to each other, either one of the two equations can be used depending upon which of the two constants is used.

FIG. 20 is a flow chart showing the respective steps of the offset ($\Delta TLE$) search processing. In Step 201, the function approximation processing described referring to FIG. 19 is performed. The function approximation processing is performed at least once after the apparatus is turned on. In Step 202, the value of the offset $\Delta TLE$ is calculated from the pulse width variation signal PD. Hereinafter, a case where the value of the pulse width variation signal PD is varied to become $PD_x$ in FIG. 20, for example, will be described. Based on the function calculated by the function approximation processing, $(\Delta V0 + \Delta TLE)$ and $(\Delta V0 - \Delta TLE)$ can be inversely calculated from the value $PD_x$. In this case, in order to reduce the value of the pulse width variation signal PD from $PD_x$ to $PD_{min}$, an offset $+\Delta TLE$ or $-\Delta TLE$ is required to be applied as the correction signal CS. As described above, the pulse width variation signal PD can be approximated by the second-order function. Therefore, even if it is already known that the value of the pulse width variation signal PD becomes $PD_x$, it is impossible to decide whether the current value exists at a point P or a point Q. That is to say, in general, the value of the offset to be applied as a correction signal CS to the adder 902 of the tilt controller 9 cannot be calculated from the minimum value $PD_{min}$.

Step 203, the polarity of the offset $\Delta TLE$ to be applied is determined. In other words, in Step 203, it is determined which of the two offsets $+\Delta TLE$ and $-\Delta TLE$ mentioned above is to be applied. The polarity of the offset can be determined, for example, by varying the offset to such a degree that no failure is caused in the operational state of the apparatus and then deciding whether the current value exists at the point P or the point Q based on the variation in the value of the pulse width variation signal PD. More specifically, if the value of the pulse width variation signal PD increases when a positive value is output as a correction signal CS to the tilt controller 9, then the current value exists at the point P (and the offset to be applied is $-\Delta TLE$). To the contrary, if the value of the pulse width variation signal PD decreases, then the current value exists at the point Q (and the offset to be applied is $+\Delta TLE$).

So long as no failure is caused in the operational state of the apparatus even when an offset having a polarity opposite to the polarity to be applied for minimizing the value of the pulse width variation signal PD is applied, Step 203 can be omitted. Alternatively, the polarity of the offset to be applied may be decided by seeing whether or not the value of the pulse width variation signal PD decreases by actually applying a provisional offset $\Delta TLE$. That is to say, if the application of $\Delta TLE$ unexpectedly increases the value of the pulse width variation signal PD, then the offset to be applied turns out to be $-\Delta TLE$. In Step 204, the offset $\Delta TLE$ which is calculated in Step 202 and has the polarity decided in Step 203 is output to the tilt controller 9.

In this third example, the function approximation is performed beforehand, and the correction signal CS is generated based on the approximated function during the operation of the apparatus. As a result, it is no longer necessary to search for the target value and a precise correction can be advantageously performed in a short period of time.

EXAMPLE 4

Figure 21:
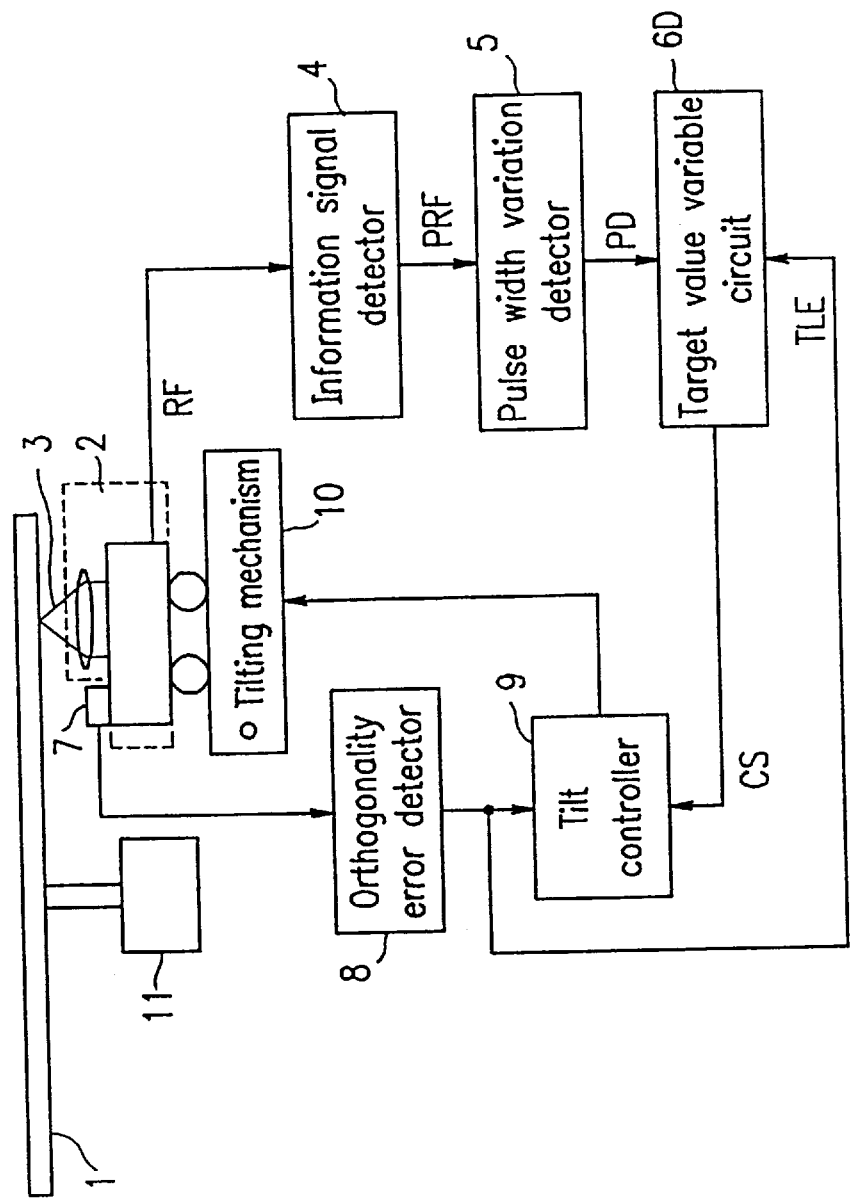
FIG. 21 is a block diagram showing a configuration for a tilt control apparatus in a fourth example of the present invention.

In a fourth example of the invention, the polarity and the level of the orthogonality error are detected based on the values of the pulse width variation signal PD and the orthogonality error signal TLE and the target value of the tilt control is searched for based on the detected orthogonality error so that the value of the pulse width variation signal PD becomes minimum. FIG. 21 is a block diagram showing a configuration for a tilt control apparatus of the fourth example. A target value variable circuit 6D detects the amount corresponding to the pulse width variation signal PD, and the polarity of the error in the orthogonal relationship between the optical disk 1 and the optical axis of the light beam 3 as a voltage based on the orthogonality error signal TLE output from the orthogonality error detector 8 and the pulse width variation signal PD, so as to output a target value of the tilt control corresponding to the detected amount and polarity of the orthogonality error to the tilt controller 9.

The tilt controller 9 controls the tilting mechanism 10 based on the orthogonality error signal TLE and a correction signal CS so that the optical disk 1 falls at right angles with the optical axis of the light beam 3 irradiated onto the optical disk 1. The internal configuration of the tilt controller 9 is the same as that shown in FIG. 1.

Figure 22:
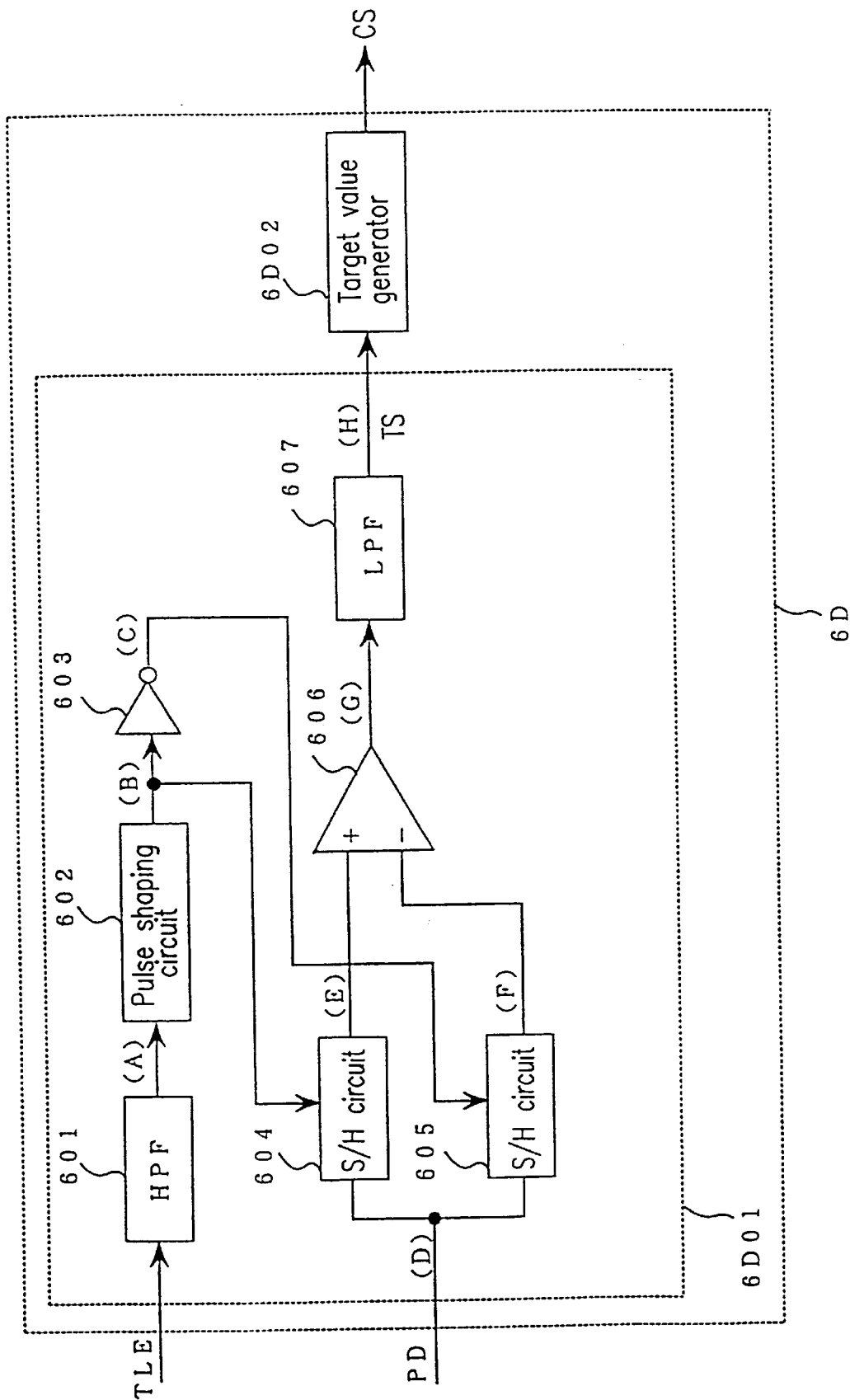
FIG. 22 is a block diagram showing a configuration for a target value variable circuit 6D in the fourth example of the present invention.

FIG. 22 is a block diagram showing a configuration for the target value variable circuit 6D. A target value detector 6D01 detects a target value signal TS from the orthogonality error signal TLE and the pulse width variation signal PD, and then supplies the signal TS to a target value generator 6D02 to be described later. The target value generator 6D02 receives the target value signal TS, amplifies the signal TS with a predetermined gain, and then outputs the amplified signal TS as a correction signal CS for varying the target value of the tilt control to the tilt controller 9.

A high-pass filter (HPF) 601 extracts the AC component of the orthogonality error signal TLE output from the orthogonality error detector 8. A pulse shaping circuit 602 compares the AC component of the orthogonality error signal TLE output from the HPF 601 with the central level thereof. When the AC component is higher than the central level, the pulse shaping circuit 602 generates a high-level signal. On the other hand, when the AC component is lower than the central level, the pulse shaping circuit 602 generates a low-level signal. An inverter 603 inverts and outputs the signal supplied from the pulse shaping circuit 602. A sample and hold (S/H) circuit 604 outputs the pulse width variation signal PD output from the pulse width variation detector 5 when the pulse signal output from the pulse shaping circuit 602 is at a high level. On the other hand, when the signal is at a low level, the S/H circuit 604 holds the pulse width variation signal PD. An S/H circuit 605 outputs the pulse width variation signal PD output from the pulse width variation detector 5 when the pulse signal output from the inverter 603 is at a high level. On the other hand, when the signal is at a low level, the S/H circuit 605 holds the pulse width variation signal PD. A differential operation circuit 606 calculates a difference between the outputs from the S/H circuits 604 and 605. A low-pass filter (LPF) 607 extracts the low band components from the output of the differential operation circuit 606.

In this fourth example, the target value detector 6D01 detects the polarity of the orthogonality error from the AC component of the orthogonality error signal TLE output from the orthogonality error detector S. The target value detector 6D01 further detects the polarity of the pulse width variation signal PD output from the pulse width variation detector 5, the polarity corresponding to the polarity of the detected orthogonality error signal TLE, and the level thereof, so as to output the target value signal TS. The target value generator 6D02 amplifies the target value signal TS output from the target value detector 6D01 so as to output the amplified signal as the correction signal CS.

Figure 23:
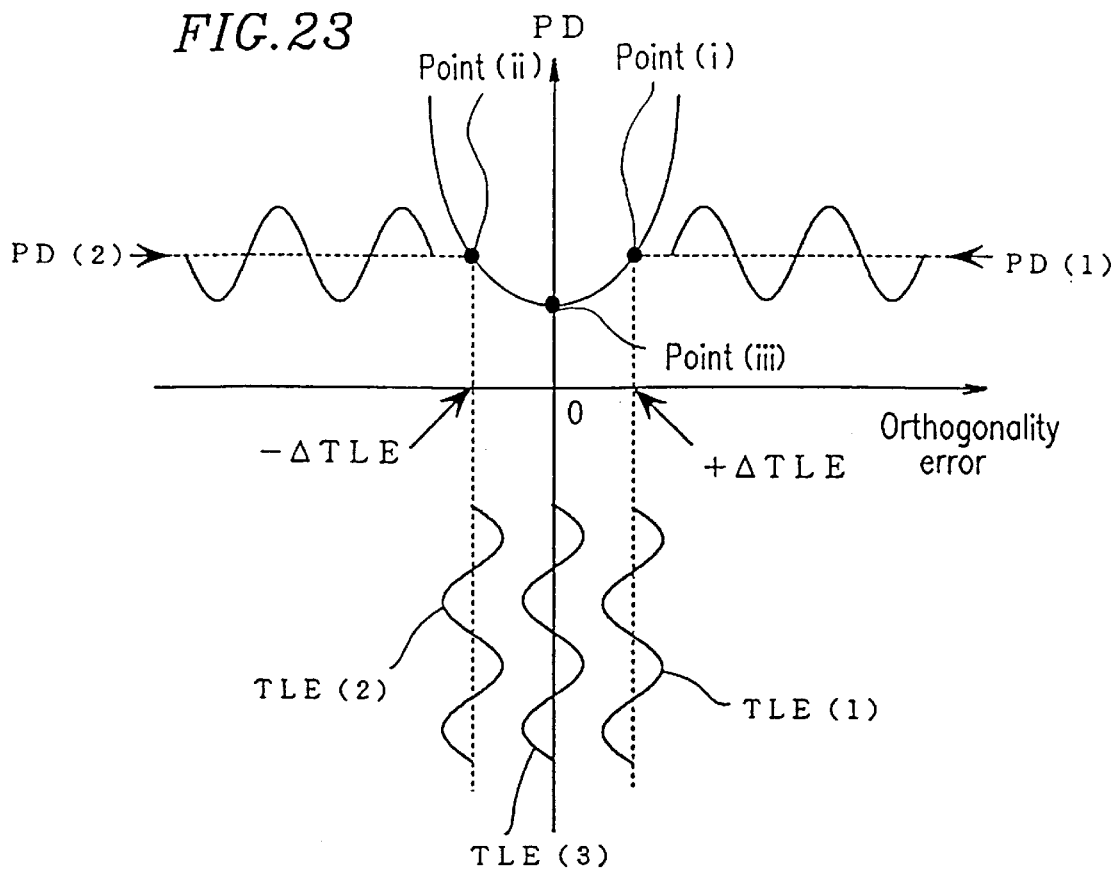
FIG. 23 is a graph showing the relationship between the orthogonality error and the value of the pulse width variation signal PD for illustrating the operation of a target value detector 6D01 in the fourth example of the present invention.
Figure 24:
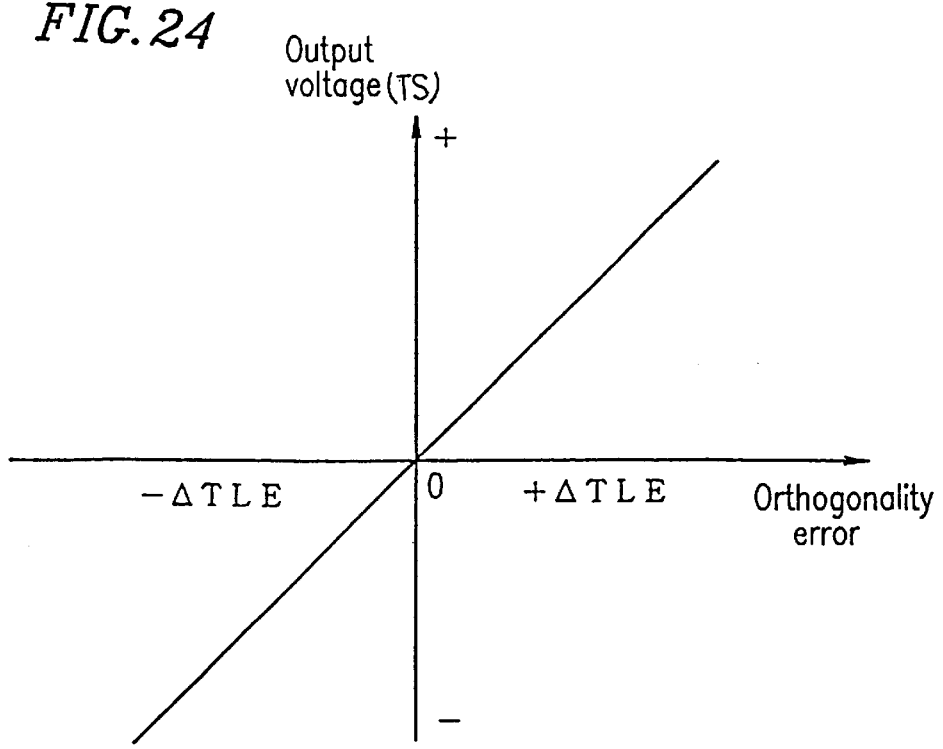
FIG. 24 is a graph showing the relationship between the orthogonality error and an output voltage TS of the target value detector 6D01 in the fourth example of the present invention.
Figure 25:
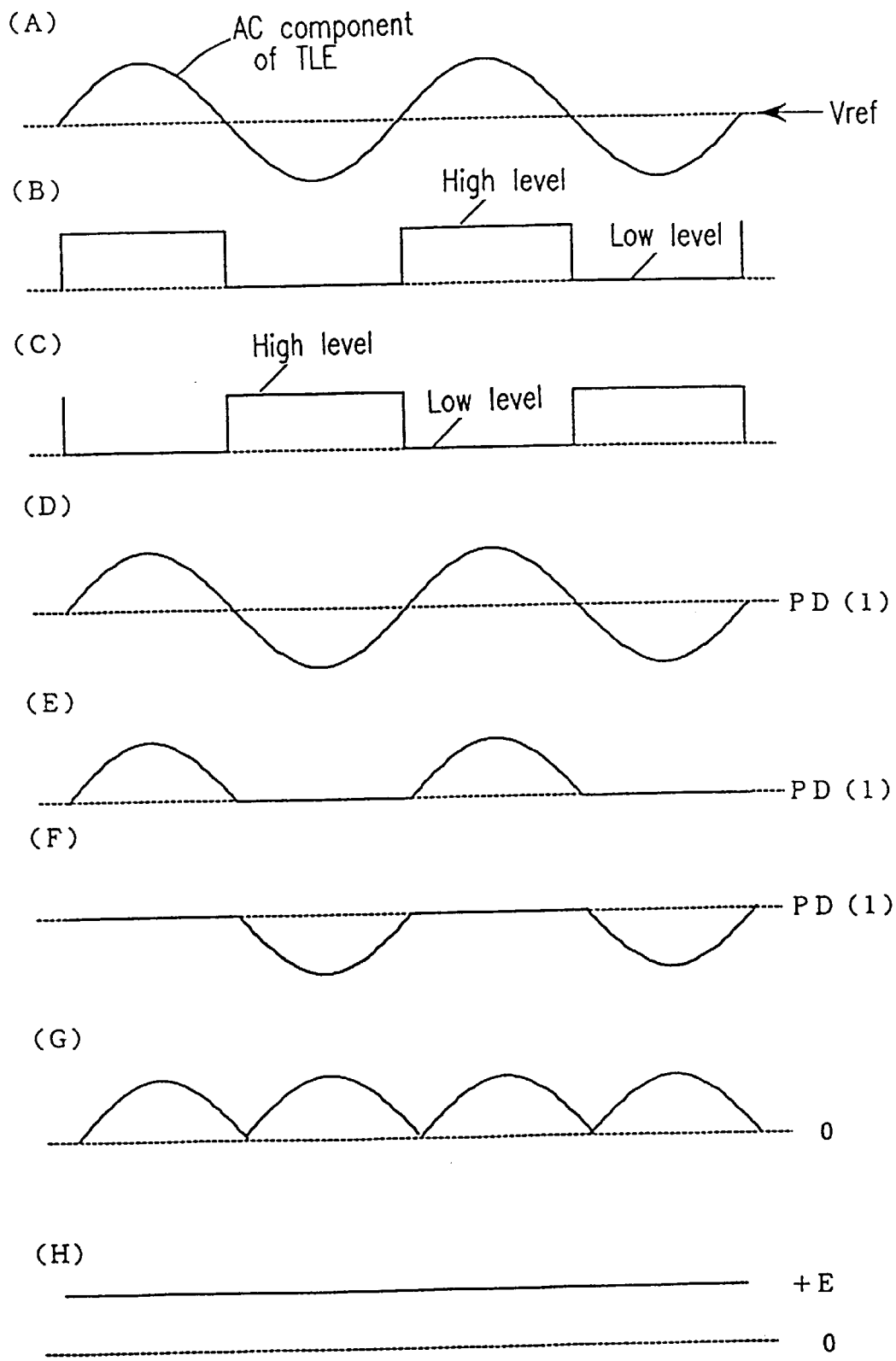
FIG. 25 (including subparts A–H) is a waveform chart illustrating the operation of the target value detector 6D01 when the amount of the orthogonality error is +ΔTLE in the fourth example of the present invention.
Figure 26:
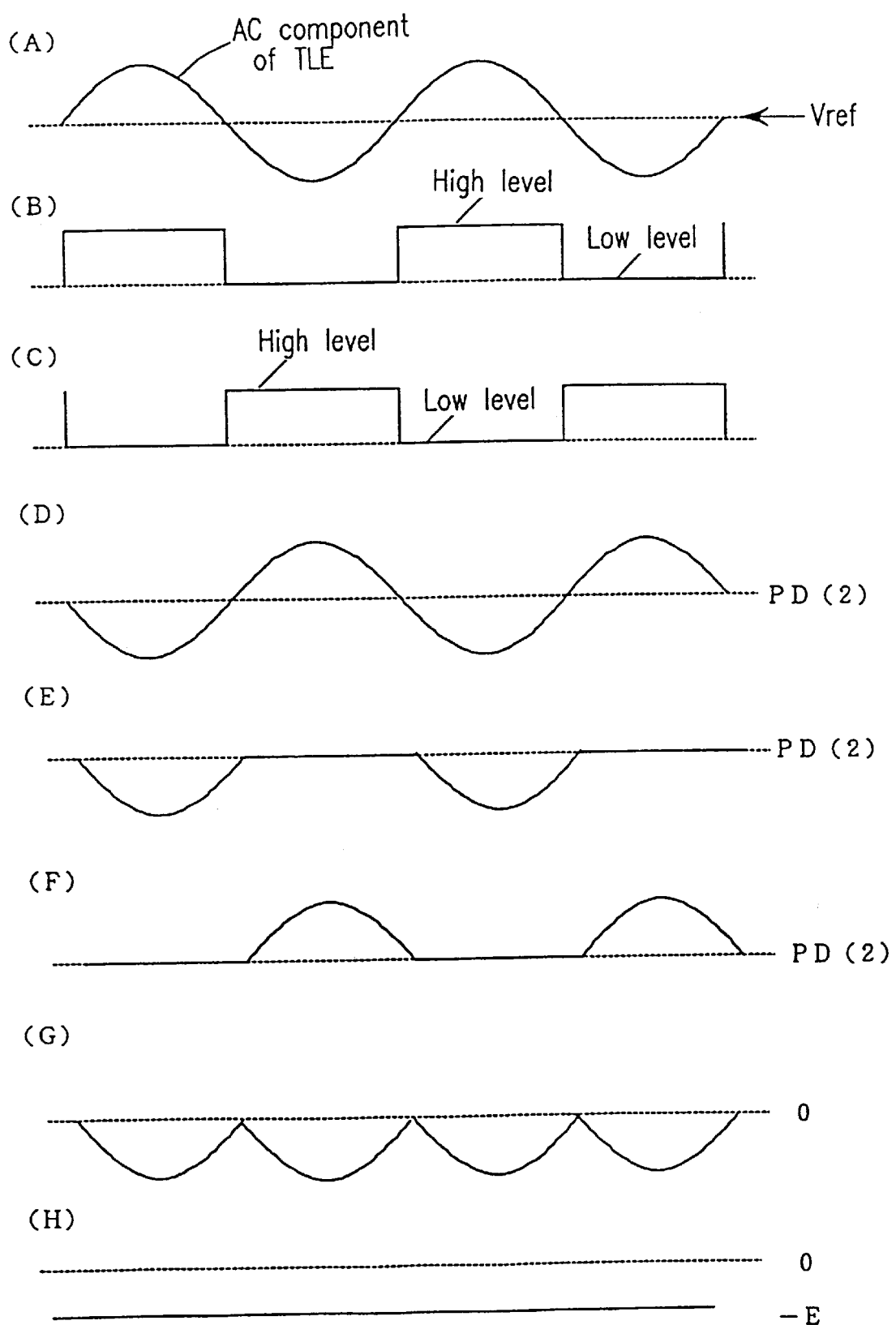
FIG. 26 (including subparts A–H) is a waveform chart illustrating the operation of the target value detector 6D01 when the amount of the orthogonality error is −ΔTLE in the fourth example of the present invention.
Figure 27:
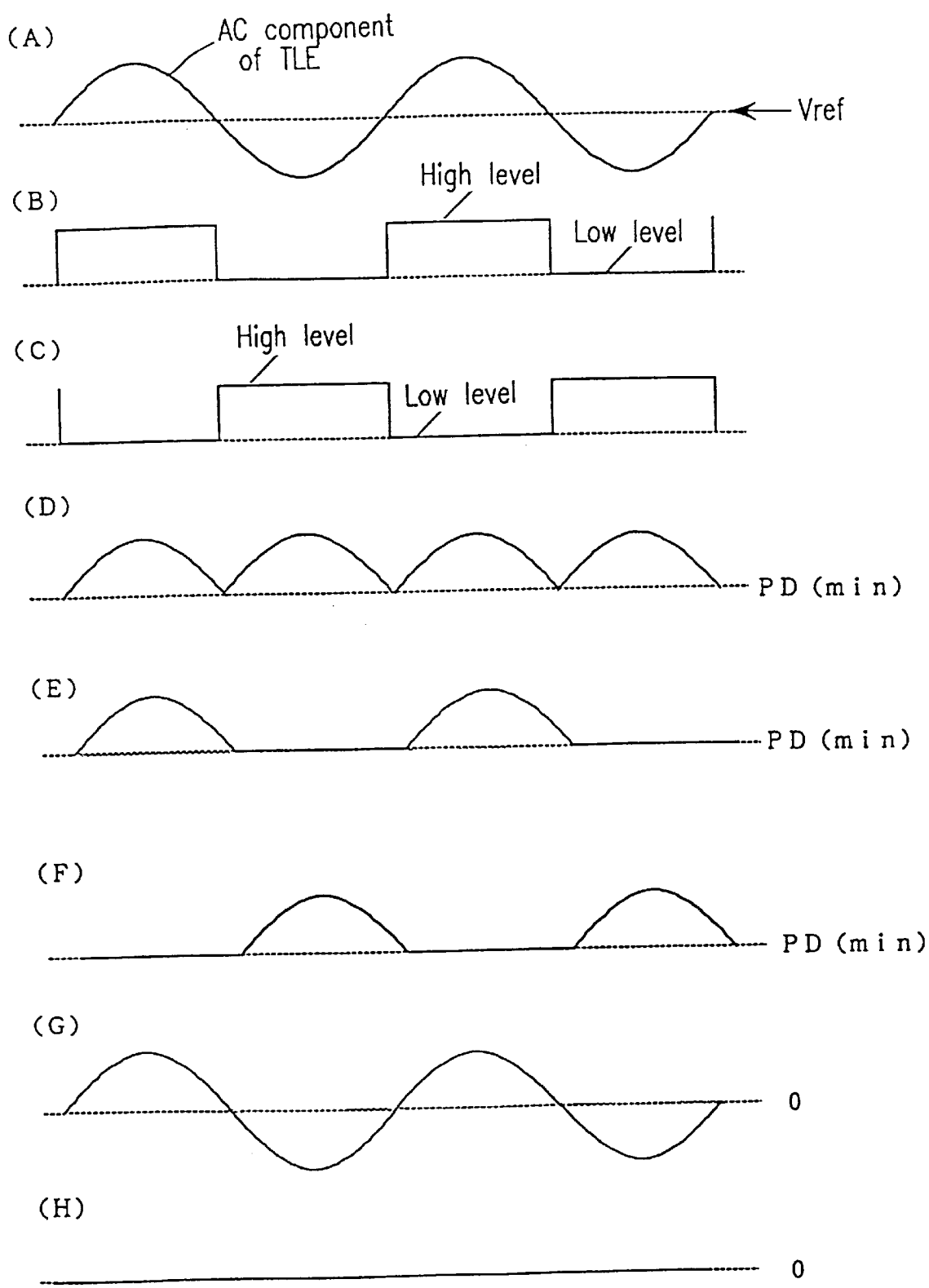
FIG. 27 (including subparts A–H) is a waveform chart illustrating the operation of the target value detector 6D01 when the orthogonality error is zero in the fourth example of the present invention.

Next, a specific operation of the target value detector 6D01 will be described. FIG. 23 is a graph showing the relationship between the orthogonality error and the value of the pulse width variation signal PD for illustrating the operation of the target value detector 6D01. FIG. 24 is a graph showing the relationship between the orthogonality error and an output voltage TS of the target value detector 6D01. FIG. 25 is a waveform chart illustrating the operation of the target value detector 6D01 when the amount of the orthogonality error is $+\Delta TLE$. FIG. 26 is a waveform chart illustrating the operation of the target value detector 6D01 when the amount of the orthogonality error is $-\Delta TLE$. FIG. 27 is a waveform chart illustrating the operation of the target value detector 6D01 when the orthogonality error is zero.

As shown in FIG. 23, the value of the pulse width variation signal VD becomes minimum when the orthogonality error is zero, and the polarity of the pulse width variation signal PD when the orthogonality error is $+\Delta TLE$ is opposite to the polarity of the pulse width variation signal PD when the orthogonality error is $-\Delta TLE$. Next, referring to FIG. 25, it will be described how the target value detector 6D01 operates when the orthogonality error is $+\Delta TLE$ and the AC component of the orthogonality error signal is TLE(1) at a point (i) in FIG. 23. (A) of FIG. 25 shows the output of the HPF 601; (B) of FIG. 25 shows the output of the pulse shaping circuit 602; (C) of FIG. 25 shows the output of the inverter 603; (D) of FIG. 25 shows the value of the pulse width variation signal PD; (E) of FIG. 25 shows the output of the S/H circuit 604; (F) of FIG. 25 shows the output of the S/H circuit 605; (G) of FIG. 25 shows the output of the differential operation circuit 606; and (H) of FIG. 25 shows the output of the LPF 607. (A) to (H) of FIG. 25 show the waveforms of the respective signals in (A) to (H) in FIG. 22. The level of the signal shown in (B) in FIG. 25 becomes high when the signal shown in (A) in FIG. 25 (or TLE(1) in FIG. 23) is larger than $+\Delta TLE$. The signal shown in (C) in FIG. 25 is an inverted signal of the signal shown in (B) in FIG. 25. The signal shown in (E) in FIG. 25 is the pulse width variation signal PD sampled and held by the signal shown in (B) in FIG. 25. When the signal shown in (B) in FIG. 25 is high, the pulse width variation signal PD is sampled. On the other hand, when the signal shown in (D) in FIG. 25 is low, the pulse width variation signal PD is held. The signal shown in (F) in FIG. 25 is the pulse width variation signal PD sampled and held by the signal shown in (C) in FIG. 25. When the signal shown in (C) in FIG. 25 is high, the pulse width variation signal PD is sampled. On the other hand, when the signal shown in (C) in FIG. 25 is low, the pulse width variation signal PD is held. The signal shown in (C) in FIG. 25 is a signal obtained by calculating the difference between the signals shown in (E) and (F) in FIG. 25 by the differential operation circuit 606. The signal shown in (H) in FIG. 25 is a signal obtained by extracting the DC component from the output of the differential operation circuit 606 by the LPF 607. The signal shown in (H) in FIG. 25 is obtained by detecting the polarity and the level of the orthogonality error based on the value of the pulse width variation signal PD at the point (i) in FIG. 23 and the signal is output as a positive voltage value.

Next, referring to FIG. 26, it will be described how the target value detector 6D01 operates when the orthogonality error is −ΔTLE and the AC component of the orthogonality error signal is TLE(2) at a point (ii) in FIG. 23. In the same way as in (A) to (H) in FIG. 25, (A) to (H) of FIG. 26 show the waveforms of the respective signals shown in (A) to (H) in FIG. 22. Therefore, the same matters as those described referring to FIG. 25 will not be described herein. In FIG. 26, the differential operation circuit 606 receives the signals shown in (E) and (F) in FIG. 26 and calculates the difference between these two signals so as to output the difference as the signal shown in (C) in FIG. 26. The signal shown in (H) in FIG. 26 is obtained by extracting the DC component from the output of the differential operation circuit 600 by the LPF 607. The signal is obtained by detecting the polarity and the level of the orthogonality errors based on the value of the pulse width variation signal PD at the point (ii) in FIG. 23 and the signal is output as a negative voltage value.

Next, referring to FIG. 27, it will be described how the target value detector 6D01 operates when the orthogonality error is zero and the AC component of the orthogonality error signal is TLE(3) at a point (iii) in FIG. 23. In the same way as in (A) to (H) in FIG. 25, (A) to (H) of FIG. 27 shows the waveforms of the respective signals shown in (A) to (H) in FIG. 22. Therefore, the same matters am those described referring to FIG. 25 will not be described herein. In FIG. 27, the differential operation circuit 606 receives the signals shown in (E) and (F) in FIG. 27 and calculates the difference between theme two signals so as to output the difference as the signal shown in (G) in FIG. 27. The signal shown in (H) in FIG. 27 is obtained by extracting the DC component from The output of the differential operation circuit 606 by the LPF 607. The signal is obtained by detecting the polarity and the level of the orthogonality error based on the value of the pulse width variation signal PD at the point (iii) in FIG. 23 and the output voltage value becomes zero in this case.

The operation of the target value detector 6D01 at the points (i), (ii) and (iii) shown in FIG. 23 has been described with reference to FIGS. 25, 26 and 27. FIG. 24 shows the relationship between the orthogonality error and the value or the pulse width variation signal PD shown in FIG. 23 as a relationship between the orthogonality error and the output voltage TS of the target value detector 6D01.

As described above, the target value variable circuit 6D of the fourth example detects the target value signal TS at a point where the orthogonality error becomes zero when the value of the pulse width variation signal PD is minimum based on the pulse width variation signal PD output from the pulse width variation detector 5 and the orthogonality error signal TLE output from the orthogonality error detector 8, and then outputs a correction signal CS based on the target value signal TS. Therefore, the tilt control apparatus of the fourth example operates so that the value of the pulse width variation signal PD output from the pulse width variation detector 5 becomes minimum by varying the control target value of the tilt controller 9 in response to the correction signal CS output from the target value variable circuit 6D. In this fourth example, the polarity and the level of the orthogonality error can be detected based on the AC component of the orthogonality error signal TLE and the value of the pulse width variation signal PD. As a result, even if an error is caused in the orthogonal relationship because of the degradation in the characteristics of the tilt sensor 7 with the passage of time or owing to the variation in the temperature, the error can be corrected at real time so as to be always zero.

EXAMPLE 5

In a fifth example of the invention, when the AC component of the orthogonality error signal is small, the polarity and the level of the orthogonality error are detected based on the values of the pulse width variation signal PD and the disturbance signal D and the target value of the tilt control is searched for based on the detected orthogonality error so that the value of the pulse width variation signal PD becomes minimum.

Figure 28:
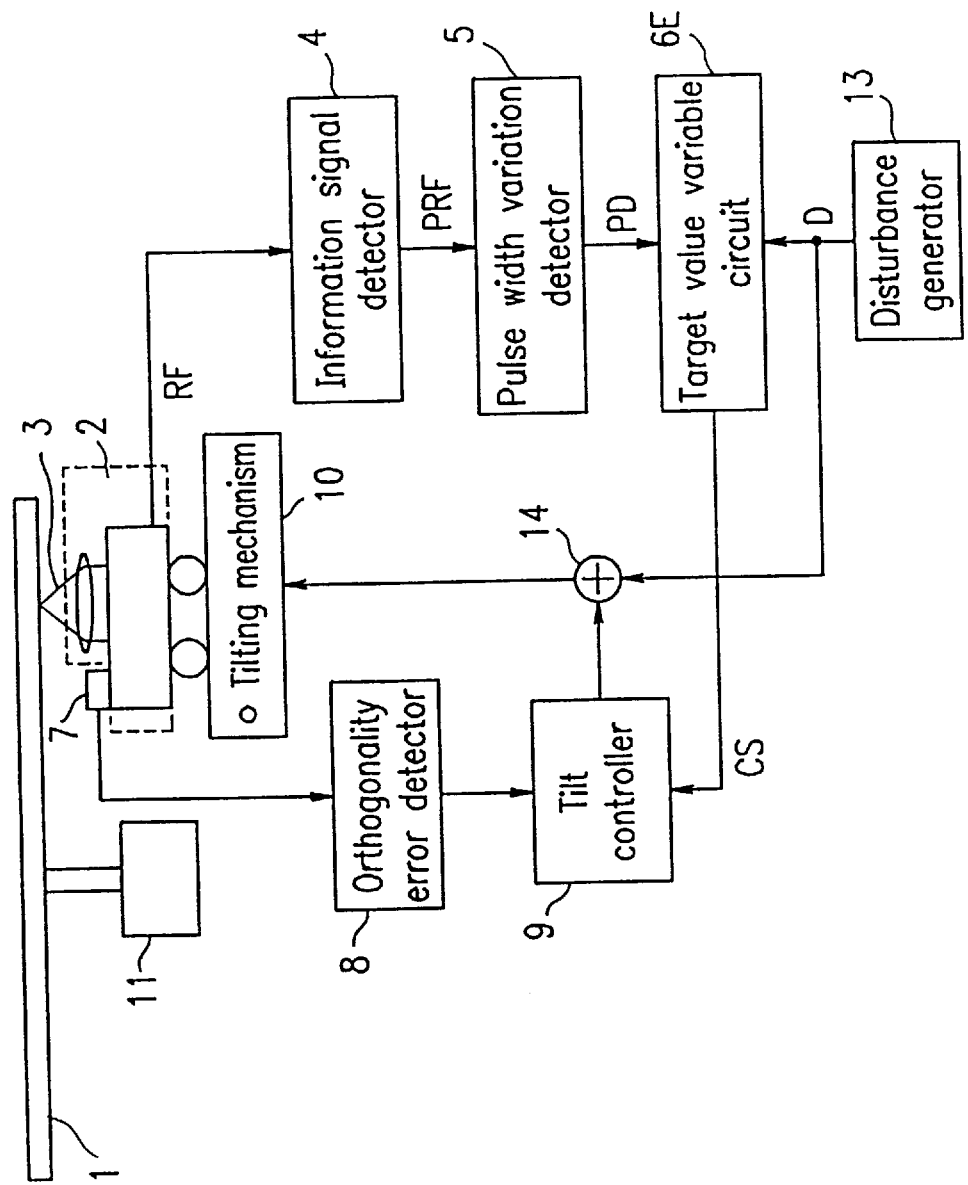
FIG. 28 is a block diagram showing a configuration for a tilt control apparatus in a fifth example of the present invention.

FIG. 28 is a block diagram showing a configuration for a tilt control apparatus of the fifth example. A target value variable circuit 6E detects the amount, corresponding to the pulse width variation signal PD, and the polarity of the error in the orthogonal relationship between the optical disk 1 and the optical axis of the light beam 3 as a voltage based on the disturbance signal D output from a disturbance generator 13 to be described later and the pulse width variation signal PD, so as to output a target value of the tilt control corresponding to the detected amount and polarity of the orthogonality error to the tilt controller 9.

The tilt controller 9 controls the tilting mechanism 10 via an adder 14 to be described later based on the orthogonality error signal TLE so that the optical disk 1 falls at right angles with the optical axis of the light beam 3 irradiated onto the optical disk 1. The internal configuration of the tilt controller 9 is the some as that shown in FIG. 1. The disturbance generator 13 outputs a disturbance signal to one of the two input terminals of the adder 14, thereby driving the tilting mechanism 10 in a constant period. The adder 14 adds the disturbance signal output from the disturbance generator 13 and the output from the tilt controller 9.

Figure 29:
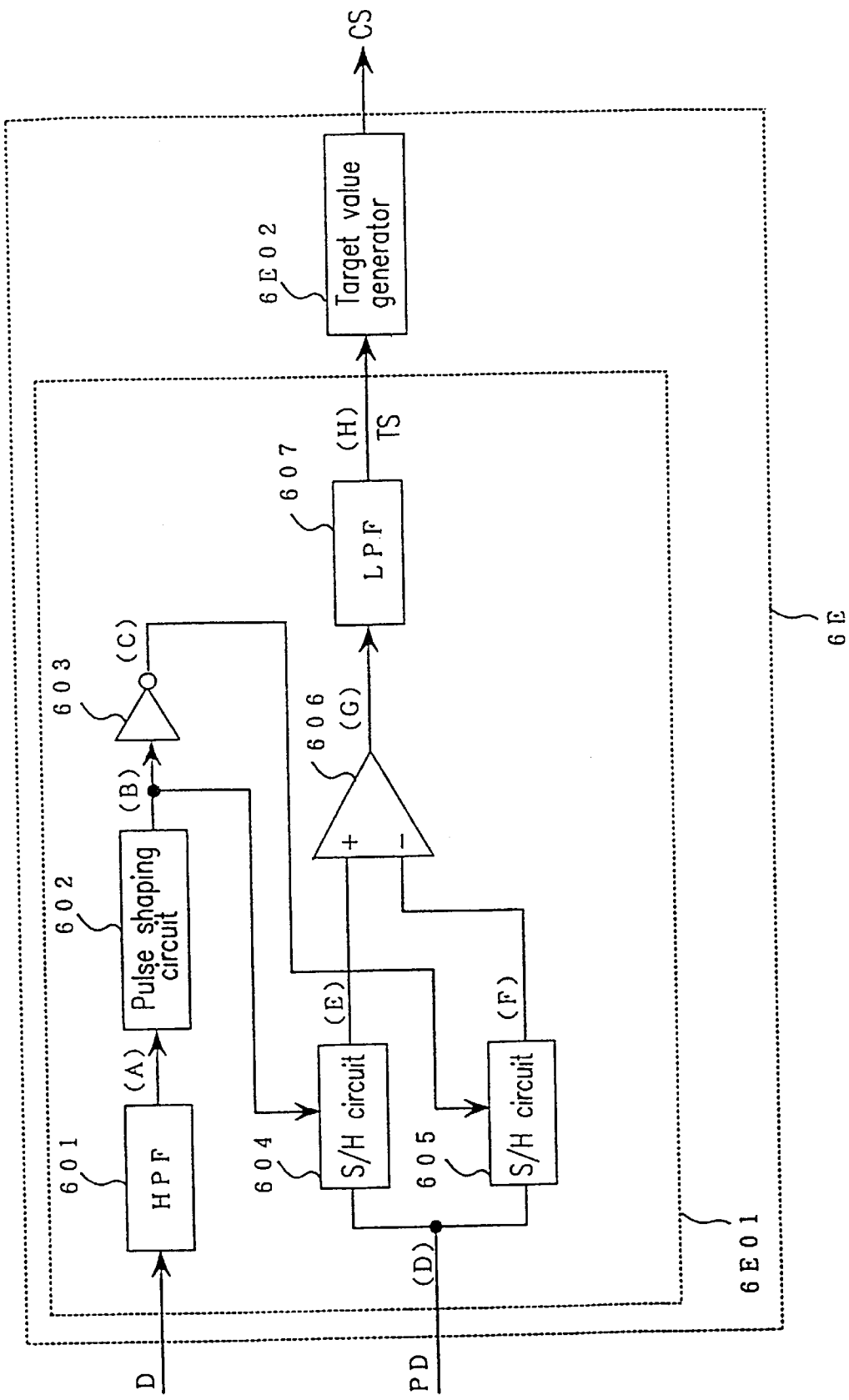
FIG. 29 is a block diagram showing a configuration for a target value variable circuit 6E in the fifth example of the present invention.

FIG. 29 is a block diagram showing a configuration for the target value variable circuit 6E. In FIG. 29, a target value detector is denoted by 6E01 and a target value generator is denoted by 6E02. Like the target value generator 6D02, the target value generator 6E02 receives the target value signal TS, amplifies the signal TS with a predetermined gain, and then outputs the amplified signal TS as a correction signal CS for varying the target value of the tilt control to the tilt controller 9. The configuration shown in FIG. 29 is the same as that shown in FIG. 22 except that the disturbance signal D from the disturbance generator 13 is input to an HPF 601. The HPF 601 extracts the AC component of the disturbance signal D output from the disturbance generator 13.

In this example, the target value detector 6E01 detects the polarity of the disturbance signal D from the AC component of the disturbance signal D output from the disturbance generator 13. The disturbance signal D output from the disturbance generator 13 is input to the tilting mechanism 10 via the adder 14, thereby driving the tilting mechanism 10 in a constant period. When the tilting mechanism 10 is driven by the disturbance signal D via the adder 14, the target value variable circuits 6E detects the polarity of the pulse width variation signal PD output from the pulse width variation detector 5, the polarity corresponding to the polarity of the disturbance signal D, and the level thereof, so as to output a target value signal TS. The target value generator 6E02 amplifies the target value signal TS output from the target value detector 6E01, so as to output the amplified signal as a correction signal CS.

Figure 30:
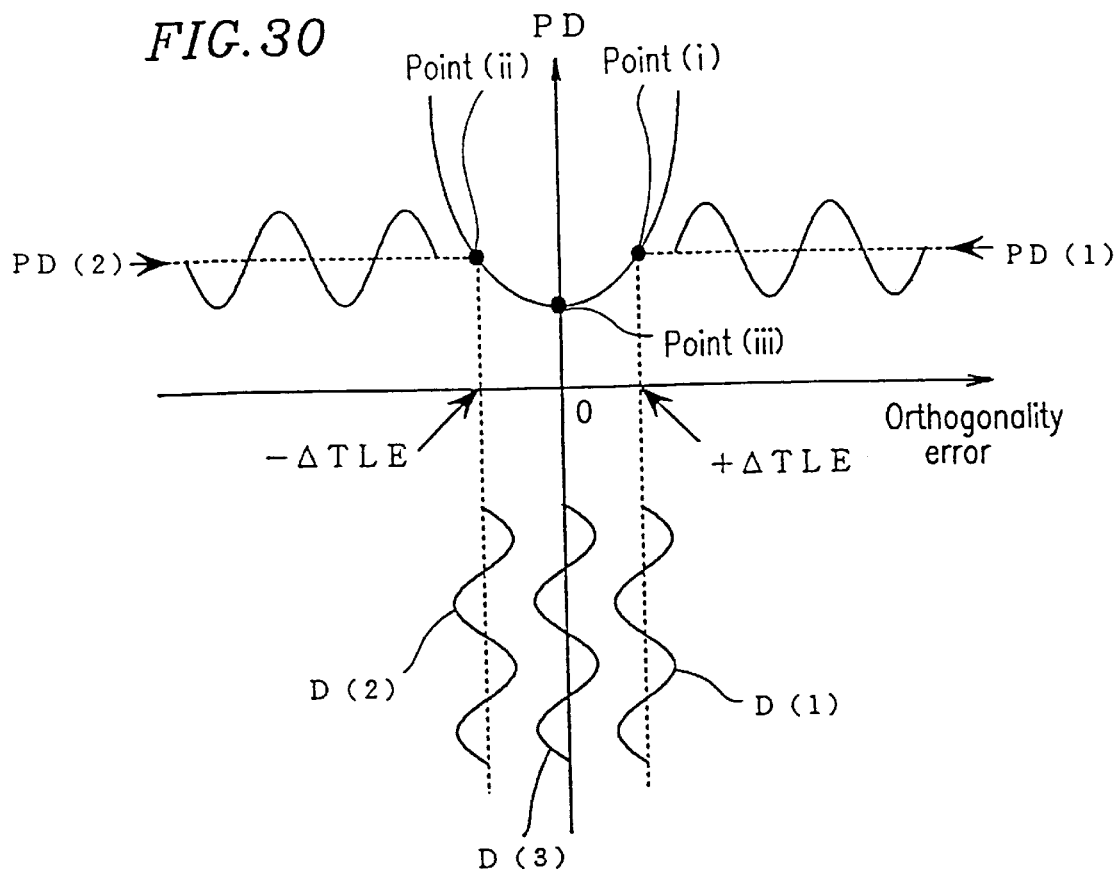
FIG. 30 is a graph showing the relationship between the orthogonality error and the value of the pulse width variation signal PD for illustrating the operation of a target value detector 6E01 in the fifth example of the present invention.
Figure 31:
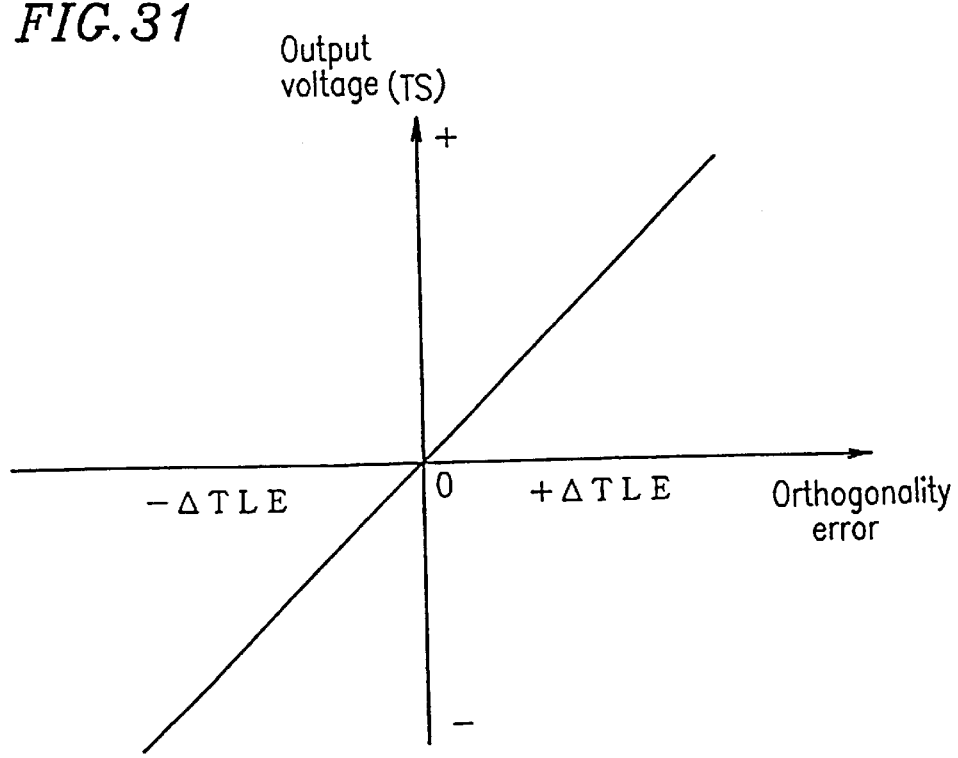
FIG. 31 in a graph showing the relationship between the orthogonality error and an output voltage TS of the target value detector 6E01 in the fifth example of the present invention.
Figure 32:
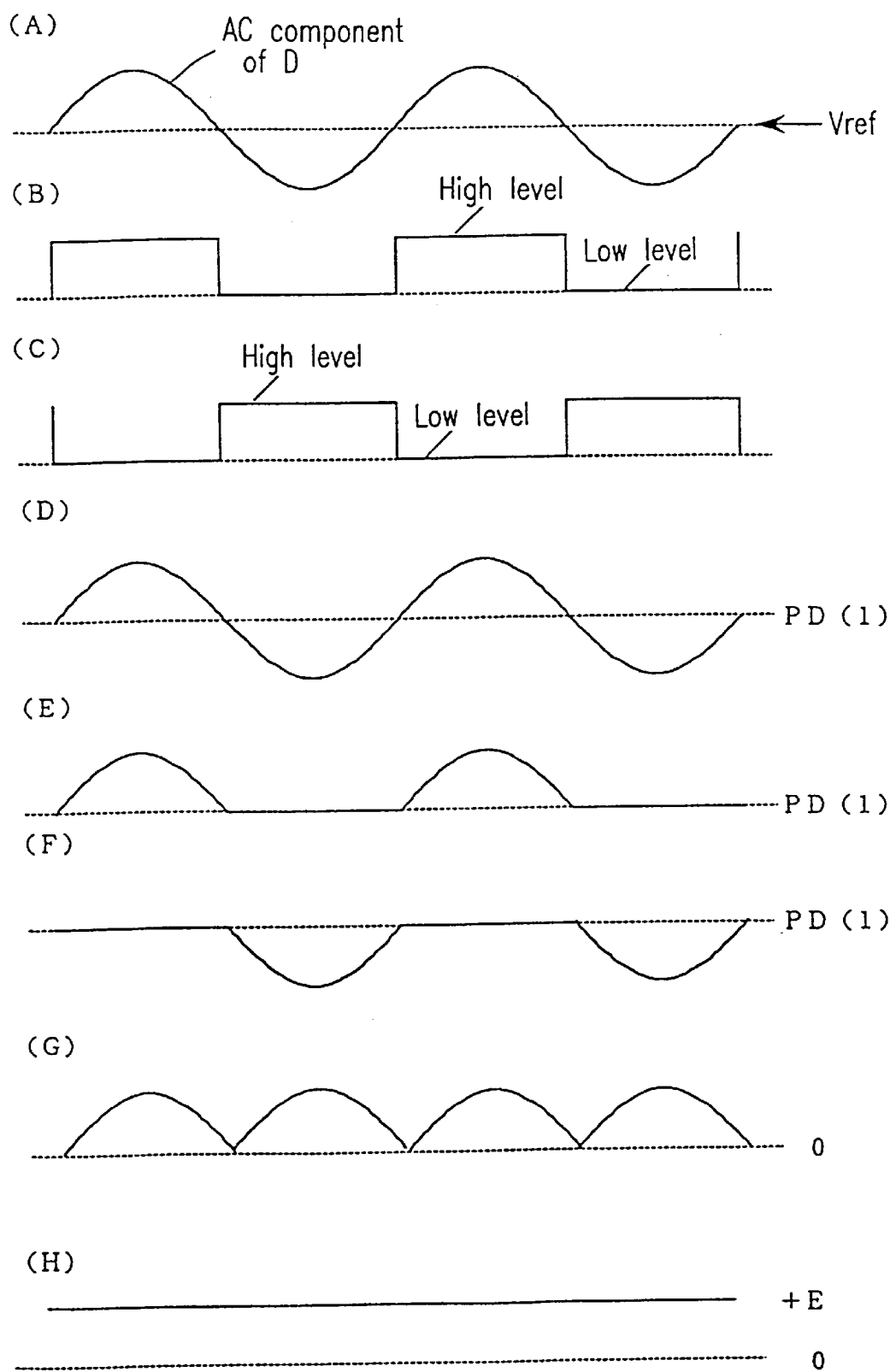
FIG. 32 (including subparts A–H) is a waveform chart illustrating the operation of the target value detector 6E01 when the amount of the orthogonality error is +ΔTLE in the fifth example of the present invention.
Figure 33:
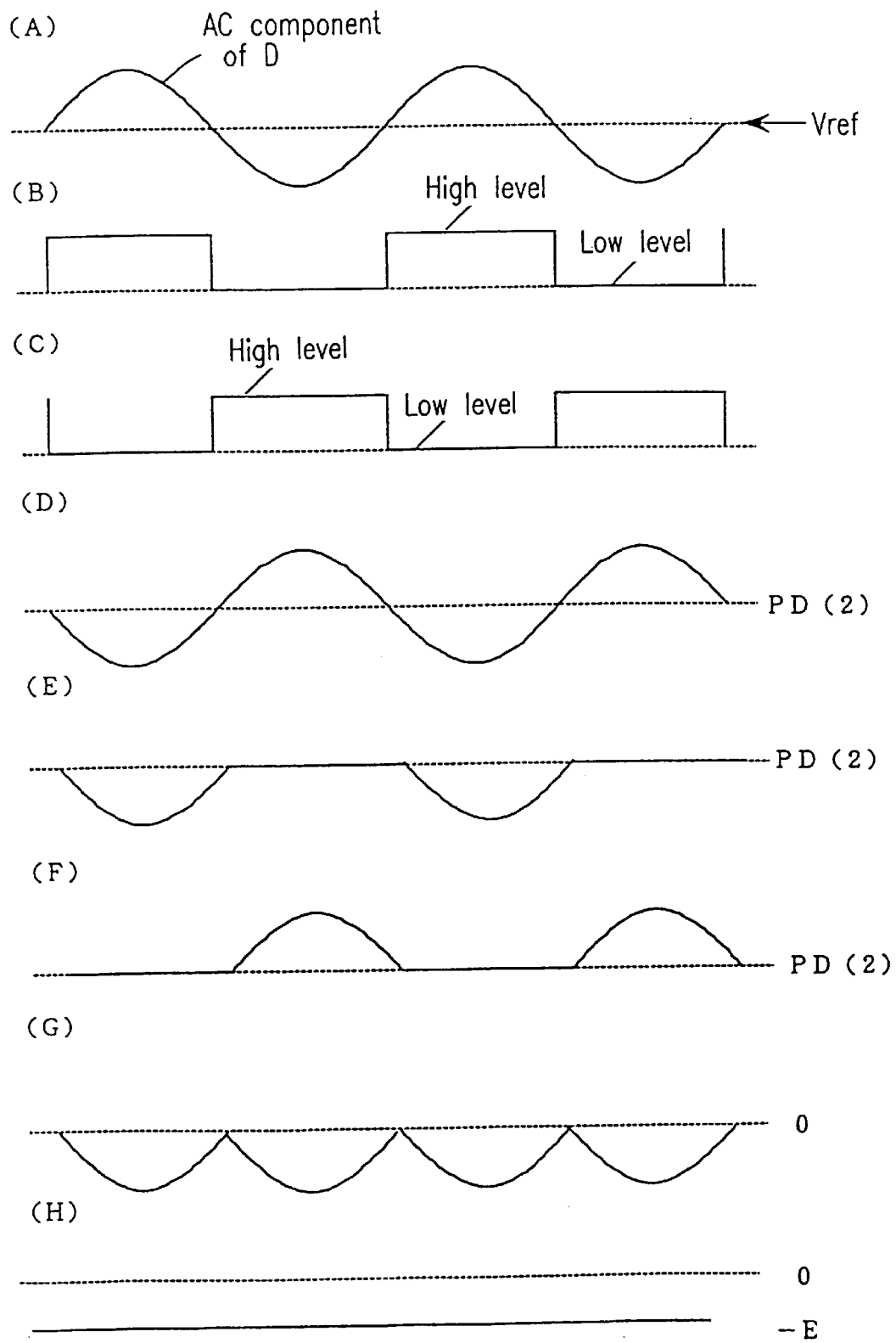
FIG. 33 (including subparts A–H) is a waveform chart illustrating the operation of the target value detector 6E01 when the amount of the orthogonality error is −ΔTLE in the fifth example of the present invention.
Figure 34:
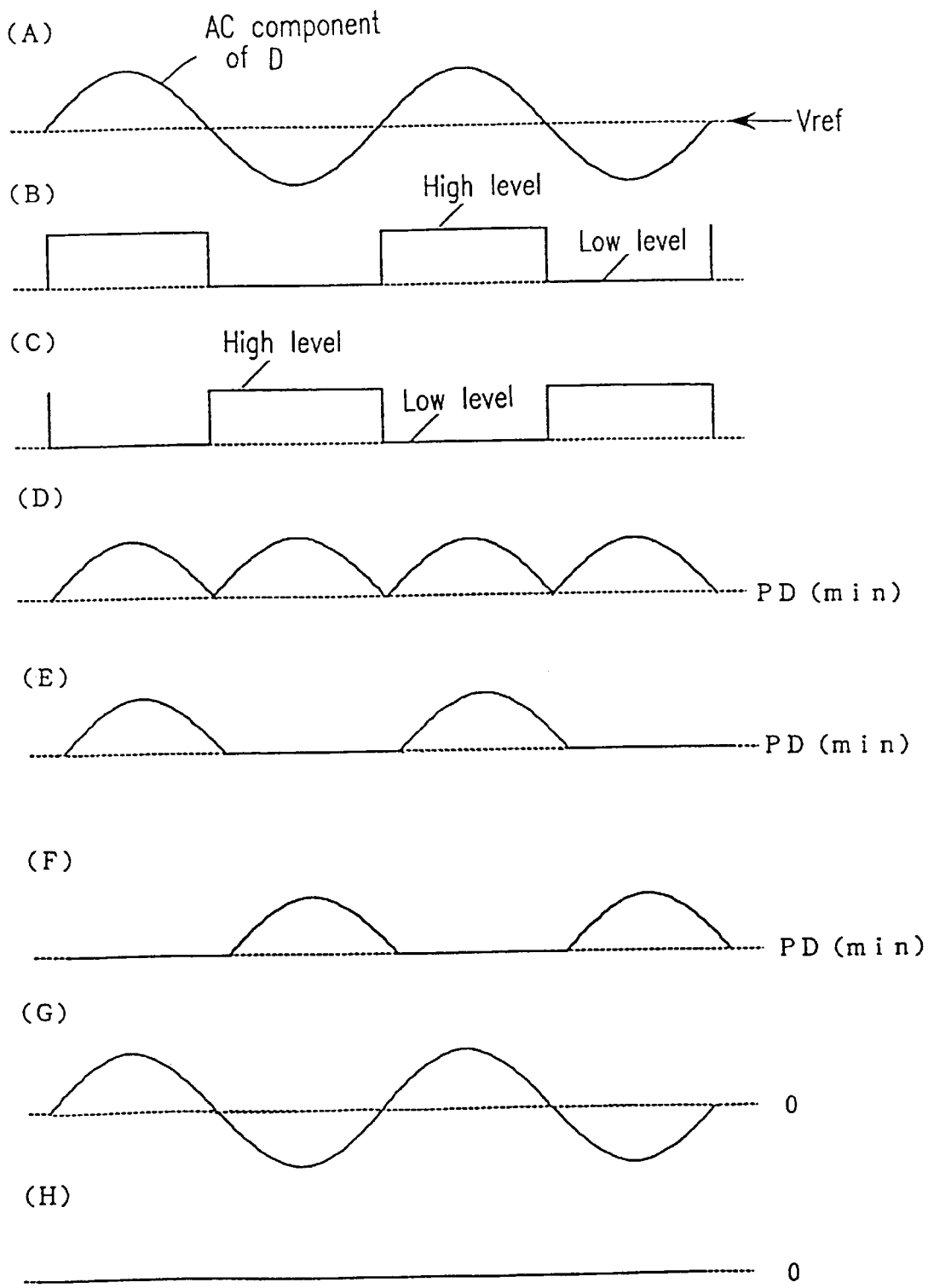
FIG. 34 (inculding subparts A–H) is a waveform chart illustrating the operation of the target value detector 6E01 when the orthogonality error is zero in the fifth example of the present invention.

FIG. 30 is a graph showing the relationship between the orthogonality error and the value of the pulse width variation signal PD for illustrating the operation of the target value detector 6E01 of the fifth example. FIG. 31 is a graph showing the relationship between the orthogonality error and an output voltage TS of the target value detector 6E01. FIG. 32 is a waveform chart illustrating the operation of the target value detector 6E01 when the amount of the orthogonality error is +ΔTLE. FIG. 33 is a waveform chart illustrating the operation of the target value detector 6E01 when the amount of the orthogonality error is −ΔTLE. FIG. 34 is a waveform chart illustrating the operation of the target value detector 6E01 when the orthogonality error is zero.

As shown in FIG. 30, the value of the pulse width variation signal PD becomes minimum when the orthogonality error is zero, and the polarity of the pulse width variation signal PD when the orthogonality error is +ΔTLE is opposite to the polarity of the pulse width variation signal PD when the orthogonality error is −ΔTLE. Next, referring to FIG. 32, it will be described how the target value detector 6E01 operates when the orthogonality error is +ΔTLE and the AC component of the disturbance signal D is D(1) at a point (i) in FIG. 30. The same matters as those described referring to FIG. 26 will not be described herein. In the same way as in (A) to (H) in FIG. 25, (A) to (H) of FIG. 32 show the waveform of the respective signal shown in (A) to (H) in FIG. 29. The signal shown in (A) in FIG. 32 is the AC component of the disturbance signal D. The level of the signal shown in (B) in FIG. 32 becomes high when the signal shown in (A) in FIG. 32 (D(1) shown in FIG. 29) is larger than ΔTLE. In the same way as the case shown in FIG. 25, the differential operation circuit 606 receives the signals shown in (E) and (F) in FIG. 32 and calculates the difference between these signals, so as to output the difference as the signal shown in (G) in FIG. 32. The signal shown in (H) in FIG. 32 is a signal obtained by extracting the DC component by the LPF 607. The signal shown in (H) in FIG. 32 is obtained by detecting the polarity and the level of the orthogonality error based on the value of the pulse width variation signal PD at the point (i) in FIG. 30 and the signal is output as a positive voltage value.

Next, referring to FIG. 33, it will be described how the target value detector 6E01 operates when the orthogonality error is −ΔTLE and the AC component of the disturbance signal D is D(2) at a point (ii) in FIG. 30. The same matters as those described referring to FIGS. 25, 28 and 32 will not be described herein. In the same way as in (A) to (H) in FIG. 32, (A) to (H) of FIG. 33 show the waveforms of the respective signals shown in (A) to (H) in FIG. 29. The signal shown in (G) in FIG. 33 is a signal obtained by calculating the difference between the signals shown in (E) and (F) in FIG. 33 and has the same waveform as that shown in (G) in FIG. 25. The signal shown in (H) in FIG. 33 is a signal obtained by extracting the DC component by the LPF 607. The signal shown in (H) in FIG. 33 is obtained by detecting the polarity and the level of the orthogonality error based on the value of the pulse width variation signal PD at the point (ii) in FIG. 30 and the signal is output as a negative voltage value.

Next, referring to FIG. 34, it will be described how the target value detector 6E01 operates when the orthogonality error is zero and the AC component of the disturbance signal D is D(3) at a point (iii) in FIG. 30. The same matters as those described referring to FIGS. 25, 27 and 32 will not be described herein. In the same way as (A) to (H) in FIG. 32, (A) to (H) of FIG. 34 shows the waveform of the respective signal in (A) to (H) in FIG. 29. The signal shown in (G) in FIG. 34 is a signal obtained by calculating the difference between the signals shown in (E) and (F) in FIG. 34, and has the same waveform as that shown in (G) in FIG. 27. The signal shown in (H) in FIG. 34 is a signal obtained by extracting the DC component by the LPF 607. The signal shown in (H) in FIG. 34 is obtained by detecting the polarity and the level of the orthogonality error based on the value of the pulls width variation signal PD at the point (iii) in FIG. 30 and the output voltage negative value becomes zero in this case.

The operation of the target value detector 6E01 at the points (i), (ii) and (ii) shown in FIG. 30 has been described with reference to FIGS. 32; 33 and 34. FIG. 31 shows the relationship between the orthogonality error and the value of the pulse width variation signal PD shown in FIG. 30 as a relationship between the orthogonality error and the output voltage TS of the target value detector 6E01.

As described above, the target value variable circuit 6E of the fifth example detects the target value signal TS at a point where the orthogonality error becomes zero when the value of the pulse width variation signal PD is minimum based on the pulse width variation signal PD output from the pulse width variation detector 5 and the disturbance signal D output from the disturbance generator 13, and then outputs a correction signal CS based on the target value signal TS. Therefore, the tilt control apparatus of the fifth example operates so that the value of the pulse width variation signal PD output From the pulse width variation detector 5 becomes minimum by varying the control target value or the tilt controller 9 in response to the correction signal CS output from the target value variable circuit 6E. In this fifth example, even when the AC component of the orthogonality error signal TLE is small, the polarity and the level of the orthogonality error can be detected based on the AC component of the disturbance signal D output from the disturbance generator 13 and the value of the pulse width variation signal PD. As a result, even if an error in caused in the orthogonal relationship because of the degradation in the characteristics of the tilt sensor 7 with the passage of time or owing to the variation in the temperature, the error can be corrected at real time so as to be always zero.

EXAMPLE 6

Figure 35:
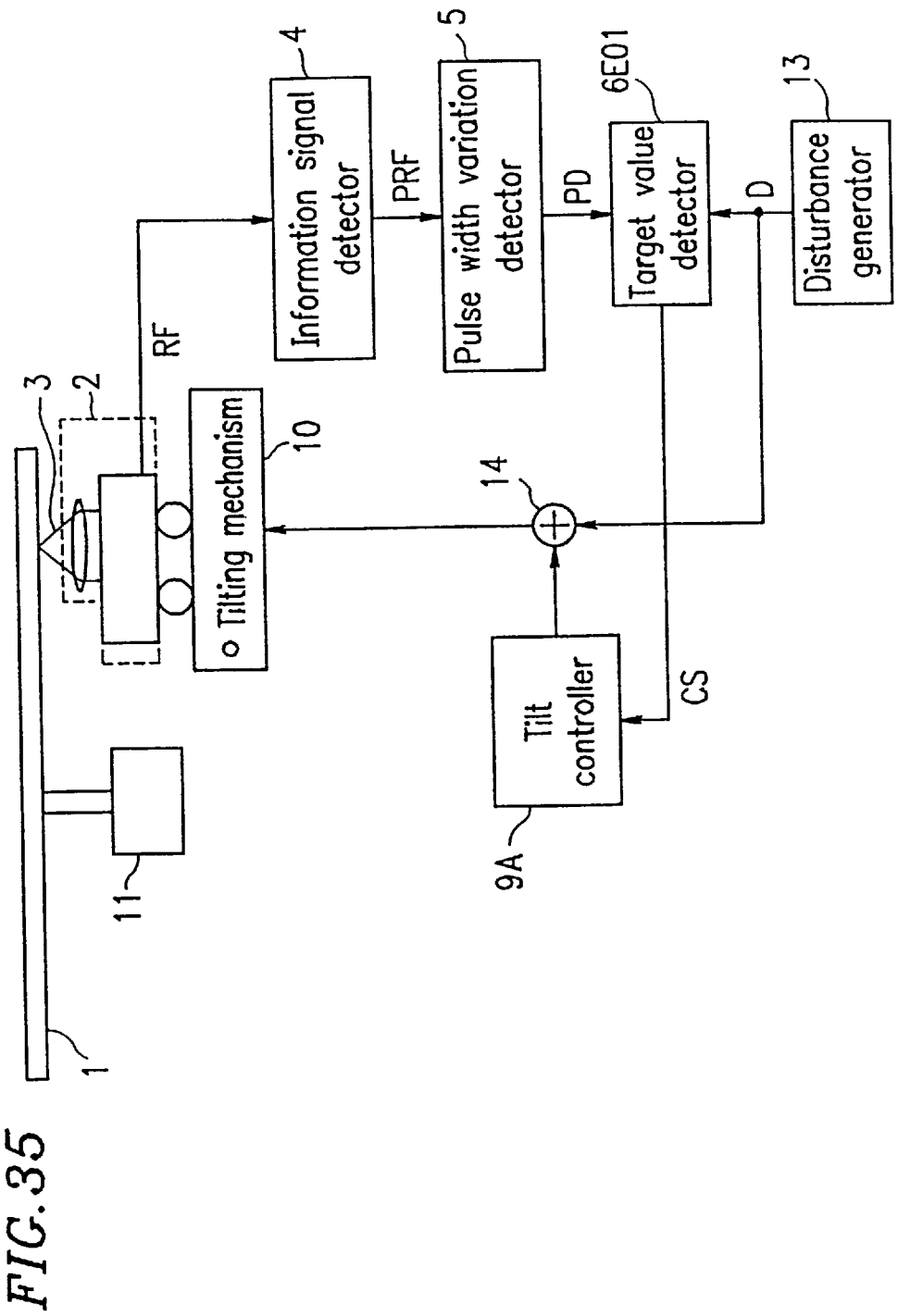
FIG. 35 is a block diagram showing a configuration for a tilt control apparatus in a sixth example of the present invention.

In the sixth example of the invention, the polarity and the level of the orthogonality error are detected based on the values of the pulse width variation signal PD and the disturbance signal D and the tilt control is performed based on the detected orthogonality error without using a tilt sensor. FIG. 35 is a block diagram showing a configuration for a tilt control apparatus of the sixth example. A target value detector 6E01 detects the amount, corresponding to the pulse width variation signal PD, and the polarity of the error in the orthogonal relationship between the optical disk 1 and the optical axis of the light beam 3 as a voltage based on the disturbance signal D output from a disturbance generator 13 to be described later and the pulse width variation signal PD output from the pulse width variation detector 5, so as to generate a signal for varying the target value of the tilt control, i.e., a target value signal TS, in accordance with the detected amount and polarity of the orthogonality error, and output the signal TS to the tilt controller 9A.

The tilt controller 9A controls the tilting mechanism 10 via an adder 14 to be described later based on the target value signal TS output from the target value detector 6E01 so that the optical disk 1 falls at right angles with the optical axis of the light beam 3 irradiated onto the optical disk 1. The tilt controller 9A is the same as the tilt controller 9A shown in FIG. 9 except that the tilt controller 9A of the sixth example receives the correction signal CS instead of the orthogonality error signal TLE. The disturbance generator 13 outputs a disturbance signal to one of the two input terminals of then adder 14, thereby driving the tilting mechanism 10 in a constant period. The adder 14 adds the disturbance signal D output from the disturbance generator 13 and the output signal from the tilt controller 9A.

The operation of the tilt control apparatus having the above-described configuration will be described with reference to FIG. 35. The same matters as those of the fifth example will not be described herein.

The target value detector 6E01 shown in FIG. 35 operates in the same way as the target value detectors 6E01 shown in FIG. 29. The disturbance signal D output from the disturbance generator 13 and the pulse width variation signal PD output from the pulse width variation detector 5 are input to the target value detector 6E01. The tilt controller 9A shown in FIG. 35 has a similar configuration to that of the tilt controller 9A shown in FIG. 9. In FIG. 9, the orthogonality error signal TLE output from the orthogonality error detector 801 is input to the tilt controller 9A. In FIG. 35, instead of the orthogonality error signal TLE, the correction signal CS output from the target value detector 6E01 is input to the tilt controller 9A. The target value detector 6E01 operates in the same way as that of the target value variable circuit 6E shown in FIG. 28 and detects the correction signal CS based on the disturbance signal D output from the disturbance generator 13 and the pulse width variation signal PD output from the pulse width variation detector 5. That is to say, in this sixth example, when the tilting mechanism 10 is driven in a constant period based on the disturbance signal D output from the disturbance generator 13, the polarity and the level of the orthogonality error can be detected by the target value detector 6E01 as the correction signal CS based on the disturbance signal D and the pulse width variation signal PD. The tilting mechanism 10 is controlled by the signal output from the tilt controller 9A via the adder 14 based on the detected correction signal CS. As a result, the tilt control apparatus of this example operates so that the correction signal CS becomes zero.

Therefore, in this sixth example, the tilt control apparatus can detect the polarity and the level of the orthogonality error based on the pulse width variation signal PD output from the pulse width variation detector 5 and the disturbance signal D output from the disturbance generator 13 so that the orthogonality error becomes zero when the value of the pulse width variation signal PD becomes minimum. As a result, the orthogonality error can be controlled to be zero without using the tilt sensor 7.

EXAMPLE 7

Figure 36:
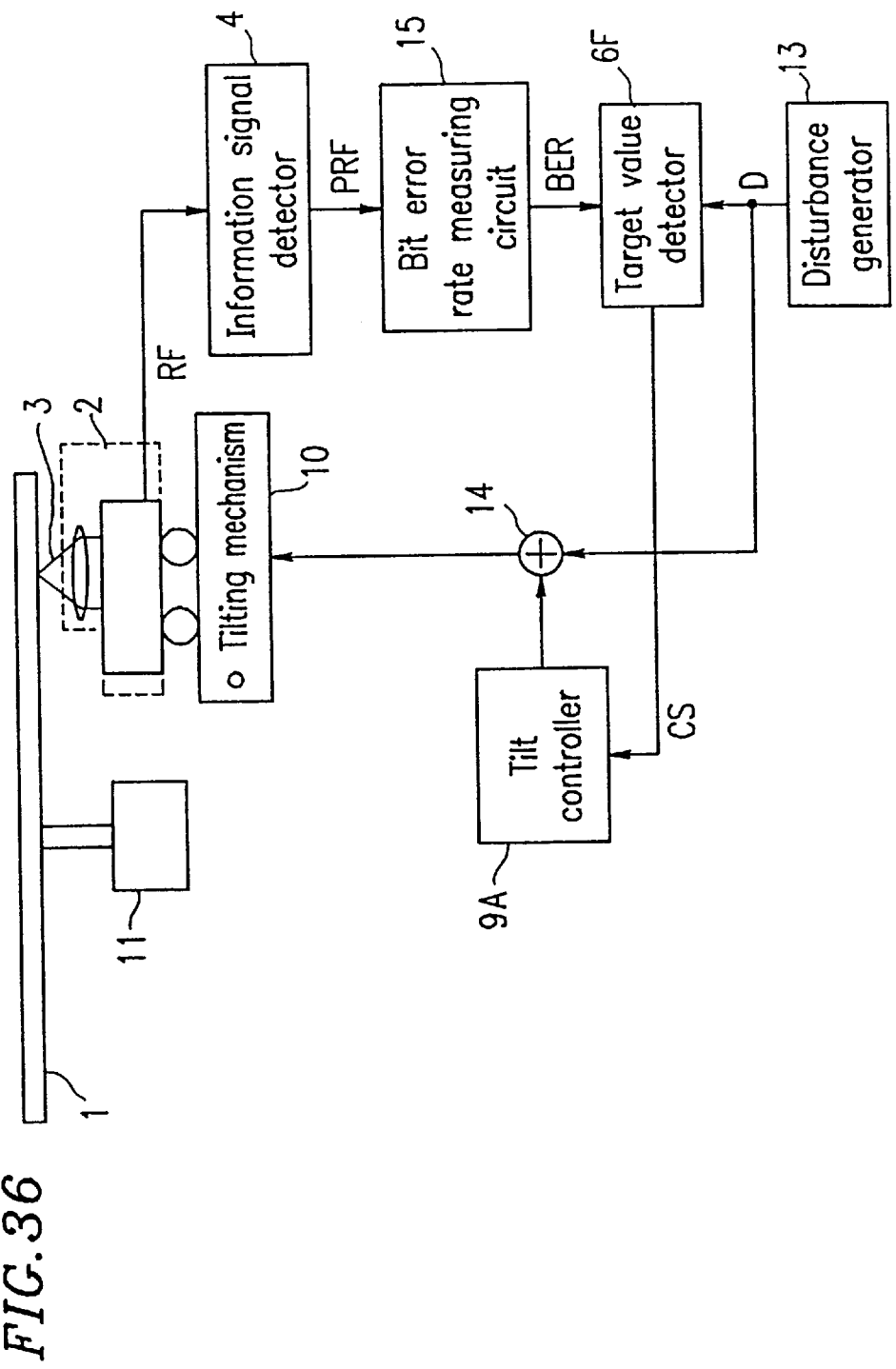
FIG. 36 is a block diagram showing a configuration for a tilt control apparatus in a seventh example of the present invention.
Figure 37:
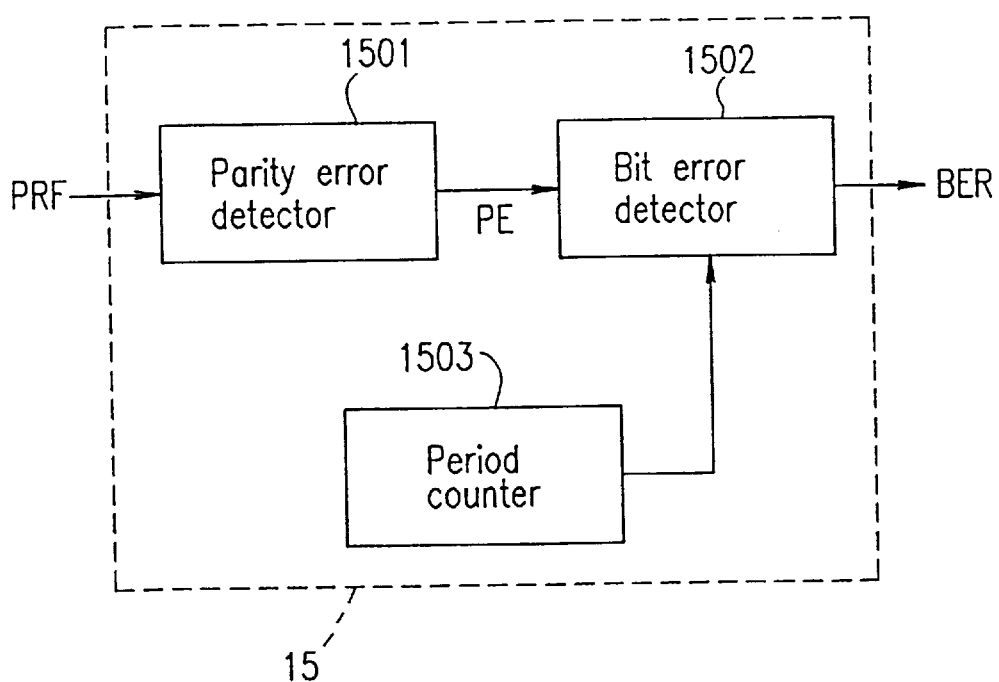
FIG. 37 is a block diagram showing an internal configuration for a hit error measuring circuit 15 in the seventh example of the present invention.

In the seventh example, the tilt control is performed so that a bit error rate of the reproduced signal becomes minimum. FIG. 36 is a block diagram showing a configuration for a tilt control apparatus of the seventh example. A bit error rate measuring circuit 15 detects the bit error rate of the reproduced signal, thereby outputting a voltage signal BER corresponding to the bit error rate. FIG. 37 is a block diagram showing an internal configuration for the bit error rate measuring circuit 15. The bit error rate measuring circuit 15 includes: a parity error detector 1501; a bit error detector 1502; and a period counter 1503. The parity error detector 1501 receives an RF pulse signal PRF so as to output a parity error signal PE. A parity bit is added to each symbol data of the data recorded on the optical disk 1. When a parity error is caused in the parity bit and the data reproduced from the RF pulse signal PRF, the parity error detector 1501 sets the level of the parity error signal PE to be high. The period counter 1503 periodically outputs a pulse signal to the bit error detector 1502. The bit error detector 1502 counts how many times the parity error signal PE become high during one period of the pulse signal output from the period counter 1503, so as to output the counted value as a signal BER indicating the bit error rate.

A target value detector 6F detects the amount, corresponding to the signal BER, and the polarity of the error in the orthogonal relationship between the optical disk 1 and the optical axis of the light beam 3 as a voltage based on the disturbance signal D output from a disturbance generator 13 to be described later and the signal BER output from the bit error rate measuring circuit 15, so as to generate a signal, i.e., a correction signal CS, for varying the target value of the tilt control in accordance with the detected amount and polarity of the orthogonality error and output the signal CS to the tilt controller 9A. The tilt controller 9A controls the tilting mechanism 10 via an adder 14 to be described later based on the correction signal CS output from the target value detector 6F so that the optical disk 1 falls at right angles with the optical axis of the light beam 3 irradiated onto the optical disk 1. The tilt controller 9A is the same as the tilt controller 9A shown in FIG. 9 except that the tilt controller 9A of the seventh example receives the correction signal CS instead of the orthogonality error signal TLE. The disturbance generator 13 outputs a disturbance signal D to one of the two input terminals of the adder 14, thereby driving the tilting mechanism 10 in a constant period. The adder 14 adds the disturbance signal D output from the disturbance generator 13 and the output signal from the tilt controller 9A, thereby outputting the sum to the tilting mechanism 10.

The operation of the tilt control apparatus having the above-described configuration will be described with reference to FIGS. 36 and 38. The same matters already described in the foregoing examples will not be described herein.

Figure 38:
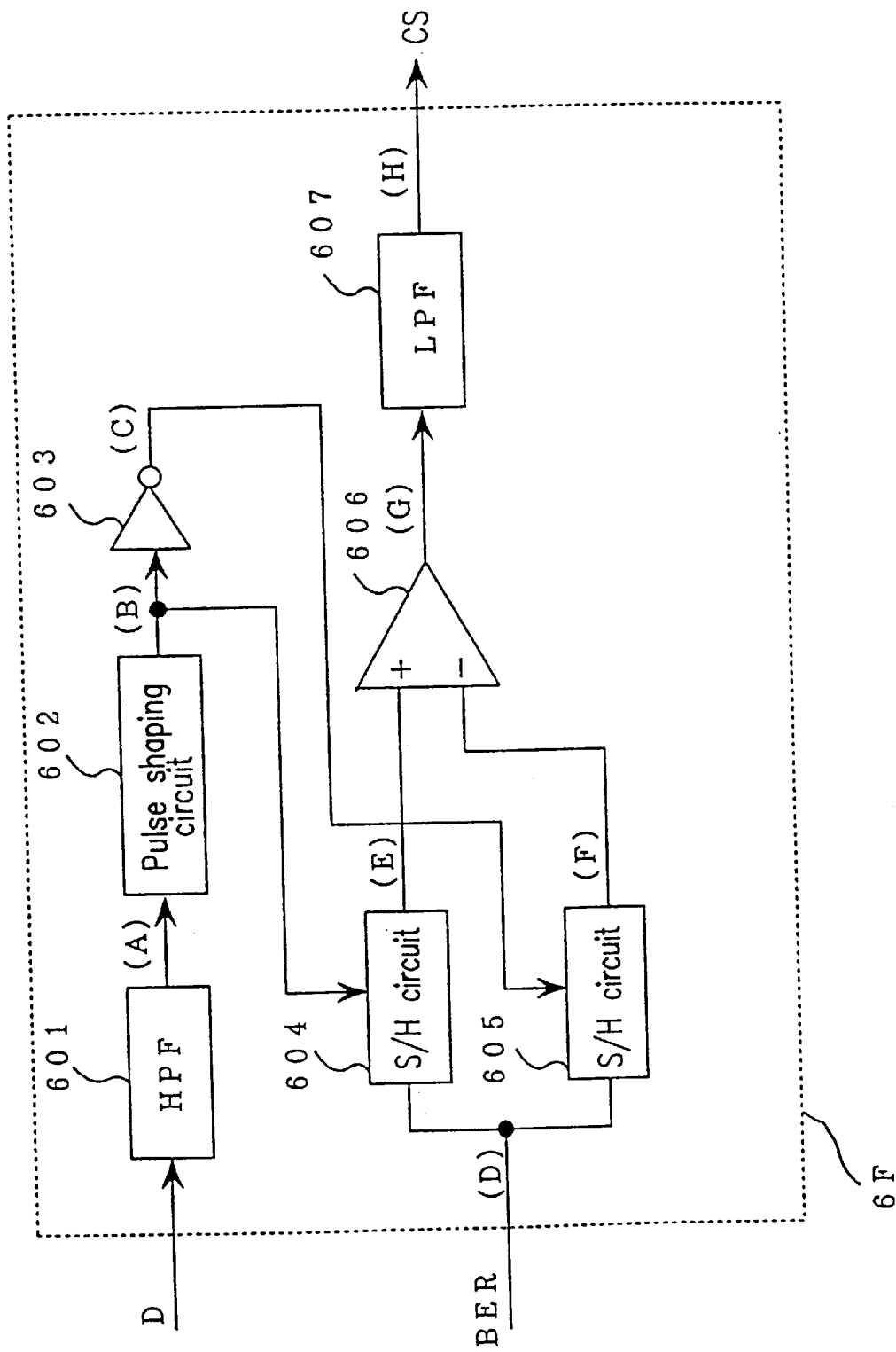
FIG. 38 is a block diagram showing a configuration for a target value detector 6F in the seventh example of the present invention.

FIG. 38 is a block diagram showing a configuration for the target value detector 6F. The target value detector 6F shown in FIG. 38 operates in the same way as the target value detector 6E01 shown in FIG. 29 except that the disturbance signal D output from the disturbance generator 13 and the signal BER, representing the bit error rate as a voltage level signal, output from the bit error rate measuring circuit 15 are input to the target value detector 6F. The tilt controller 9A shown in FIG. 36 has a similar configuration to that of the tilt controller 9A shown in FIGS. 9 and 35. In FIG. 9, the orthogonality error signal TLE output from the orthogonality error detector 801 is input to the tilt controller 9A. In FIG. 35, the correction signal CS output from the target value detector 6E01 is input to the tilt controller 9A instead of the orthogonality error signal TLE. However, in FIG. 36, instead of the orthogonality error signal TLE or the correction signal CS, a correction signal CS output from the target value detector 6F based on the bit error rate is input to the tilt controller 9A. The target value detector 6F operates in the same way as the target value detector 6E01 in FIG. 28 and 35 and receives the disturbance signal D output from the disturbance generator 13 and the signal BER output from the bit error rate measuring circuit 15 so as to output a correction signal CS. That is to say, in this seventh example, when the tilting mechanism 10 is driven in a constant period based on the disturbance signal D output from the disturbance generator 13, the polarity and the level of the orthogonality error can be detected by the target value detector 6F as the correction signal CS based on the disturbance signal D and the signal BER output from the bit error rate measuring circuit 15. The tilting mechanism 10 is controlled by the signal output from the tilt controller 9A via the adder 14 based on the detected correction signal CS. As a result, the tilt control apparatus of this example operates so that the correction signal CS becomes zero.

Therefore, in this seventh example, the tilt control apparatus can detect the polarity and the level of the orthogonality error based on the signal BER output from the bit error rate measuring circuit 15 and the disturbance signal D output from the disturbance generator 13 so that the orthogonality error becomes zero when the value of the bit error rate signal BER becomes minimum. As a result, the orthogonality error can be controlled to be zero without using the tilt sensor 7.

EXAMPLE 8

Figure 39:
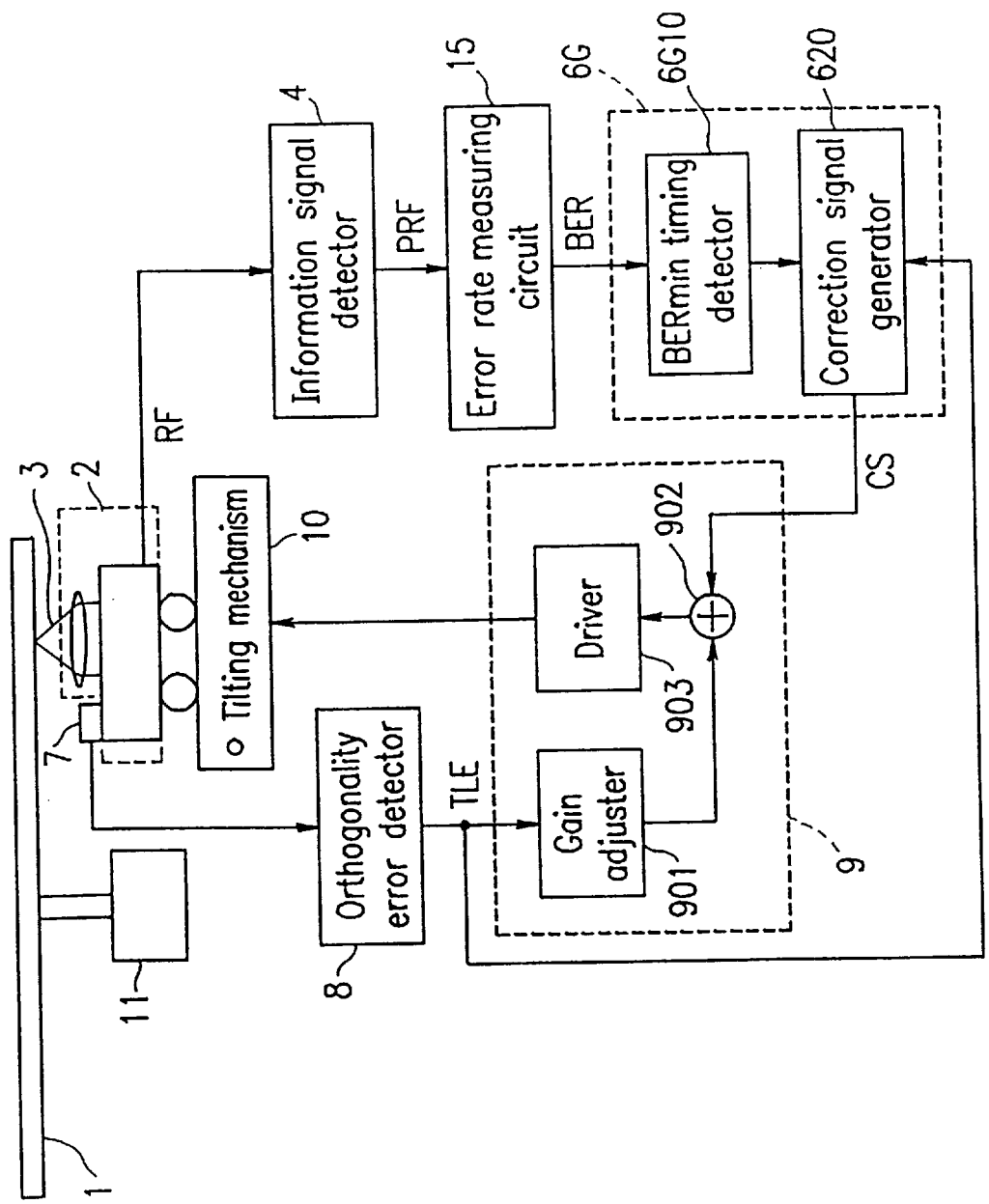
FIG. 39 is a block diagram showing a configuration for a tilt control apparatus in an eighth example of the present invention.

In the eighth example, in performing a tilt servo operation using a tilt sensor, the target value of the tilt control is varied so that a bit error rate of the reproduced signal becomes minimum. FIG. 39 is a block diagram showing a configuration for a tilt control apparatus of the eighth example. In the first example, the target value of the tilt control is varied based on the pulse width variation signal PD. However, in this example, the target value of the tilt control is varied based on the error rate. As already described in the seventh example referring to FIG. 37, the error rate measuring circuit 15 detects the bit error rate of the reproduced signal, thereby outputting a voltage signal BER corresponding to the bit error rate. The target value variable circuit 6G generates a correction signal CS for varying the target value of the tilt control based on the signal BER output from the error rate measuring circuit 15, so as to output the signal CS to the tilt controller 9. The target value variable circuit 6G operates in the same way as that described in the first example except that the target value variable circuit 6G of this example receives the signal BER corresponding to the bit error rate. The tilt controller 9 varies the target value of the tilt control in response to the correction signal CS output from the target value variable circuit 5G, thereby controlling so that the optical disk 1 falls at right angles with the optical axis of the light beam 3 irradiated onto the optical disk 1. The orthogonality error signal TLE output from the orthogonality error detector 8 is input to the tilt controller 9. As already described in the first example, the tilt controller 9 performs the tilt control based on the orthogonality error signal TLE output from the orthogonality error detector 8.

The tilt control apparatus having the above-described configuration will be described with reference to FIGS. 39 and 40. The matters already described in the first example will not be described herein. Only the method of the eighth example for searching for the target value of the tilt servo control so that the optical disk 1 falls at right angles with the optical axis of the light beam 3 irradiated onto the optical disk 1 will be described.

Figure 40:
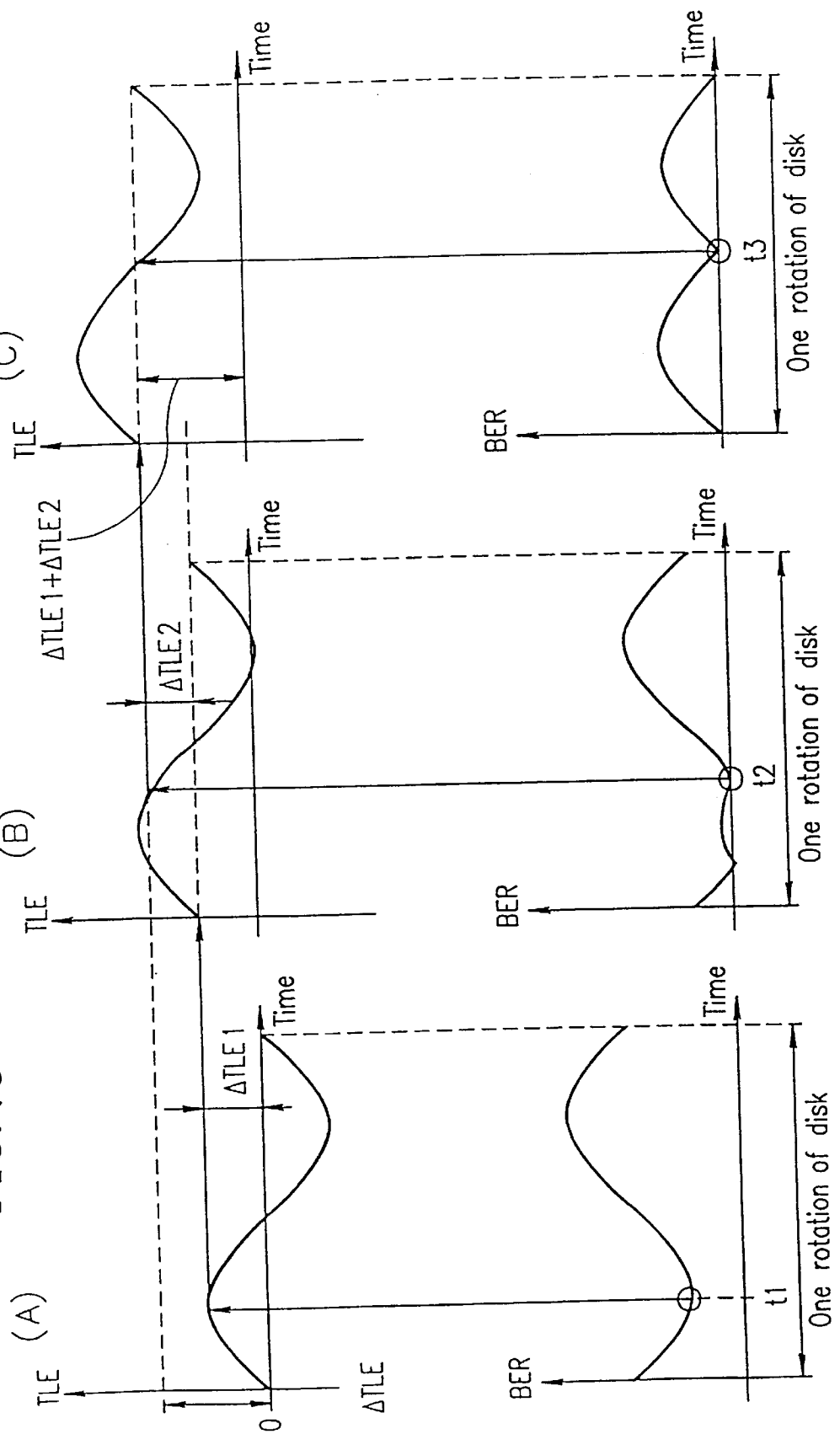
FIG. 40 (including subparts A–C) shows a relationship between the orthogonality error signal TLE and a bit error rate signal BER during the search for the tilt servo target value in the eighth example of the present invention.
Figure 41:
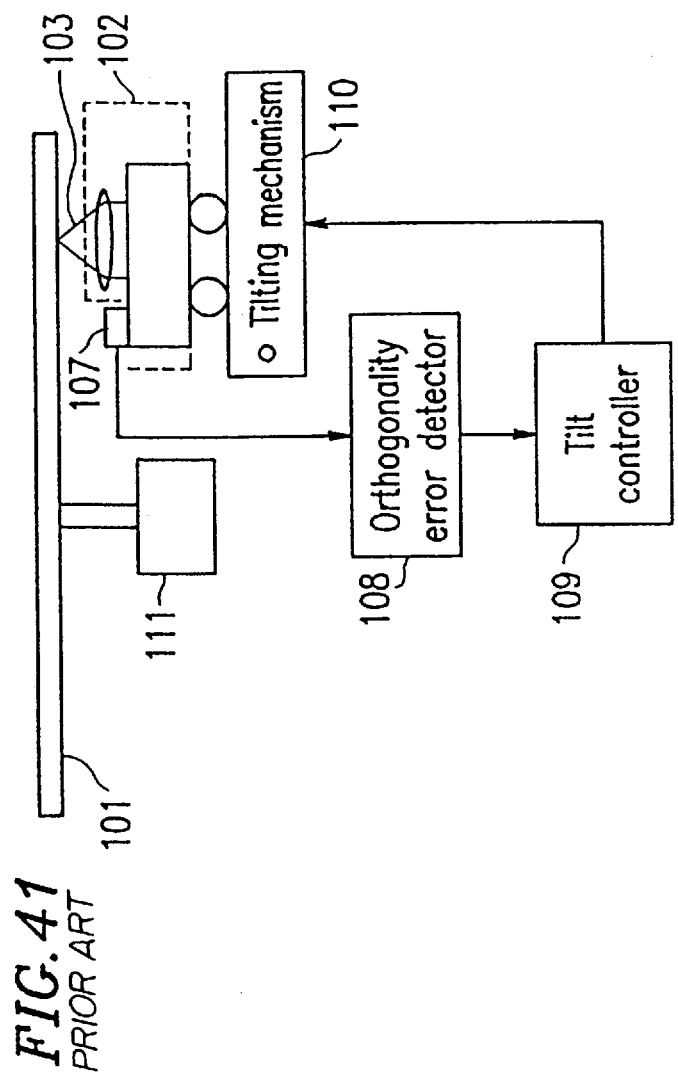
FIG. 41 is a block diagram showing a configuration for a conventional tilt control apparatus.

FIG. 40 shows a relationship between the orthogonality error signal TLE and the bit error rate signal BER during the search for the tilt servo target value. In FIG. 40, when the orthogonality error signal TLE has an offset $\Delta$TLE, the optical disk falls at right angles with the optical axis of the light beam irradiated onto the optical disk. In general, the orthogonality error signal TLE is cyclicly varied in accordance with the rotation of the optical disk or the "warp" of the optical disk itself as shown in (A) to (C) in FIG. 40. In actuality, even when the tilt servo operation is performed in the state where the correction signal CS output from the target value variable circuit 6G is zero, AC (alternating current) tilt component having too high frequency components to be traced by the tilt servo still remain in the orthogonality error signal TLE. In this case, the orthogonality error signal TLE is controlled so that the average value of the cyclic variation becomes zero.

In the case where the offset $\Delta$TLE is larger than the amplitude of the AC tilt component as shown in (A) in FIG. 40, the value of the bit error rate signal BER becomes minimum at either one of the two peaks of the orthogonality error signal TLE. A $BER_{min}$ timing detector 6G10 of the target value variable circuit 6G generates a sampling pulse at a timing at which the value of the bit error rate signal BER becomes minimum. As shown in (A) in FIG. 40, the $BER_{min}$ timing detector 6G10 generates a sampling pulse at a time t1 and then outputs the sampling pulse to a correction signal generator 620. The correction signal generator 620 sample the orthogonality error signal TLE at the timing of the sampling pulse output from the $BER_{min}$ timing detector 6G10. In (A) shown in FIG. 40, the orthogonality error signal TLE having a value of $\Delta$TLE1 is sampled at the time t1. The correction signal generator 620 outputs a correction signal CS having a value of $\Delta$TLE1 to the tilt controller 9.

A gain adjuster 901 of the tilt controller 9 receives the orthogonality error signal TLE, amplifies the orthogonality error signal TLE by an amount required for a feedback control, and then outputs the amplified signal to an adder 902. Herein, the gain of the gain adjuster 901 is assumed to be "1" (or the level of an input signal to the gain adjuster 901 is equal to the level of an output signal therefrom) for simplification. The adder 902 adds the correction signal CS and the signal output from the gain adjuster 901 and then outputs the sum to a driver 903. The driver 903 drives the tilting mechanism 10. The correction signal CS having a value of $\Delta$TLE1 is added to the orthogonality error signal TLE. As a result, the feedback loop is controlled that the average value of the orthogonality error signal TLE becomes $\Delta$TLE1 as shown in (B) in FIG. 40. A difference $\Delta$TLE2 between an expected value of the orthogonality error signal TLE, i.e., an offset value $\Delta$TLE, when the optical disk falls at right angles with the optical axis of the light beam (or when the orthogonality error is zero) and a center value $\Delta$TLE1 of the variation of the orthogonality error signal TLE in (B) in FIG. 40 becomes: $\Delta$TLE2=$\Delta$TLE-$\Delta$TLE1.

If the offset $\Delta$TLE is located within the amplitude of the AC tilt component of the orthogonality error signal TLE (or between the two peak values) as shown in (B) in FIG. 40, the value of the bit error rate signal BER becomes minimum at a time, e.g., a time t2, when the information regarding surface of the optical disk 1 falls at right angles with the optical axis of the light beam 3. In the vicinity of the time t2, the curve of the bit error rate signal BER is varied in a turnup shape.

The $BER_{min}$ timing detector 6G10 generates a sampling pulse again at a time at which the value of the hit error rate signal BER becomes minimum. As shown in (B) in FIG. 40, the $BER_{min}$ timing detector 6G10 generates a sampling pulse again at a time t2 and then output the sampling pulse to the correction signal generator 620. The correction signal generator 620 samples an orthogonality error signal TLE having an offset value $\Delta$TLE (=$\Delta$TLE1+$\Delta$TLE2) at the time t2. The corrections signal generator 620 outputs a correction signal CS having an offset value $\Delta$TLE to the tilt controller 9.

The sampled offset $\Delta$TLE is added to the orthogonality error signal TLE. As a result, as shown in (C) in FIG. 40, the orthogonal relationship between the optical disk 1 and the optical axis of the light beam 3 is satisfied to a center position of the cyclic variation of the orthogonality error signal TLE.

As is obvious from the foregoing description, the offset ΔTLE con be cancelled by sampling the orthogonality error signal TLE twice at the timings at which the value of the bit error rate signal BER becomes minimum. The larger the difference between the amplitude of the AC tilt component of the orthogonality error signal TLE and the offset ΔTLE is, the more times the sampling is required to be performed.

If the correction represented by the following Equation (8) is steadily performed during the operation of the recording and reproducing apparatus, the orthogonality error can be reduced to zero even if an error is caused in the tilt sensor because of the variation in the temperature of the sensor after the apparatus is turned on or owing to the degradation of the characteristics of the sensor with the passage of time.

$$\Delta TLE_i = \Delta TLE_{i-1} + \Delta TLE_x \quad (8)$$

where ΔTLEi−1 and ΔTLEi denotes the correction offset amount of an (i−1)th (or previous) processing and the correction offset amount of an i-th (or current) processing, respectively, and ΔTLEX denotes the amount of the correction offset newly applied in the current processing. In (B) in FIG. 40, for example, ΔTLEi, ΔTLEi−1 and ΔTLEx correspond to ΔTLE, ΔTLE1 and ΔTLE2, respectively.

As described above, in this eighth example, the target value of the tilt control can be corrected by detecting the orthogonality error with high sensitivity based on the bit error rate signal BER, so that the orthogonality position can be searched for with high precision. In the eighth example, the orthogonality position may be searched for by applying a disturbance signal to the tilt servo loop as described referring to FIG. 15.

Instead of the target value detector described in the fourth, fifth and sixth examples, any target value detector having an arbitrary configuration may be used so long as the target value detector can detect the polarity and the level of the orthogonality error based on the pulse width variation signal and the orthogonality error signal or the disturbance signal.

Also, instead of the target value detector described in the seventh example, any target value detector having an arbitrary configuration may be used so long as the target value detector can detect the level of the orthogonality error based on the bit error rate signal and the disturbance signal.

The bit error rate measuring circuit described in the seventh example generates a signal corresponding to the bit error rate. However, the bit error rate measuring circuit can generate a signal so long as the signal corresponds to the amount of any other error during the reproduction operation for a predetermined time period then the bit error rate.

In addition, the same effects can be attained if the value of the pulse width variation used in the second to fifth examples is substituted for the bit error rate used in the seventh sample.

In the fifth, sixth and seventh examples, it is preferable that the disturbance signal output from the disturbance generator 13 can be reproduced without causing any failure even when the orthogonality error is increased by the movement amount of the tilting mechanism based on the disturbance signal.

Next, the timing At which the tilt control apparatus can search for the target value of the tilt control with high precision by using the pulse width variation detector 5 or the bit error rate measuring circuit 15 will be described.

As described above, according to the present invention, the target value of the tilt control is searched for based on the pulse width variation signal or the bit error rate signal of the reproduced signal. Therefore, the target value search operation is not performed until the apparatus is turned off the respective control systems for performing a focusing control, a tracking control and a tilt control are being operated; and a reproduced signal can be obtained from the optical disk. Then, by performing the control target value search operation at least once immediately after the apparatus is turned on, it is possible to correct the error in the orthogonal relationship between the recording surface of the optical disk and the optical axis of the light beam irradiated onto the optical disk which is caused during the tilt servo operation because of the variation in the characteristics of the respective sensors owing to the solid state properties thereof; an error caused during the assembly of the devices; and the degradation in the characteristics of the apparatus with the passage of time.

In addition, according to the present invention, the operation of searching for the target value of the tilt control is always performed during reproducing the information recorded on the disk or recording the information on the disk after the apparatus is turned on and the respective control systems are being operated. Therefore, it is possible to correct the orthogonality error, caused because of the degradation in the characteristics of the apparatus owing to the passage of time or the variation in the temperature, during the tilt servo operation after the control target value search operation is started immediately after the apparatus is turned on.

Furthermore, according to the present invention, the operation of searching for the target value of the tilt control is performed in the state where the respective control systems are being operated and a reproduced signal can be obtained from the disk after the apparatus is turned on, and when the value of the pulse width variation signal detected by the pulse width variation detector or the bit error rate measured by the bit error rate measuring circuit increases to exceed a predetermined value. Accordingly, since the operation of searching for the control target value is not performed unless the operation is required, the control system can be operated with more margin as compared with the case where the operation is continuously performed.

In the foregoing examples, the present invention has been described as being applied to a radial tilt control (or a control of the tilt in the radial direction) for an optical disk. However, the present invention is also applicable to a tangential tilt control (or a control of the tilt in the circumferential direction) for an optical disk by varying the tilt direction of the tilting mechanism and the direction in which the tilt sensor is attached.

According to the present invention, even when the characteristics of the sensors are varied because of the difference in the solid state properties thereof or an error is caused during the assembly of the devices, the orthogonal relationship between the information recording surface of the optical disk and the optical axis of the light beam irradiated onto the optical disk can be maintained, so that the recording operation and/or the reproduction operation can be performed under optimized conditions.

In addition, even when the output of a tilt sensor is varied after the apparatus is turned on because of the degradation in the characteristics of the sensor with the passage of time or owing to the variation in the temperature, the orthogonal relationship between the information recording surface of the optical disk and the optical axis of the light beam irradiated onto the optical disk can be maintained and a tilt servo control can always be performed with high precision, so that the recording operation and/or the reproduction operation can be performed under optimized conditions.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tilt control apparatus for controlling to minimize an error in an orthogonal relationship between an optical disk and an optical axis of a light beam irradiated onto the optical disk, comprising:

an optical pickup for irradiating the light beam onto the optical disk, thereby reproducing information recorded on the optical disk;

orthogonality error detection means for outputting an orthogonality error signal corresponding to the error in the orthogonal relationship between the optical disk and the optical axis;

tilting means for tilting the optical axis;

is tilt control means for controlling such that the optical disk falls at right angles with the optical axis by driving the tilting means in response to the orthogonality error signal, pulse width variation detection means for outputting a pulse width variation signal corresponding to a variation in a pulse width of an information reproduced signal obtained from the optical pickup; and target value variable means for varying a control target value of the tilt control means based on the pulse width variation signal.

2. A tilt control apparatus according to claim 1, wherein the target value variable means outputs a value of the orthogonality error signal when a value of the pulse width variation signal becomes minimum as the control target value to the tilt control means.

3. A tilt control apparatus according to claim 1, wherein the target value variable means sets the control target value at least once after the apparatus is turned on.

4. A tilt control apparatus according to claim 1, wherein the target value variable means sets the control target value during recording or reproducing a signal.

5. A tilt control apparatus according to claim 1, wherein the target value variable means sets the control target value in a case where the value of the pulse width variation signal exceeds a predetermined value during recording or reproducing a signal.

6. A tilt control apparatus according to claim 1, further is comprising timing generation means for generating a timing signal at a center level of an alternating current component of the orthogonality error signal and sampling means for sampling the pulse width variation signal based on the timing signal, wherein the target value variable means controls the control target value of the tilt control means so that a value of the sampled pulse width variation signal becomes minimum.

7. A tilt control apparatus according to claim 6, wherein the timing generation means comprises a high-peso filter for passing a high-frequency component of the orthogonality error signal and a digitizer for digitizing an output signal of the high-pass filter.

8. A tilt control apparatus according to claim 6, wherein the target value variable means sets the control target value at least once after the apparatus is turned on.

9. A tilt control apparatus according to claim 6, wherein the target value variable means sets the control target value during recording or reproducing a signal.

10. A tilt control apparatus according to claim 6, wherein the target value variable means sets the control target value in a case where the value of the pulse width variation signal exceeds a predetermined value during recording or reproducing a signal.

11. A tilt control apparatus according to claim 1, wherein the target value variable means comprises function approximation means for approximating a relationship between the orthogonality error signal and the pulse width variation signal with a function by making the tilting means tilt the optical axis with respect to the optical disk, and wherein the target value variable means varies the control target value corresponding to the pulse width variation signal by using the function obtained by the function approximation means.

12. A tilt control apparatus according to claim 11, wherein the target value variable means sets the control target value at least once after the apparatus is turned on.

13. A tilt control apparatus according to claim 11, wherein the target value variable means sets the control target value during recording or reproducing a signal.

14. A tilt control apparatus according to claim 11, wherein the target value variable means sets the control target value in a case where the value of the Pulse width variation signal exceeds a predetermined value during recording or reproducing a signal.

15. A tilt control apparatus according to claim 1, wherein the target value variable means comprises correction signal detection means for outputting a correction signal corresponding to a direction and an amount of the orthogonality error based on the orthogonality error signal and the pulse width variation signal.

16. A tilt control apparatus according to claim 15, wherein the target value variable means sets the control target value at least once after the apparatus is turned on.

17. A tilt control apparatus according to claim 15, wherein the target value variable means sets the control target value during recording or reproducing a signal.

18. A tilt control apparatus according to claim 15, wherein the target value variable means sets the control target value in a case where the value of the pulse width variation signal exceeds a predetermined value during recording or reproducing a signal.

19. A tilt control apparatus according to claim 1, further comprising disturbance signal generation means for generating a disturbance signal for driving the tilting means in a predetermined period, wherein the target value variable means comprises correction signal detection means for outputting a correction signal corresponding to a direction and an amount of the orthogonality error based on the disturbance signal and the pulse width variation signal.

20. A tilt control apparatus according to claim 19, wherein the target value variable means sets the control target value at least once after the apparatus is turned on.

21. A tilt control apparatus according to claim 19, wherein the target value variable means sets the control target value during recording or reproducing a signal.

22. A tilt control apparatus according to claim 19, wherein the target value variable means sets the control target value in a case where the value of the pulse width variation signal exceeds a predetermined value during recording or reproducing a signal.

* * * * *